US012770123B2

(12) United States Patent
Ikezawa

(10) Patent No.: US 12,770,123 B2
(45) Date of Patent: Oct. 20, 2026

(54) STORE MOBILE TERMINAL DEVICE, METHOD, AND RECORDING MEDIUM FOR STORES

(71) Applicant: NEC Corporation, Tokyo (JP)

(72) Inventor: Rumi Ikezawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 380 days.

(21) Appl. No.: 18/267,174

(22) PCT Filed: Dec. 22, 2020

(86) PCT No.: PCT/JP2020/047816
§ 371 (c)(1),
(2) Date: Jun. 14, 2023

(87) PCT Pub. No.: WO2022/137312
PCT Pub. Date: Jun. 30, 2022

(65) Prior Publication Data

US 2024/0046237 A1 Feb. 8, 2024

(51) Int. Cl.
*G06Q 20/20* (2012.01)
*G07G 1/12* (2006.01)

(52) U.S. Cl.
CPC ............. *G06Q 20/201* (2013.01); *G07G 1/12* (2013.01)

(58) Field of Classification Search
CPC ............................... G06Q 20/201; G07G 1/12
See application file for complete search history.

(56) References Cited

U.S. PATENT DOCUMENTS

2020/0143363 A1* 5/2020 Schmidt ........... G06Q 20/40145

FOREIGN PATENT DOCUMENTS

JP 2000-200191 A 7/2000
JP 2018-049494 A 3/2018
JP 2019-046244 A 3/2019
JP 2019211873 A * 12/2019
JP 2020-160930 A 10/2020

OTHER PUBLICATIONS

JP Office Communication for JP Application No. 2024-140562, mailed on Mar. 18, 2025 with English Translation.
International Search Report for PCT Application No. PCT/JP2020/047816, mailed on Feb. 9, 2021.
English translation of Written opinion for PCT Application No. PCT/JP2020/047816, mailed on Feb. 9, 2021.
JP Office Action for JP Application No. 2022-570796, mailed on Mar. 26, 2024 with English Translation.

* cited by examiner

*Primary Examiner* — A. Hunter Wilder
*Assistant Examiner* — Joseph M Mutschler
(74) *Attorney, Agent, or Firm* — Suchrue Mion, PLLC

(57) ABSTRACT

A reception unit receives a mode. The reception unit receives a customer mode or a clerk mode. If the received mode is the customer mode, an acquisition unit acquires, by an operation of a customer, commodity information about a commodity purchased by the customer. If the received mode is the clerk mode, the acquisition unit acquires, by an operation of a clerk, commodity information about the commodity purchased by a customer. An output unit outputs payment information according to the mode on the basis of the commodity information.

8 Claims, 42 Drawing Sheets

| MODE | OPERATOR OF PRODUCT REGISTRATION |
|---|---|
| SELF-SCAN MODE | CUSTOMER |
| EMERGENCY MODE | STORE CLERK |
| PRE-HANDLING MODE | STORE CLERK |

Fig.1

| MODE | OPERATOR OF PRODUCT REGISTRATION |
|---|---|
| SELF-SCAN MODE | CUSTOMER |
| EMERGENCY MODE | STORE CLERK |
| PRE-HANDLING MODE | STORE CLERK |

Fig.2

| MODE | DEVICE THAT MAKES CASH SETTLEMENT | OPERATOR |
|---|---|---|
| SELF-SCAN MODE | PAYMENT DEVICE | MANNED: STORE CLERK |
| | | UNATTENDED: CUSTOMER |
| EMERGENCY MODE | STORE MOBILE TERMINAL DEVICE | STORE CLERK |
| PRE-HANDLING MODE | PAYMENT DEVICE | MANNED: STORE CLERK |
| | | UNATTENDED: CUSTOMER |

Fig.3

| MODE | DEVICE THAT MAKES ELECTRONIC SETTLEMENT | OPERATOR |
|---|---|---|
| SELF-SCAN MODE | PAYMENT DEVICE | MANNED: STORE CLERK |
| | | UNATTENDED: CUSTOMER |
| | CUSTOMER MOBILE TERMINAL DEVICE | CUSTOMER |
| | STORE MOBILE TERMINAL DEVICE | CUSTOMER |
| EMERGENCY MODE | CUSTOMER MOBILE TERMINAL DEVICE | CUSTOMER |
| | STORE MOBILE TERMINAL DEVICE | CUSTOMER |
| PRE-HANDLING MODE | PAYMENT DEVICE | MANNED: STORE CLERK |
| | | UNATTENDED: CUSTOMER |

Fig.22
d116
0:34 PM
100%
d110
CREDIT PAYMENT
TOTAL
d114
4 ITEMS
AMOUNT OF MONEY (TAX-INCLUSIVE)
d115
938 YEN
d111
TAP "COMPLETE" WHEN
SETTLEMENT IS COMPLETED
d113
TO SHOPPING BASKET
COMPLETE
d112

STORE MOBILE TERMINAL DEVICE, METHOD, AND RECORDING MEDIUM FOR STORES

This application is a National Stage Entry of PCT/JP2020/047816 filed on Dec. 22, 2020, the contents of all of which are incorporated herein by reference, in their entirety.

TECHNICAL FIELD

The present disclosure relates to a store mobile terminal device and the like.

BACKGROUND ART

There is self-scan shopping in which a customer performs product registration while shopping using a terminal device installed in a store.

For example, in the technology described in PTL 1, a fixed terminal device changes a mode from a transaction terminal mode in which the fixed terminal device operates as a price confirmation terminal that can be used by all customers to a self-scanning transaction mode in which a customer can input a purchase product to a transaction log file using identification information about a valid customer.

CITATION LIST

Patent Literature

PTL 1: JP 2000-200191 A

SUMMARY OF INVENTION

Technical Problem

For example, when a store mobile terminal device is lent to a customer, the customer may perform self-scan shopping that allows the customer to register a product by the operation by the customer. However, the use of the store mobile terminal device is limited to self-scan shopping. As a result, the store mobile terminal device may not be effectively utilized.

An object of the present disclosure is to provide a store mobile terminal device or the like that can be more effectively used.

Solution to Problem

A store mobile terminal device according to an aspect of the present disclosure includes a reception means that receives a mode, an acquisition means that acquires, by an operation by a customer, product information about a product to be purchased by the customer when the received mode is a customer mode, and acquire the product information by an operation by a store clerk when the received mode is a store clerk mode, and an output means that outputs payment information according to the mode based on the product information.

A method according to an aspect of the present disclosure includes receiving a mode, acquiring, by an operation by a customer, product information about a product to be purchased by the customer when the received mode is a customer mode, and acquiring the product information by an operation by a store clerk when the received mode is a store clerk mode, and outputting payment information according to the mode based on the product information.

A non-transitory recording medium readable by a computer according to an aspect of the present disclosure stores a program for causing the computer to execute processing including receiving a mode, acquiring, by an operation by the customer, product information about a product to be purchased by a customer when the received mode is a customer mode, and acquiring the product information by an operation by a store clerk when the received mode is a store clerk mode and outputting payment information according to the mode based on the product information.

Advantageous Effects of Invention

According to the present disclosure, it is possible to more effectively utilize a store mobile terminal device that performs product registration by an operation by a customer.

BRIEF DESCRIPTION OF DRAWINGS

FIG. 1 is an explanatory diagram illustrating a comparative example of a product registration operation in each mode.

FIG. 2 is an explanatory diagram illustrating a comparative example of the cash settlement in each mode.

FIG. 3 is an explanatory diagram illustrating a comparative example of the electronic settlement in each mode.

EXAMPLE EMBODIMENT

Figure 4:
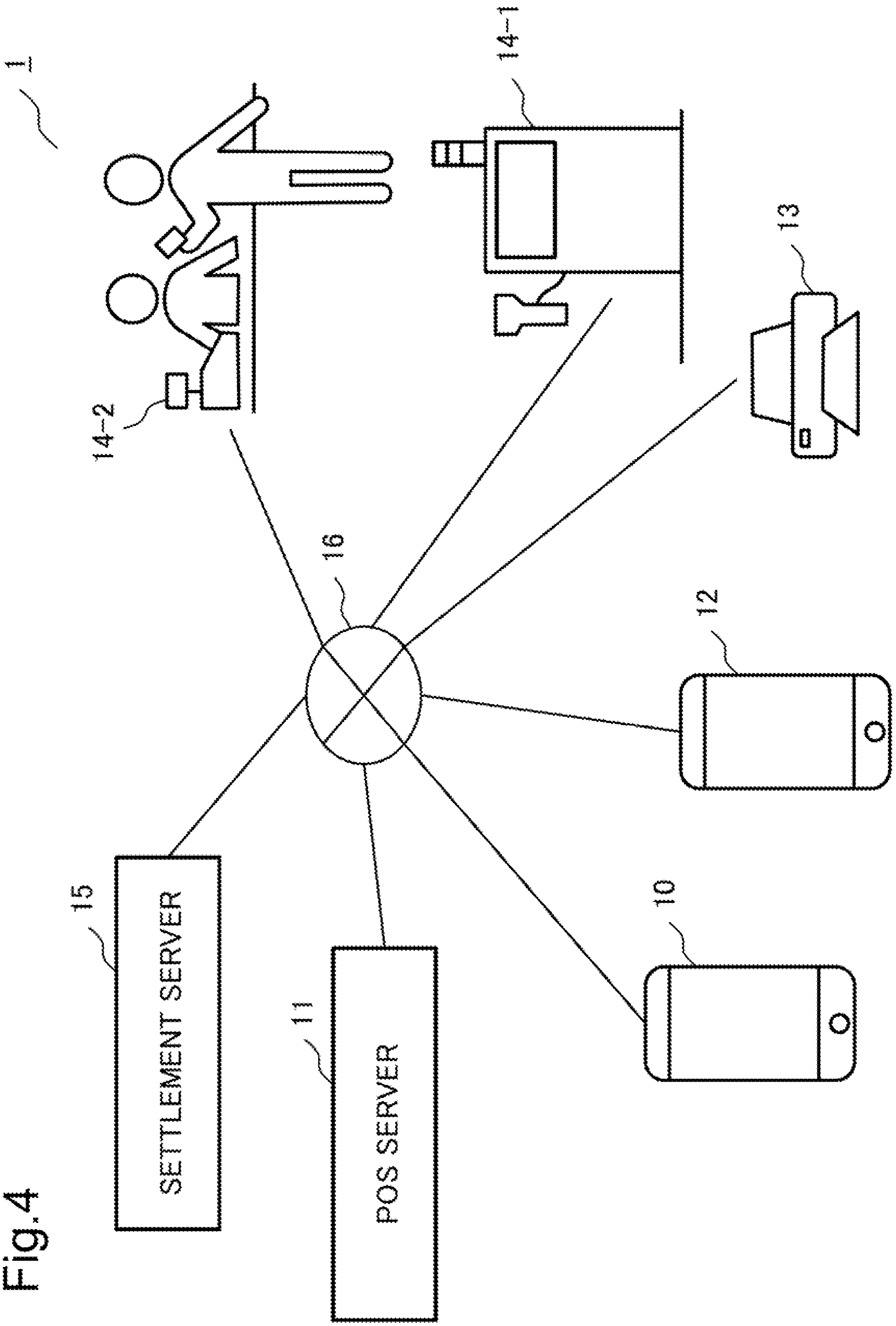
FIG. 4 is an explanatory diagram illustrating an example of a system according to the first example embodiment.

Hereinafter, example embodiments of a store mobile terminal device, a store mobile terminal device, a method, a program, and a recording medium storing the program according to the present disclosure will be described in detail with reference to the drawings. The present example embodiment does not limit the disclosed technology.

First Example Embodiment

In the first example embodiment, a store mobile terminal device capable of switching between three modes of a self-scan mode as a customer mode and a pre-handling mode and an emergency mode as a store clerk mode will be described.

FIG. 1 is an explanatory diagram illustrating a comparative example of a product registration operation in each mode. The store mobile terminal device according to the first example embodiment has a self-scan mode, an emergency mode, and a pre-handling mode. The self-scan mode is a customer mode. In the self-scan mode, the product registration is performed by the operation by the customer. Details of the product registration will be described later.

The emergency mode and the pre-handling mode are store clerk modes. In the emergency mode and the pre-handling mode, the product registration is performed by the operation by the store clerk.

The emergency mode is used as a measure against a business continuity plan (BCP). The emergency mode is, for example, a store clerk mode in which a store mobile terminal device is used as an emergency product registration device. In the emergency mode, for example, it is assumed that the payment device installed in the store cannot be used.

The pre-handling mode is used for improving the efficiency of business or as a measure for waiting for the product registration device that performs product registration. The pre-handling mode is a store clerk mode in which a store mobile terminal device is used as a pre-handling product registration device that performs product registration before settlement. The emergency mode and the pre-handling mode are common in that the product registration is performed by the operation by the store clerk. However, since the emergency mode and the pre-handling mode have different usage scenes, the settlement methods are different.

FIG. 2 is an explanatory diagram illustrating a comparative example of the cash settlement in each mode. First, cash settlement in the self-scan mode will be described. In the self-scan mode, the payment device makes a cash settlement. The payment device may be manned or unattended. Alternatively, the payment device may be a device capable of switching between manned and unattended. In the self-scan mode, when the payment device is manned, the payment device makes a cash settlement by the operation by the store clerk. When the payment device is unattended the payment device makes a cash settlement by the operation by the customer.

Next, cash settlement in the emergency mode will be described. In the emergency mode, the store mobile terminal device makes a cash settlement by the operation by the store clerk.

Then, cash settlement in the pre-handling mode will be described. As described above, the pre-handling mode is used for improving the efficiency of business or as a measure for waiting for the product registration device that performs product registration. Therefore, in the pre-handling mode, the payment device makes a cash settlement. The payment device may be manned or unattended. In the pre-handling mode, when the payment device is manned, the payment device makes a cash settlement by the operation by the store clerk. When the payment device is unattended the payment device makes a cash settlement by the operation by the customer.

FIG. 3 is an explanatory diagram illustrating a comparative example of the electronic settlement in each mode. The type of the electronic settlement is not particularly limited. Examples of the electronic settlement include at least one of credit settlement, debit settlement, electronic money settlement, point settlement, and virtual currency settlement. The electronic money settlement is, for example, a settlement by a short-distance wireless communication type integrated circuit (IC) card, a bar code settlement which is a one-dimensional code, or a Quick Response code (QR code (registered trademark)) settlement.

The electronic settlement in the self-scan mode will be described. For example, in the self-scan mode, the payment device makes an electronic settlement. When the payment device is manned, the payment device makes an electronic settlement by the operation by the store clerk. A credit card reading operation or the like is performed by a customer's operation. When the payment device is unattended, the payment device makes an electronic settlement by the operation by the customer.

In the self-scan mode, the customer mobile terminal device may make an electronic settlement. The customer mobile terminal device makes an electronic settlement by the operation by the customer.

In the self-scan mode, when the store mobile terminal device can receive the input of the settlement information of the customer, the store mobile terminal device may make the electronic settlement by the operation by the customer. The settlement information of the customer is information about the electronic settlement of the customer for making the electronic settlement. More specifically, the settlement information is, for example, information for making an electronic settlement by card. For example, a case of the credit settlement will be described as an example. The settlement information is credit information such as a credit settlement number, a credit settlement expiration date, and a name registered in the credit settlement. When the credit information can be received, a store mobile terminal device makes a credit settlement by an operation by a customer.

The electronic settlement in the emergency mode will be described. In the emergency mode, for example, a customer mobile terminal device makes an electronic settlement. A detailed example will be described later. In the emergency mode, when the store mobile terminal device can receive the input of the settlement information about the customer, for example, the store mobile terminal device may make the electronic settlement. For example, in the case of a credit card settlement, when a store mobile terminal device can receive credit information such as a credit number as settlement information of a customer by an operation by the customer, the store mobile terminal device makes a credit card settlement.

The electronic settlement in the pre-handling mode will be described. As described above, the pre-handling mode is used for improving the efficiency of business or as a measure for waiting for the product registration device that performs product registration. Therefore, in the pre-handling mode, the payment device makes an electronic settlement. When the payment device is manned, the payment device makes an electronic settlement by the operation by the store clerk. A credit card reading operation or the like is performed by a customer's operation. When the payment device is unattended, the payment device makes an electronic settlement by the operation by the customer.

As described above, the store mobile terminal device according to the first example embodiment can switch the use of the store mobile terminal device according to the received mode. Accordingly, in the store mobile terminal device, it is possible to more effectively utilize the store mobile terminal device.

FIG. 4 is an explanatory diagram illustrating an example of the system according to the first example embodiment. The system 1 includes, for example, a store mobile terminal device 10, a point of sale (POS) server 11, a customer mobile terminal device 12, a printing device 13, a payment device 14, and a settlement server 15. The store mobile terminal device 10, the POS server 11, the customer mobile terminal device 12, the printing device 13, the payment device 14, and the settlement server 15 may be connected via, for example, a communication network 16.

The store mobile terminal device 10 has, for example, a function of registering a product to be purchased by a customer. The store mobile terminal device 10 can switch between the above-described three modes. The type of the mobile terminal device is not particularly limited to a smartphone, a tablet or the like. Although not illustrated, the number of store mobile terminal devices 10 is not particularly limited. For example, a plurality of store mobile terminal devices 10 may have the same function. Alternatively, a plurality of store mobile terminal devices 10 may have different functions.

The POS server 11 is a server that manages various sales information such as product information including a price related to a product to be sold in a store and sales information of the store. The POS server 11 may collectively manage the sales information of a plurality of stores. Alternatively, the POS server 11 may exist for each store. Then, the POS server 11 may manage the sales information of one store.

Furthermore, the POS server 11 may perform processing in response to a request from the store mobile terminal device 10. For example, the POS server 11 may transmit information necessary for display control of the store mobile terminal device 10 to the mobile terminal device. For example, the POS server 11 may transmit information about a screen displaying a list of products to be purchased registered by the store mobile terminal device 10 together with a selling price to the store mobile terminal device 10. Hereinafter, this list is referred to as a "purchase product list". The POS server 11 may manage information related to a member. Various types of information included in the POS server 11 will be described later.

An example in which the POS server 11 is achieved by one device will be described. However, an achieved example of the POS server 11 is not particularly limited. The POS servers 11 may be achieved by different devices for each function or database (DB).

The customer mobile terminal device 12 is, for example, a terminal device possessed by the customer. The type of the customer mobile terminal device 12 is not particularly limited to a smartphone, a tablet or the like. The customer mobile terminal device 12 may not be used depending on a settlement method. Although not illustrated, the number of customer mobile terminal devices 12 is not particularly limited.

The printing device 13 prints various printed matter, for example. The printing device 13 prints, for example, a receipt. Alternatively, the printing device 13 prints, for example, printed matter including payment information. The printed matter may include, for example, a code in which the payment information is encoded. The details of the payment information are different depending on each mode or the device making the settlement. Details of the payment information will be described in each mode. The type of the printing device 13 is not particularly limited. The printing device 13 may be, for example, a thermosensitive printer.

The payment device 14 is a device of a store capable of making various types of settlements such as an electronic settlement and a cash settlement. The payment device 14 includes a reading device that reads a code such as a one-dimensional code such as a barcode or a two-dimensional code. Then, the payment device 14 makes various types of settlements based on the read code. The payment device 14 may have, for example, a function capable of printing a receipt. The payment device 14 may be a manned cashier machine where a store clerk is present. The payment device 14 may be an unattended cashier machine where no store clerk is present. The payment device 14 may be a cashier machine capable of switching between manned and unattended. Specifically, the payment device 14 may be a cashier machine capable of switching between a manned mode via a store clerk and an unattended mode not via a store clerk. That is, in the manned mode, the settlement is made by the operation by the store clerk. A plurality of payment devices 14 such as the payment device 14-1 and the payment device 14-2 may be provided in the store. A plurality of payment devices 10 capable of switching the mode may operate in different modes.

Figure 5:
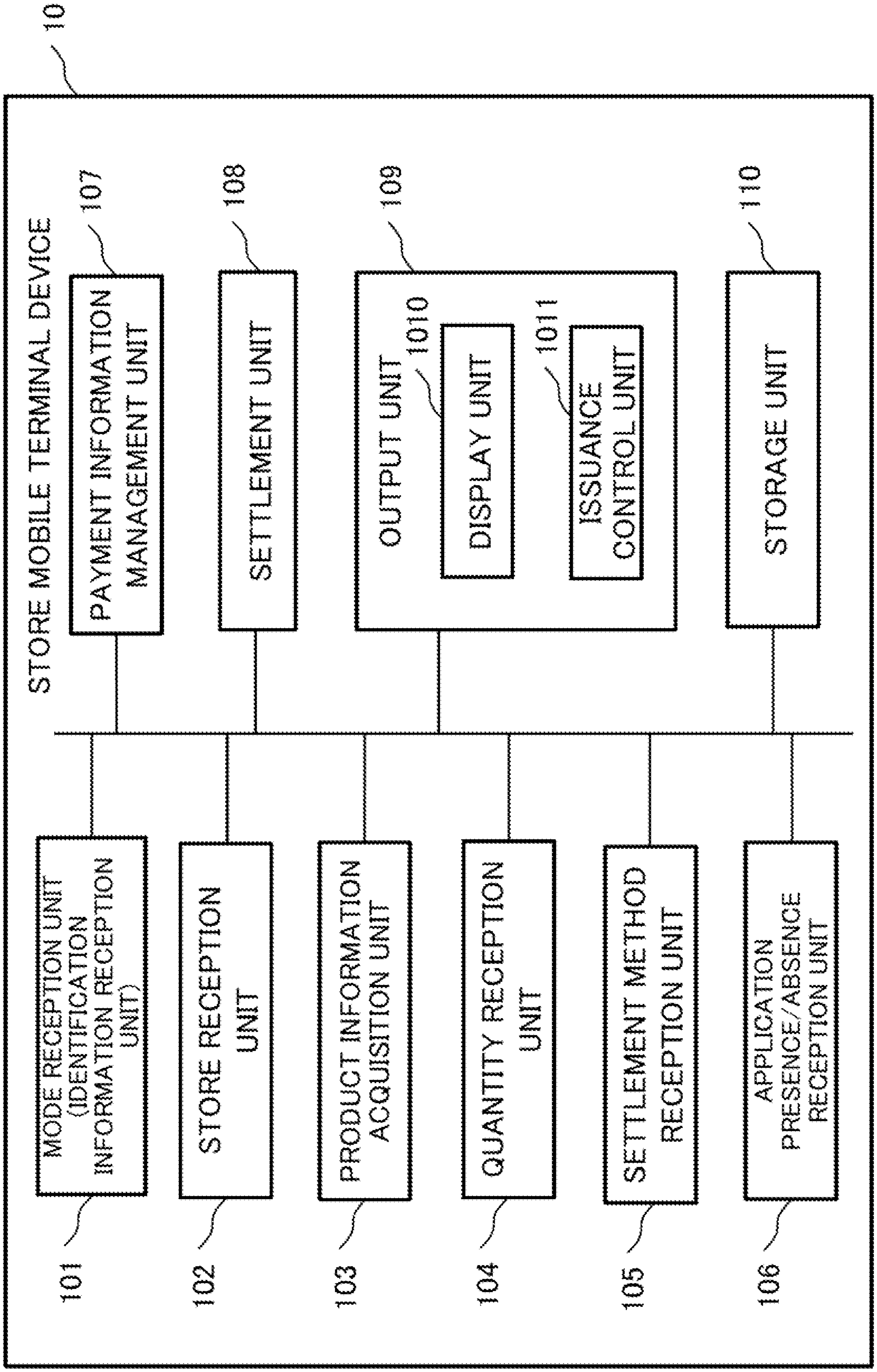
FIG. 5 is a block diagram illustrating a configuration example of a store mobile terminal device.

A configuration example of each device according to the first example embodiment will be described with reference to FIGS. 5 to 8. FIG. 5 is a block diagram illustrating a configuration example of the store mobile terminal device 10. The store mobile terminal device 10 includes a mode reception unit 101, a store reception unit 102, a product information acquisition unit 103, a quantity reception unit 104, a settlement method reception unit 105, and an application presence/absence reception unit 106. Further, the store mobile terminal device 10 includes a payment information management unit 107, a settlement unit 108, an output unit 109, and a storage unit 110. The output unit 109 may include, for example, a display unit 1010 and an issuance control unit 1011. The storage unit 110 stores, for example, data used for processing of each unit of the store mobile terminal device 10. The storage unit 110 stores, for example, a processing result of each unit of the store mobile terminal device 10. Examples of the storage unit 110 include a read only memory (ROM), a random access memory (RAM), a semiconductor memory, a hard disk drive (HDD), and a solid state drive (SSD). The storage unit 110 may be a combination thereof. The store mobile terminal device 10 may not include some of the function units. Alternatively, the store mobile terminal device 10 may have a function unit not illustrated.

Figure 6:
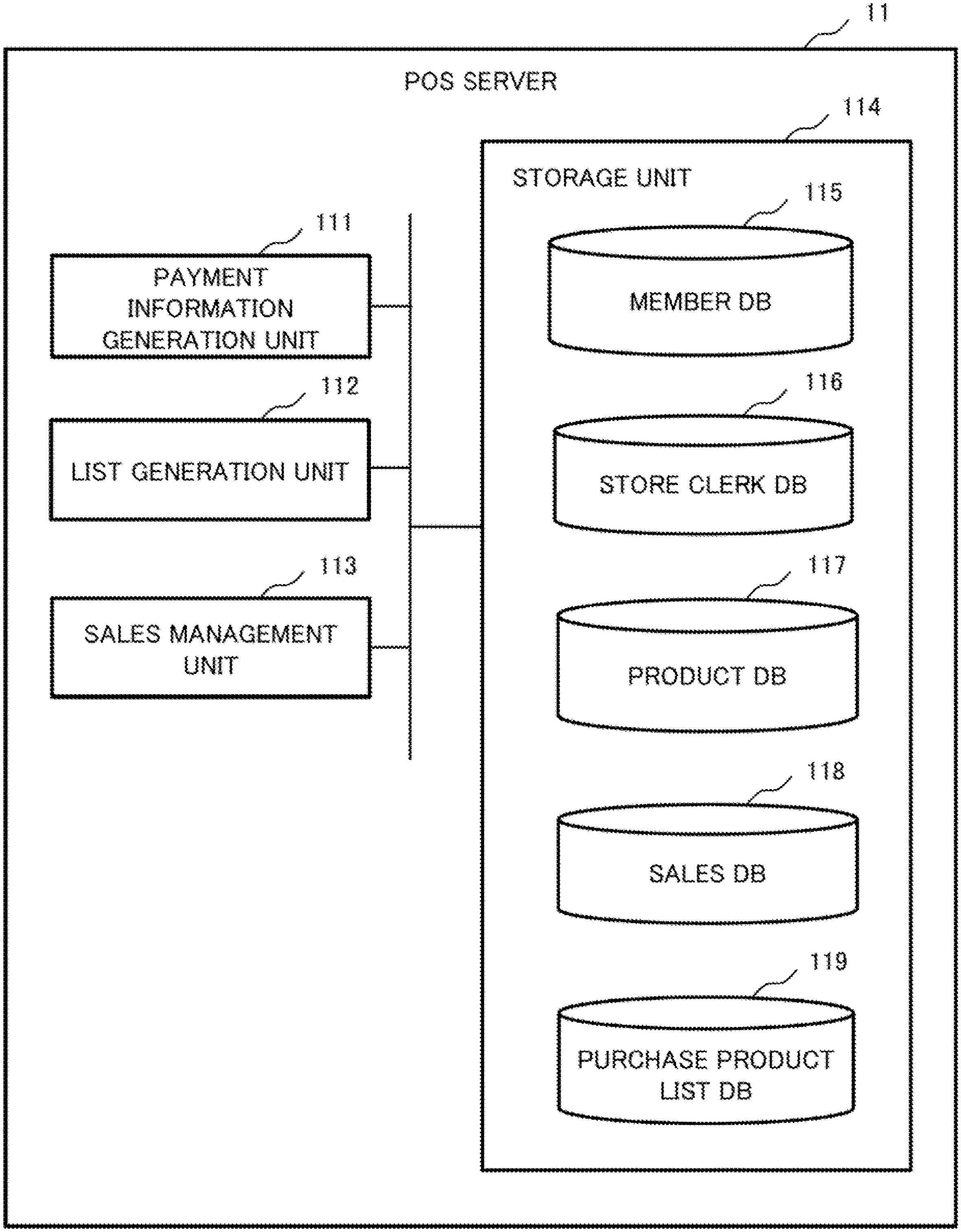
FIG. 6 is a block diagram illustrating a configuration example of a POS server.

FIG. 6 is a block diagram illustrating a configuration example of the POS server 11. The POS server 11 includes a payment information generation unit 111, a list generation unit 112, a sales management unit 113, and a storage unit 114. The POS server 11 may not include some of the function units. The POS server 11 may have a function unit not illustrated. The function unit of the POS server 11 illustrated in FIG. 6 may be achieved by a plurality of devices. For example, respective function units may be achieved by two devices of a device including the payment information generation unit 111 and the list generation unit 112 and a device including the sales management unit 113. Alternatively, respective function units may be achieved by three devices of a device including the payment information generation unit 111, a device including the list generation unit 112, and a device including the sales management unit 113. Alternatively, for example, the payment information generation unit 111 may be achieved by different devices according to the content of the payment information.

The storage unit 114 stores, for example, data used for processing of each unit of the POS server 11. Examples of the storage unit include a ROM, a RAM, a semiconductor memory, an HDD, and an SSD. The storage unit 114 may be a combination thereof. The storage unit 114 includes a member DB 115, a store clerk DB 116, a product DB 117, a sales DB 118, and a purchase product list DB 119.

The member DB 115 stores member information for each member (customer), for example. The member information is, for example, at least one of a member identifier (ID), a name of the member, a gender of the member, an age or an age group of the member, and an address of the member. The member ID is, for example, an identifier for uniquely identifying the member. The type of the member ID is not particularly limited. The member ID may be represented by a membership number. The address is an address such as an e-mail address or a telephone number. The member DB 115 may further store information such as a password, a past purchase history, and a point for each member. The member DB 115 may further store the biometric information for each member. The biometric information is not particularly limited. Examples of the biometric information include face feature amount data, face image data, fingerprint data, iris data, vein data, and the like.

The member DB 115 may not include part of the above-described information related to the member. The member DB 115 may include information other than the above-described information about the member.

The store clerk DB 116 stores, for example, store clerk information for each store clerk. The store clerk information is, for example, at least one of a store clerk ID and a name of the store clerk. The store clerk ID is, for example, an identifier for uniquely identifying a member. The store clerk ID is not particularly limited. The store clerk ID may be represented by a store clerk number. The store clerk DB 116 may further store information such as a password, a work schedule, and biometric information for each store clerk. The biometric information is as described above in the member DB 115.

The store clerk DB 116 may not include part of the above-described information about the store clerk. The store clerk DB 116 may include information other than the above-described information about the store clerk.

The product DB 117 stores product information about products handled in a store or an affiliated store including a store. Specifically, the product DB 117 stores product information for each product, for example. The product information is, for example, information such as a product ID, a product name, a classification of a product, a price of a product, and a characteristic of a product. The product ID is an identifier capable of identifying a product. The product ID is not particularly limited. The product ID is, for example, a code of a product (hereinafter, referred to as a product code). More specifically, the product ID may be, for example, a product code of at least one of a Japanese Article Number (JAN) code, a European Article Number (EAN) code, or a Universal Product Code (UPC). Alternatively, the product ID may be a product name. The classification of the products is not particularly limited. For example, the product may be roughly classified into a food, a stationery, and the like. The classification of the product may be a classification of confectionery, meat, vegetable, or the like. The price of the product is a price of the product. The characteristic of the product is not particularly limited. The characteristic of the product may be a best-before date, a use-by date, a manufacturer, or the like.

The product information may include information for identifying the product in addition to the product ID information. For example, the product information may include product image data, information about feature amount obtained from the product image data, and the like.

The product DB 117 may not include part of the above-described information about the product. The product DB 117 may include information other than the above-described information about the product.

The purchase product list DB 119 stores the latest purchase product list for which the settlement has not been completed for each transaction or each customer. The purchase product list stores, for example, information for identifying a transaction or a customer, product information about a product scheduled to be purchased by the customer, and information about a purchase quantity in association with each other for each transaction or each customer. The information for identifying the transaction is not particularly limited as long as the information can uniquely identify the transaction, for example. The information for identifying the customer is not particularly limited as long as the information can uniquely identify the customer, for example. An example in which information for identifying a customer is stored and information about a customer ID is assigned as information for identifying a customer will be described. For example, a customer ID is assigned to a customer before starting registration of a product to a new customer. The state before the product registration is started may be a state after the mode is received and before the display unit 1010 displays the initial screen of the new purchase product list in which the product information is not registered. The timing at which a specific customer ID is assigned may be different depending on each mode or a settlement in each mode. The purchase product list can be uniquely identified by the customer ID. When the member ID is received, the received member ID may be used as the customer ID. Alternatively, in addition to the customer ID, the purchase product list may further store information about the received member ID in association with each customer. The product information here may be any information that can uniquely identify a product. Examples of the product information include product ID information. As a result, the purchase product list is associated with the product DB 117 by the information about the product ID. Therefore, by referring to the purchase product list, each device can obtain the information about the price of the product, the name of the product, and the like from the product DB 117 by the information about the product ID registered in the purchase product list. The purchase product list may store information about the price of a tax-inclusive product as the product information based on the information about the price of the product. The purchase product list may further include, for each customer, total purchase price information and total purchase quantity information.

The purchase product list DB 119 may not include part of the above-described information about the purchase product list. The purchase product list DB 119 may include information other than the above-described information about the purchase product list.

The sales DB 118 is, for example, information about sales of a store for each store. For example, the sales DB 118 may manage information related to each settlement for each store. Specifically, the sales DB 118 stores, for example, a store ID, an ID of the store mobile terminal device 10, an ID of a user, an ID of the payment device 14, an ID of an operator of the payment device 14, a product ID of a purchased product, a purchase quantity, and a purchase date and time in association with each other. The store ID is an identifier for uniquely identifying the store. The ID of the store mobile terminal device 10 is an identifier for uniquely identifying the store mobile terminal device 10. The ID of the store mobile terminal device 10 registered in the sales DB 118 is an ID of the terminal device that has performed product registration. The ID of the payment device 14 is an identifier for uniquely identifying the payment device 14. The ID of the payment device 14 registered in the sales DB 118 is an ID of the payment device 14 that has made the settlement. The ID of the user (operator) registered in the sales DB 118 is a store clerk ID or a member ID of the user who uses the store mobile terminal device 10. The sales DB 118 may include information indicating a mode of the store mobile terminal device 10 at the time of operation. The sales DB 118 may include information included in each receipt to be described later as other information.

The sales DB 118 may not include part of the above-described information about sales. The sales DB 118 may include information other than the above-described information about sales.

For example, the sales management unit 113 updates the sales DB 118 according to the details of the settlement. For example, the sales DB 118 and the product DB 117 are associated with product names and the like by product IDs. The price at the time of settlement is registered for the price of each product in the sales DB 118.

For ease of description and understanding, an example in which the POS server 11 includes various DBs will be described, but the present disclosure is not limited thereto. For example, the various DBs may be included in different devices. For example, a server that manages the sales DB 118, a server that manages the member DB 115, and a server that manages the purchase product list DB 119 may be different from each other. In such a case, the server that manages the sales DB 118 and the server that manages the member DB 115 function as database servers. The server that manages the purchase product list DB 119 functions as, for example, an application server. Each server transfers information to be used for the assigned processing via, for example, the communication network 16 or the like.

The POS server 11 may handle various types of information (not illustrated). For example, the POS server 11 may acquire information about a change in selling price such as a discount amount, a bundle discount, a set discount, and a discount rate, and calculate a purchase price at the time of settlement using the information. Alternatively, the POS server 11 may update the purchase product list using the information. The bundle discount is a discount assigned when a plurality of specific products is purchased. The set discount is a discount for a combination of specific products.

Figure 7:
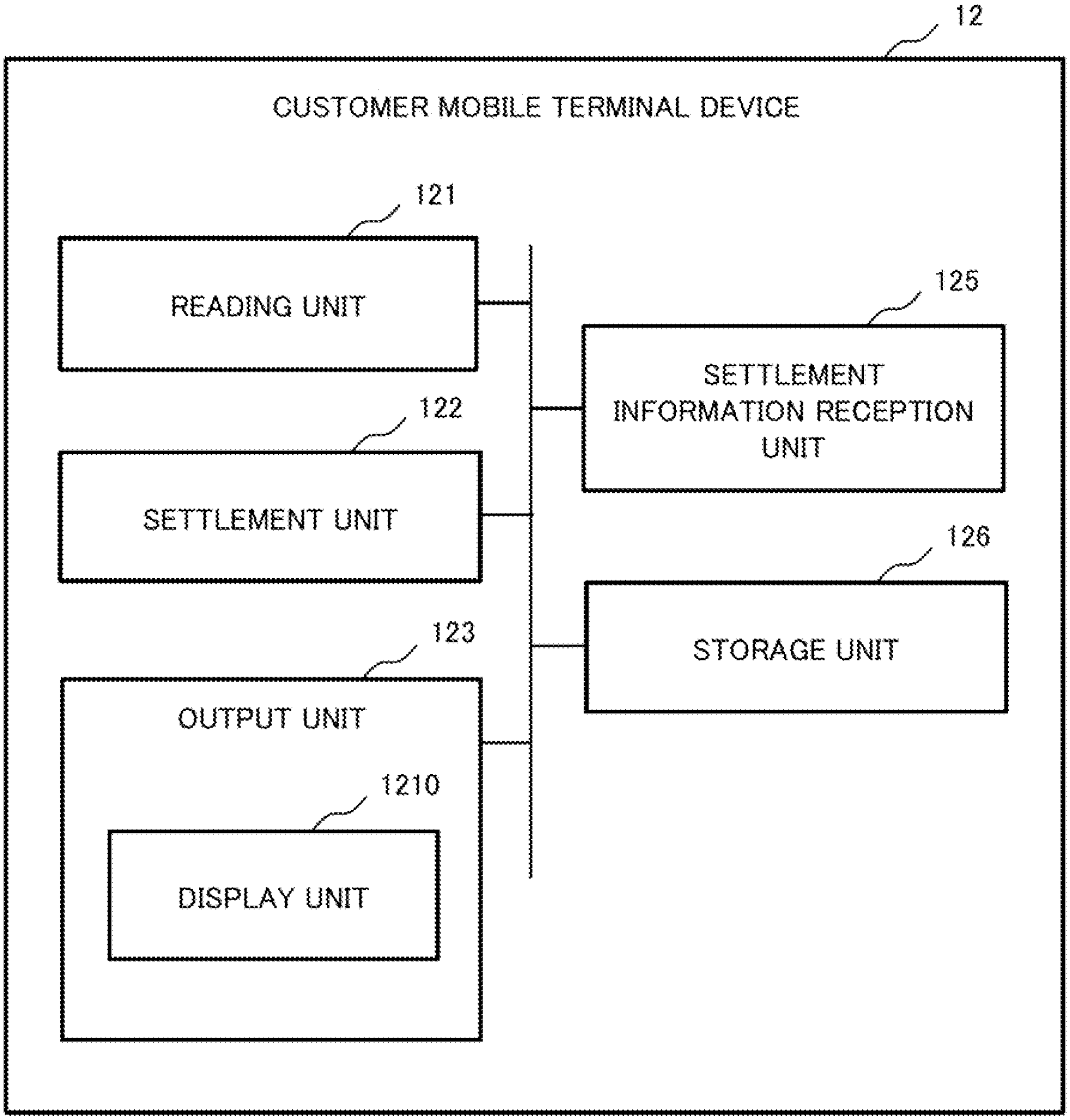
FIG. 7 is a block diagram illustrating a configuration example of a customer mobile terminal device.

FIG. 7 is a block diagram illustrating a configuration example of the customer mobile terminal device 12. The customer mobile terminal device 12 includes, for example, a reading unit 121, a settlement unit 122, an output unit 123, a settlement information reception unit 125, and a storage unit 126. The storage unit 126 stores, for example, data used for processing of each unit of the customer mobile terminal device 12. The storage unit 126 may store, for example, a processing result of each unit of the customer mobile terminal device 12. Examples of the storage unit 126 include a ROM, a RAM, a semiconductor memory, an HDD, and an SSD. The storage unit 126 may be a combination thereof. The output unit 123 includes, for example, a display unit 1210. The customer mobile terminal device 12 may not have some of the function units. The customer mobile terminal device 12 may have a function unit not illustrated.

Figure 8:
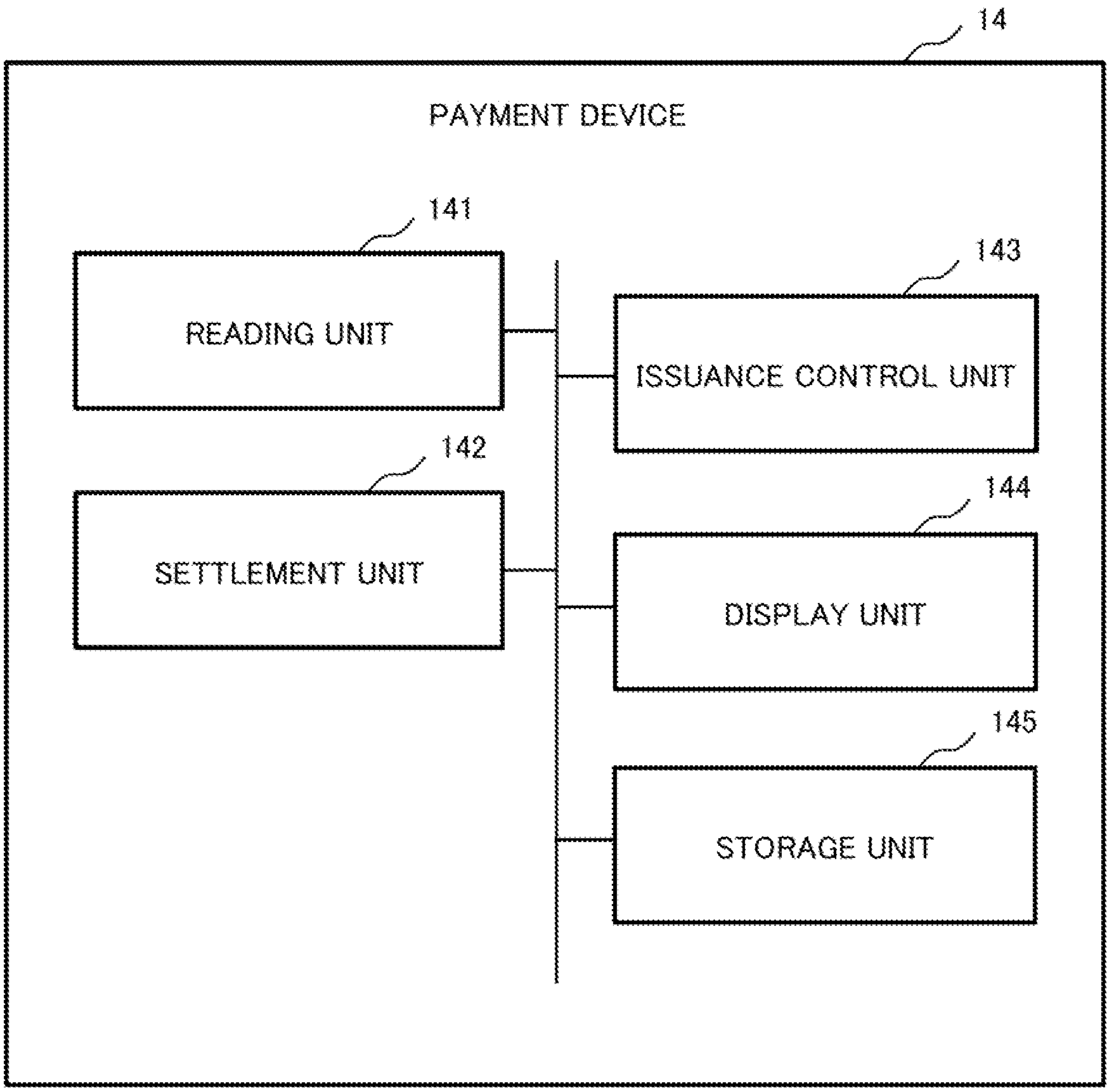
FIG. 8 is a block diagram illustrating a configuration example of a payment device.

FIG. 8 is a block diagram illustrating a configuration example of the payment device 14. The payment device 14 includes a reading unit 141, a settlement unit 142, an issuance control unit 143, a display unit 144, and a storage unit 145. The storage unit 145 stores, for example, data used for processing of each unit of the payment device 14. The storage unit 145 may store, for example, a processing result of each unit of the customer mobile terminal device 12. Examples of the storage unit 145 include a ROM, a RAM, a semiconductor memory, an HDD, and an SSD. The storage unit 145 may be a combination thereof. The payment device 14 may have a function unit not illustrated.

Next, each function unit illustrated in FIGS. 5 to 8 will be described in detail. Reception of a mode and an operation example in various modes will be described.

<Reception of Mode>

First, reception of the mode will be described. The mode reception unit 101 receives an input of a mode. More specifically, the mode reception unit 101 receives modes including a self-scan mode as a customer mode, an emergency mode as a store clerk mode, and a pre-handling mode as a store clerk mode. A mode reception method is not particularly limited. The mode reception unit 101 may receive the mode by a selection button displayed on the screen.

Figure 9:
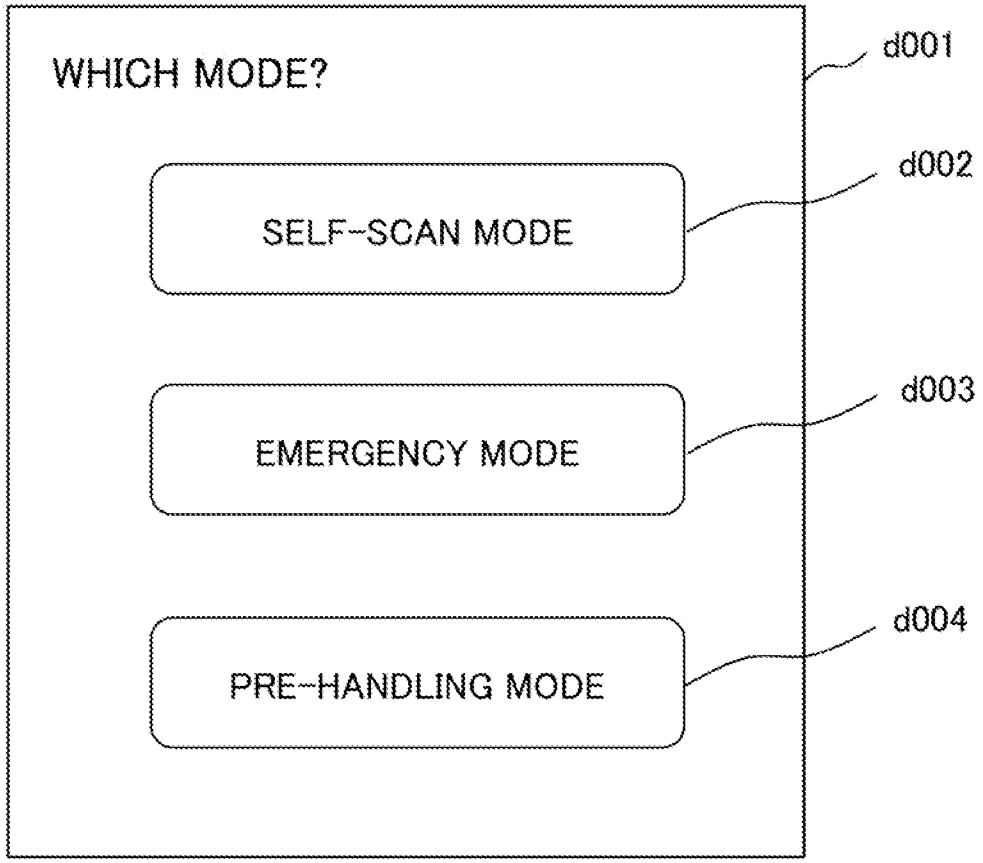
FIG. 9 is an explanatory diagram illustrating a mode reception example 1.

FIG. 9 is an explanatory diagram illustrating a mode reception example 1. For example, the display unit 1010 displays a screen d001 where each mode can be selected, for example, on a display or the like. The screen d001 includes, for example, a selection button d002 capable of selecting the self-scan mode, a selection button d003 capable of selecting the emergency mode, and a selection button d004 capable of selecting the pre-handling mode. Each button is, for example, a button of a graphic user interface (GUI). The type of the button is not particularly limited. In the following description, the buttons displayed on each screen are GUI buttons.

For example, the user (operator) taps a selection button related to a desired mode. Accordingly, the user selects the mode. Then, when the selection button is tapped, the mode reception unit 101 receives a mode related to the tapped selection button. The description of FIG. 9 ends.

When the selection button d002 capable of selecting the self-scan mode is tapped, the list generation unit 112 of the POS server 11 assigns a customer ID to the customer and newly generates a purchase product list.

Figure 10:
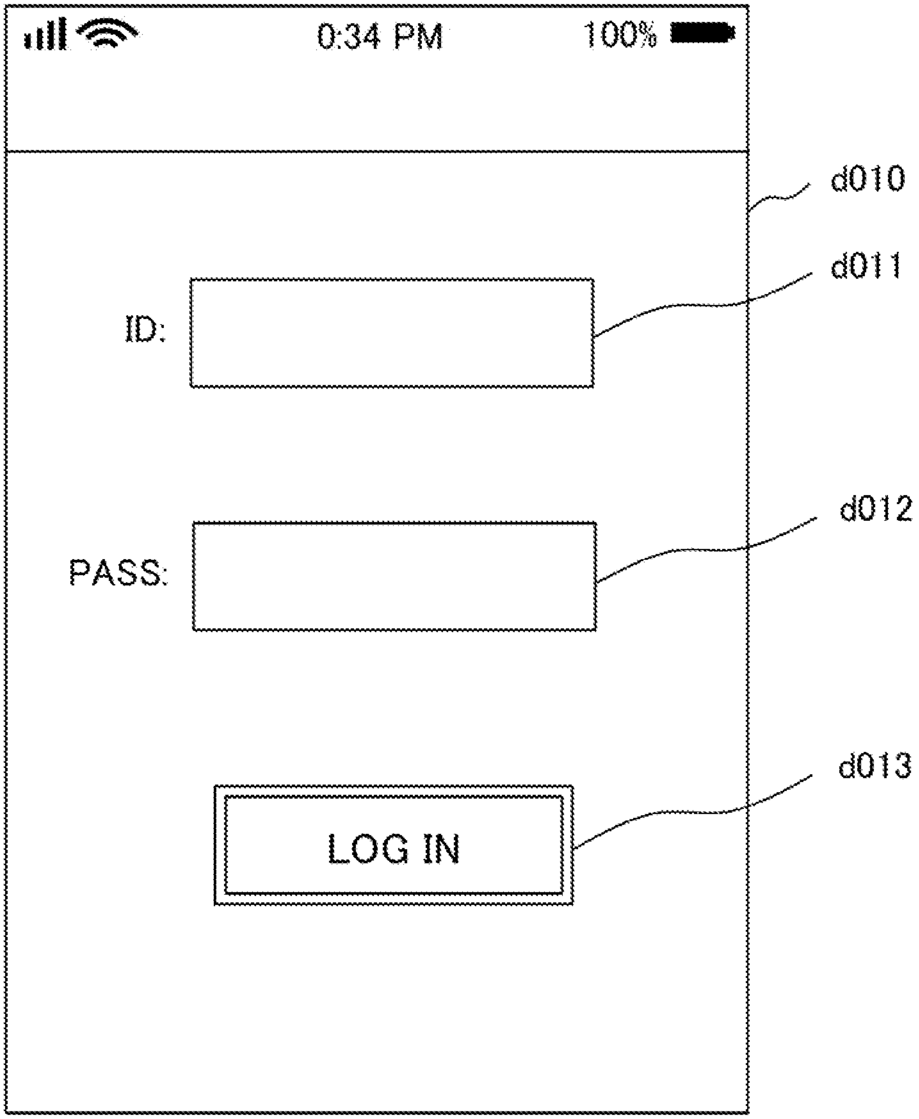
FIG. 10 is an explanatory diagram (part 1) illustrating a mode reception example 2.

Alternatively, the mode reception unit 101 may receive the mode based on information about the ID of the user (operator). For example, the mode reception unit 101 may function as an identification information reception unit that receives information about the ID of the user (operator). A method of receiving the information about the ID of the user by the mode reception unit 101 is not particularly limited. The mode reception unit 101 may receive input of an ID to a screen as illustrated in FIG. 10 to be described later. Alternatively, the mode reception unit 101 may receive the ID by extracting the ID described in the store clerk's card from the image of the store clerk's card such as the employee ID card captured by the imaging device.

Figure 11:
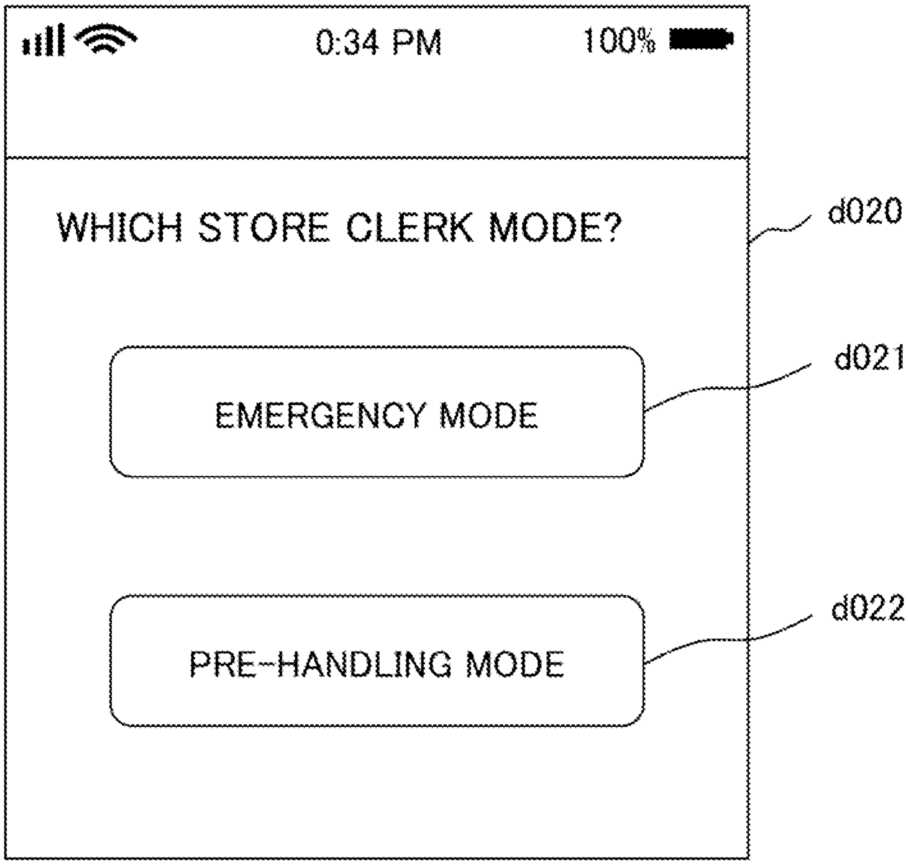
FIG. 11 is an explanatory diagram (part 2) illustrating the mode reception example 2.

FIGS. 10 and 11 are explanatory diagrams illustrating a mode reception example 2. For example, the display unit 1010 displays a screen d010 where each piece of information about an ID (identifier) and a password can be input. In FIG. 10, the screen d010 includes, for example, an ID input field d011, a password input field d102, and a login button d013. For example, when the button d013 is tapped, the mode reception unit 101 receives the ID information input in the ID input field d011 and the password information input in the password input field d012. Then, the mode reception unit 101 transmits the received ID information and the received password information to the POS server 11. For example, an inquiry unit (not illustrated) of the POS server 11 inquires about the input ID information and the input password information using the member DB 115 to. The inquiry unit of the POS server 11 inquires about the input ID information and the input password information using the store clerk DB 116.

For example, it is assumed that the mode reception unit 101 receives the self-scan mode when the input ID information and the input password information are in the member DB 115 or when the ID information and the password information that match the store clerk DB 116 are not present. For example, when the input ID information and the input password information are in the store clerk DB 116, it is assumed that the mode reception unit 101 receives the store clerk mode (the pre-handling mode or the emergency mode).

When the input ID information and the input password information are in the member DB 115, the list generation unit 112 of the POS server 11 assigns the customer ID to the customer and newly generates the purchase product list.

Referring now to FIG. 11, in the store clerk mode, the display unit 1010 displays a screen d020 for receiving one of the pre-handling mode and the emergency mode. The screen d020 here includes, for example, a selection button d021 capable of selecting the emergency mode and a selection button d022 capable of selecting the pre-handling mode. When any selection button is tapped, the mode reception unit 101 receives a mode related to the tapped selection button.

Next, the store reception unit 102 will be described. For example, a business may have a plurality of stores. The sales are counted on a store basis. Therefore, the store reception unit 102 receives information about a store. The information about a store (hereinafter, the information is referred to as store information) is not particularly limited as long as the store can be uniquely identified. A method of receiving the store information is not particularly limited. The store reception unit 102 may receive the store information by reading a code for the store (hereinafter, referred to as a store code). The store code is represented by, for example, a one-dimensional code such as a number, a character, or a barcode, a two-dimensional code, or a combination thereof. Alternatively, for example, the store reception unit 102 may receive the store information by inputting a store name or selecting from store name candidates.

Figure 12:
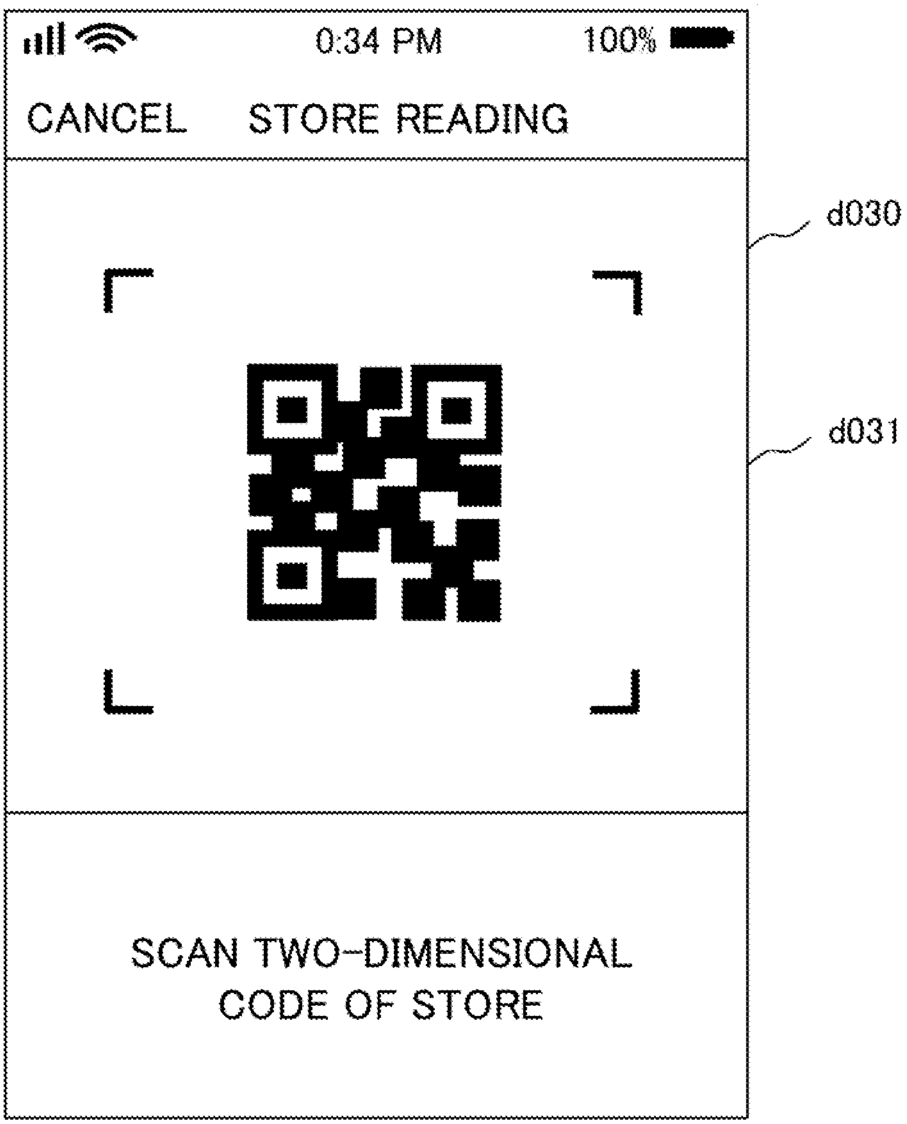
FIG. 12 is an explanatory diagram illustrating an example of receiving information about a store using a store code.

FIG. 12 is an explanatory diagram illustrating an example of receiving information about a store using a store code. For example, the display unit 1010 displays a screen d030 for reading the store code. The store code includes, for example, identification information that can uniquely identify the store. In FIG. 12, the store code is a two-dimensional code. The screen d030 has a reading portion d031 of the store code. The type of the store code is not particularly limited, for example. The reading portion d031 of the store code is achieved by a reading device of the store mobile terminal device 10. Examples of the reading device include an imaging device and the like. For example, the printed matter including a store code readable by the store mobile terminal device 10 may be overhung near an entrance of the store. For example, the store reception unit 102 reads the store code via the reading device of the store mobile terminal device 10. As a result, the store reception unit 102 receives the store at which shopping is to be performed according to the information about the store included in the store code.

Figure 13:
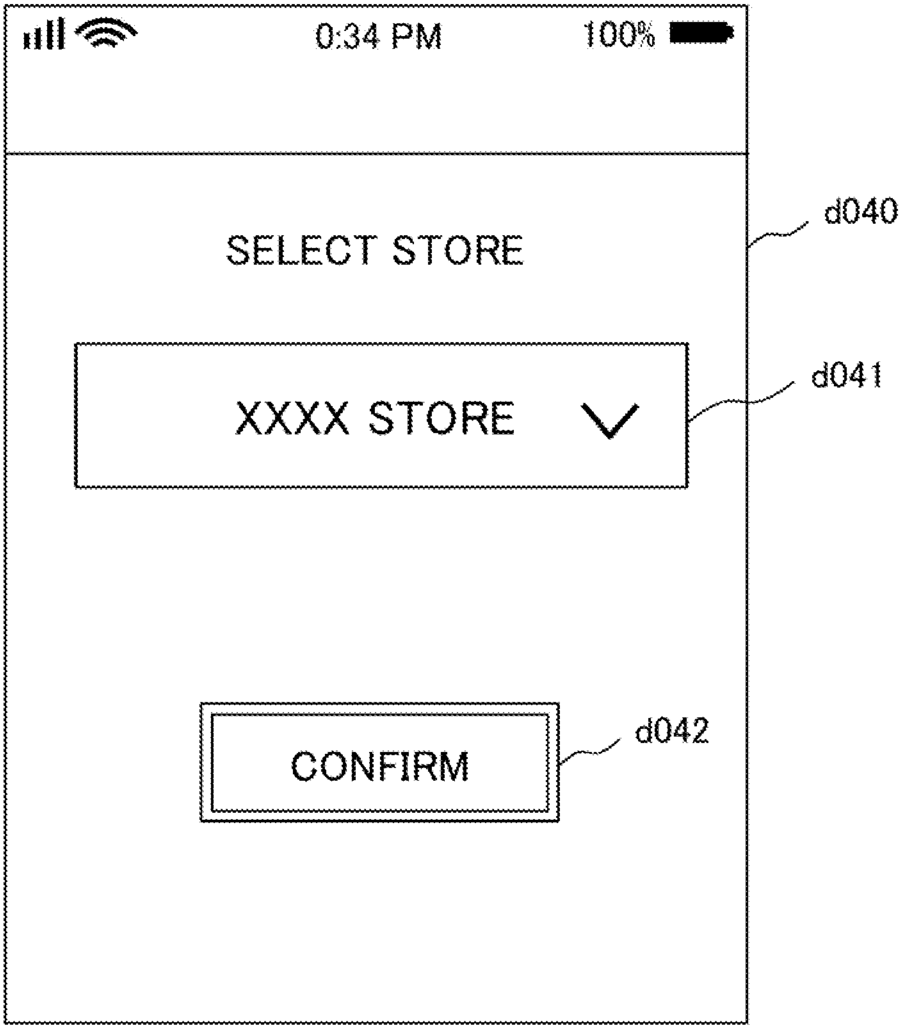
FIG. 13 is an explanatory diagram illustrating an example of receiving information about a store using a pull-down menu.

FIG. 13 is an explanatory diagram illustrating an example of receiving information about a store using a pull-down menu. For example, the display unit 1010 may display a screen d040 where a name of a store can be selected from a pull-down menu. For example, the screen d040 includes a pull-down menu d041 from which the name of the store can be selected, and a confirmation button d042 for confirming the selection of the store. When the user selects the name of the target store from the pull-down menu d041 and presses the confirmation button d042, the store reception unit 102 receives the input of the store information.

When selection of a store has already been received in the past, the screen d040 may be displayed in a state where the name of the store selected in the past is selected in the pull-down menu d041. Accordingly, the user can select a store by checking the store name and tapping the confirmation button d042.

As described above, the method of receiving the store information is not particularly limited. Different methods of receiving store information may be performed depending on the mode. Which store information reception method is performed in each mode is not particularly limited. For example, the customer may not know the store name or the like. Therefore, in the self-scan mode operated by the customer, the method of receiving the store information using the store code as described with reference to FIG. 12 may be used. On the other hand, the store clerk is likely to know the store name. For example, in the pre-handling mode and the emergency mode, a store information reception method of selecting a store name from a pull-down menu as described with reference to FIG. 13 may be used. The store information may not be received. Alternatively, the store information may not be received in some of the plurality of modes.

The reception process of the store information by the store reception unit 102 is not limited to the processing after the mode reception process by the mode reception unit 101. For example, before the mode reception processing by the mode reception unit 101, the store may be selected in advance by the operation by the store clerk in the store mobile terminal device 10. When the store is selected once, the store reception unit 102 may not newly receive the selection of the store unless there is a predetermined trigger. Examples of the predetermined trigger include when the store mobile terminal device 10 is reactivated or activated, and when a movement of a predetermined distance or more from the store occurs.

Next, for example, in the case of the self-scan mode, after receiving the store information, the display unit 1010 may display a screen (not illustrated) in a state where the product information is not registered in the product registration list as the initial screen.

In the store clerk mode (pre-handling mode or emergency mode), the list generation unit 112 of POS server 11 assigns a customer ID to a new customer, and newly generates a purchase product list. Then, the display unit 1010 may display a screen (not illustrated) in a state where the product information is not registered in the product registration list as the initial screen. The list generation unit 112 may assign a customer ID to a new customer immediately before the display of the initial screen by the display unit 1010 and newly generate a purchase product list in the customer mode, as in the store clerk mode, in addition to at the timing when the information about the customer ID is received.

<Flowchart Related to Mode Reception>

Figure 14:
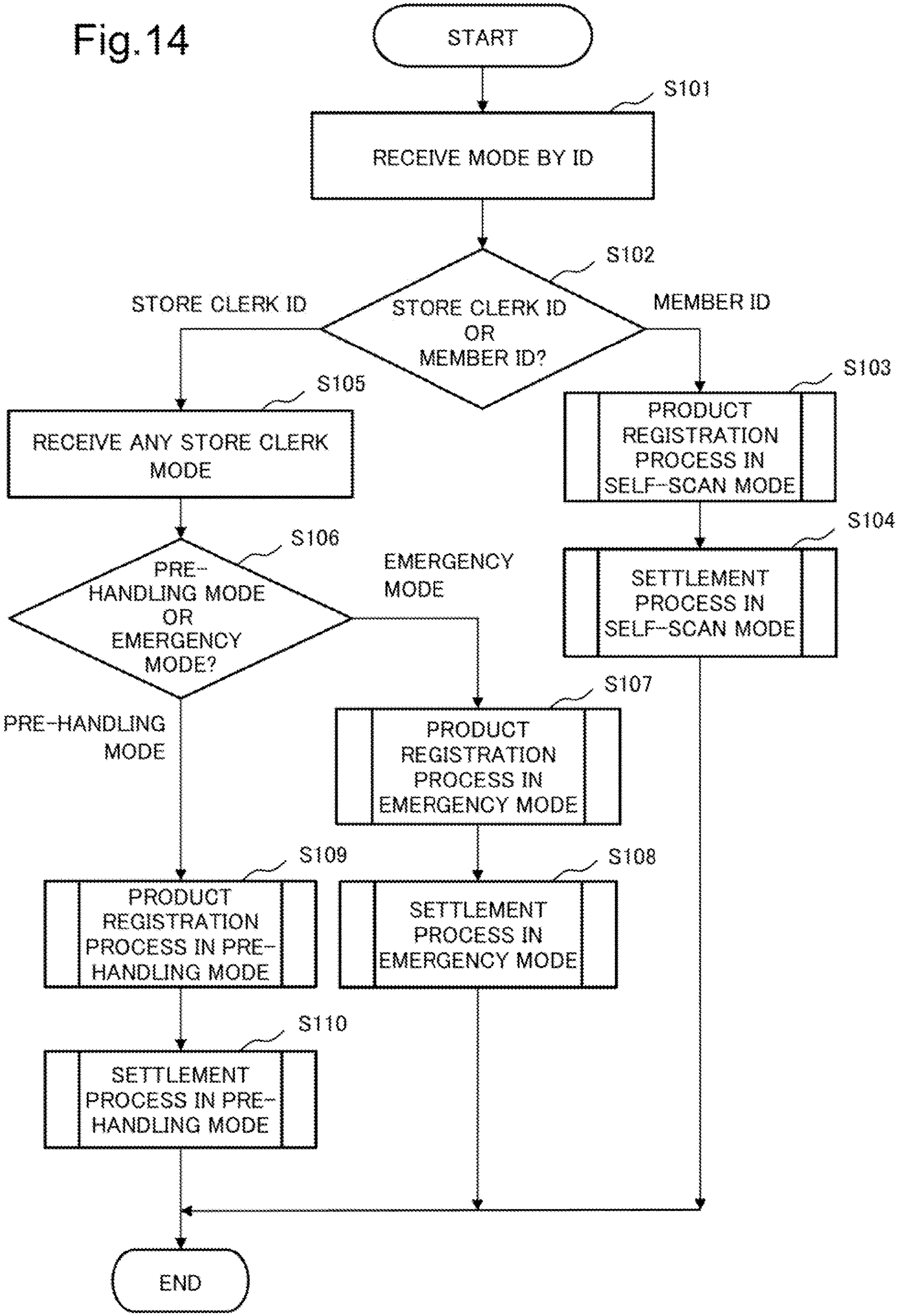
FIG. 14 is a flowchart illustrating an operation example of a system according to the first example embodiment.

A flow of processing up to before the product registration process and the settlement process will be described in detail with reference to FIG. 14. The product registration process is a process of registering product information about a product to be purchased by a customer in a purchase product list. The settlement process is a process of making a settlement based on the product information registered in the purchase product list. The flow illustrated in FIG. 14 includes steps of the product registration process and the settlement process, and detailed description of each step will be described later. FIG. 14 is a flowchart illustrating an operation example of a system 1 according to the first example embodiment. In FIG. 14, the mode reception unit 101 receives the mode based on the information about the ID of the operator (user) (step S101). Next, the mode reception unit 101 determines whether the information about the received user ID is information about the store clerk ID or information about the member ID (step S102). In step S102, when the determination indicates the information about the member ID (step S102: member ID), it is assumed that the mode reception unit 101 receives the customer mode. When the determination indicates the information about the store clerk ID (step S102: store clerk ID), it is assumed that the mode reception unit 101 receives the store clerk mode.

When the customer mode is received (step S102: member ID), the system 1 performs the product registration process in the self-scan mode (step S103), and then, the system 1 performs a settlement process in the self-scan mode (step S104). After step S104, the system 1 ends the operation of the flow. In the customer mode (self-scan mode), the system 1 may return to step S101 after step S104.

When the store clerk mode is received (step S102: store clerk ID), the mode reception unit 101 receives the store clerk mode in either the pre-handling mode or the emergency mode (step S105). The mode reception unit 101 determines whether the pre-handling mode or the emergency mode is set (step S106). When the determination indicates the emergency mode (step S106: emergency mode), the system 1 performs a product registration process in the emergency mode (step S107). Then, the system 1 performs a settlement process in the emergency mode (step S108). After step S108, the system 1 ends the operation of the flow. In the case of the emergency mode, after step S108, the system 1 may return to step S101 or may return to step S107. In the case of returning to step S107, the list generation unit 112 assigns a customer ID to a new customer and newly generates a purchase product list. Then, the display unit 1010 may display a screen (not illustrated) in a state where the product information is not registered in the product registration list as the initial screen.

When the determination indicates the pre-handling mode (step S106: pre-handling mode), the system 1 performs the product registration process in the pre-handling mode (step S109). The system 1 performs a settlement process in the pre-handling mode (step S110). After step S110, the system 1 ends the operation of the flow. In the case of the pre-handling mode, after step S110, the system 1 may return to step S101 or may return to step S109. In the case of returning to step S109, the list generation unit 112 assigns a customer ID to a new customer and newly generates a purchase product list. Then, the display unit 1010 may display a screen (not illustrated) in a state where the product information is not registered in the product registration list as the initial screen. In the pre-handling mode, the timing of assigning the customer ID to the new customer is not limited thereto, and can be variously changed according to each settlement process to be described later.

A mode reception method is not particularly limited. For example, in step S101, the mode reception unit 101 receives the mode based on the ID information, but the present disclosure is not limited thereto. For example, the mode reception unit 101 may receive selection as to whether the user is a store clerk or a customer on a selection screen or the like. Then, in step S102, the mode reception unit 101 may determine which selection has been received. For example, when the selection of the customer is received in step S102, it is assumed that the mode reception unit 101 receives the customer mode (step S102: member ID). For example, when receiving the selection of the store clerk in step S102, it is assumed that the mode reception unit 101 receives the store clerk mode (step S102: store clerk ID).

Instead of steps S101, S102, and S105, the mode reception unit 101 may receive the mode from the screen d001 as illustrated in FIG. 9. Then, when the customer mode is received, the system 1 advances the process to step S103. When the emergency mode is received, the system 1 advances the process to step S107. When the pre-handling mode is received, the system 1 advances the process to step S109.

As described above, a flowchart of the product registration process and the settlement process in each mode in FIG. 14 will be described in detail in each mode.

Next, the product registration and the settlement in each mode will be described.

<Product Registration Process in Self-Scan Mode>

In the self-scan mode, the product information acquisition unit 103 acquires the product information about the product to be purchased by the customer by the operation by the customer. The product information to be acquired here may be product ID information. The product information to be acquired may be product image data or information about feature amount obtained from the product image data. The product information to be acquired is not limited thereto. The product information to be acquired may be any information as long as the product information can uniquely identify the product to be purchased by the customer. Examples of the method of acquiring the product information include various examples such as reading of a product code which is information about a product ID, identification by an image, and reading of a tag. The acquisition method is not particularly limited.

The product information acquisition unit 103 acquires the product information by reading the product code via the reading device, for example. The reading device is not particularly limited. The reading device is, for example, an imaging device included in the store mobile terminal device 10. Examples of the product code include the JAN code described above. The product code is represented by, for example, a number, a character, or a combination thereof. The product code may be encoded into a one-dimensional code such as a barcode, a two-dimensional code, or the like at the time of display. When an encoded code such as a one-dimensional code or a two-dimensional code is read, the product information acquisition unit 103 may read the encoded code and then decode the encoded code. Then, the product information acquisition unit 103 may transmit the combined product code to the list generation unit 112 of the POS server 11. Alternatively, the product information acquisition unit 103 may transmit the read product code to the list generation unit 112 of the POS server 11. Then, the list generation unit 112 may combine the received product code.

The product information acquisition unit 103 acquires the product information, for example, by identifying the product from the image of the product captured by the imaging device of the store mobile terminal device 10. The product information acquisition unit 103 identifies the product by reading an image of the product or an image of a picture of the product captured in advance via the imaging device. As a result, the acquisition unit acquires the product information about the product. The image may include an encoded code such as a one-dimensional code or a two-dimensional code.

The product information acquisition unit 103 may acquire the product information by reading a tag to which a radio frequency identifier (RFID) is attached via a reading device. When RFID is used, the reading device is an RFID reader.

The product information acquisition unit 103 may acquire the product information by selecting the product information from the product search result. For example, a product search method is not particularly limited. The product search may be performed by characters. The product search may be performed by the image. More specifically, for example, the product information acquisition unit 103 may acquire the product information by selecting a product to be purchased by the customer from the displayed image of the product.

The product information acquisition unit 103 may acquire the product information by receiving an input of a product code represented by a number or a character via the input device. Examples of the input device include a touch panel display and a keyboard capable of inputting numbers and characters.

Figure 15:
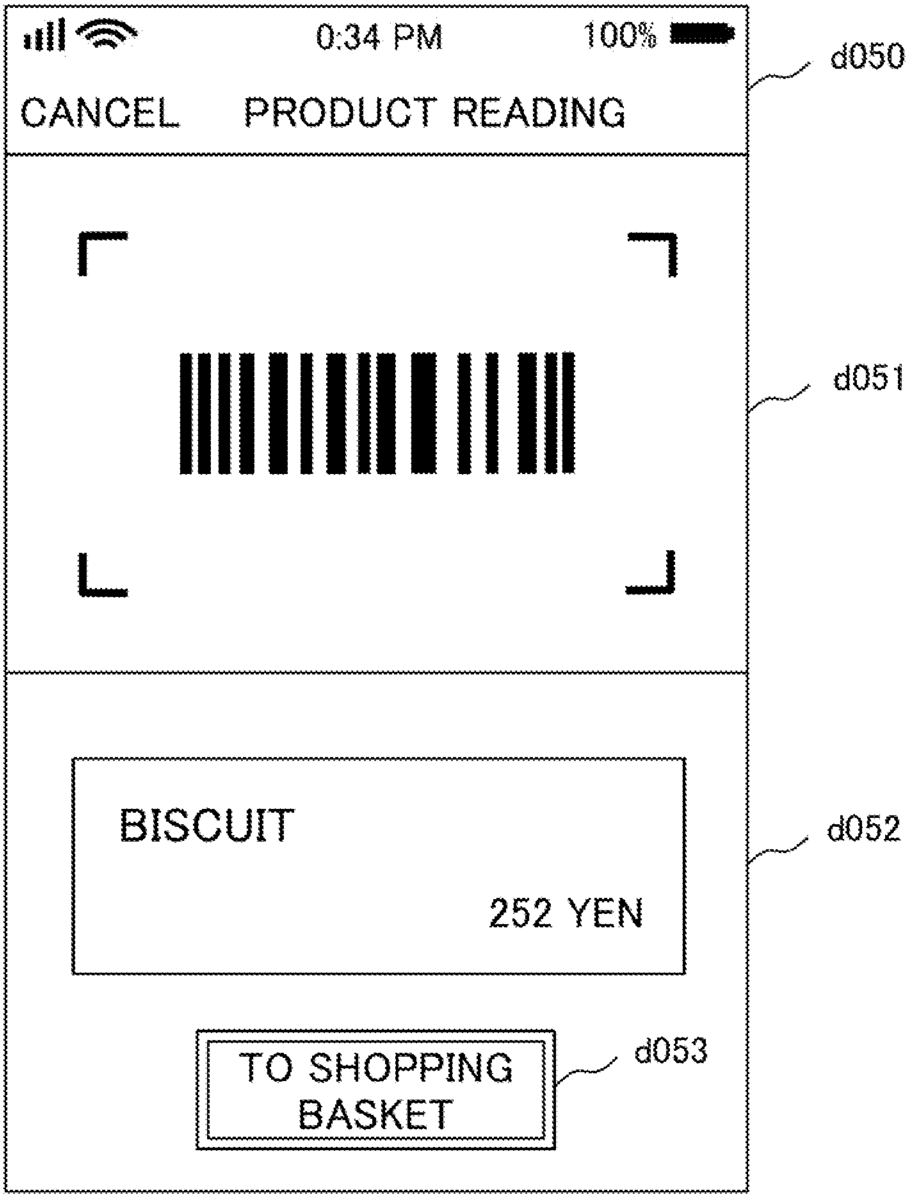
FIG. 15 is an explanatory diagram illustrating an example of reading a product code.

A product information registration process will be described in detail using an example of reading a product code attached to a product. FIG. 15 is an explanatory diagram illustrating an example of reading a product code. When the product information acquisition unit 103 reads the product code (product ID information) via the imaging device of the mobile terminal device 10, for example, the display unit 1010 displays a screen d050 where the product code can be read. For example, the screen d050 includes a reading portion d051, a display field d052 for displaying information about the read product, and a button d053 displaying "to shopping basket" for registering the product information.

In the display field d052, the name, price, and the like of the product are displayed. The display field d052 has different display contents before and after the product ID information is read. Before the product ID information is read, nothing is displayed in the display field d052. After the product ID information is read, the name and price of the product related to the read display ID information are displayed in the display field d052. Processing from when the information about the product ID is read until when the name and the price of the product are displayed in the display field d052 and the product information is registered in the purchase product list will be described. When the product ID information is read by the reading portion d051, the product information acquisition unit 103 transmits the read product ID information to the POS server 11. The list generation unit 112 of the POS server 11 may transmit the name and the price of the product related to the received product ID information to the customer mobile terminal device 12. Then, the display unit 1010 displays the name, price, and the like of the product in the display field d052. In the display field d052 illustrated in FIG. 15, a biscuit is displayed as the name of the product, and 252 yen is displayed as the price of the product.

Then, when the button d053 is tapped, the product information acquisition unit 103 transmits a request for registration of the product information to the POS server 11. For example, in addition to the product information, the registration request may include information about an ID of a customer, information about an ID of the store mobile terminal device 10, and the like. The list generation unit 112 of the POS server 11 updates the purchase product list based on each piece of the received information. That is, the list generation unit 112 functions as a registration unit that registers the product information. Then, the display unit 1010 may display the product information registered in the purchase product list together with the information indicating the customer mode.

Figure 16:
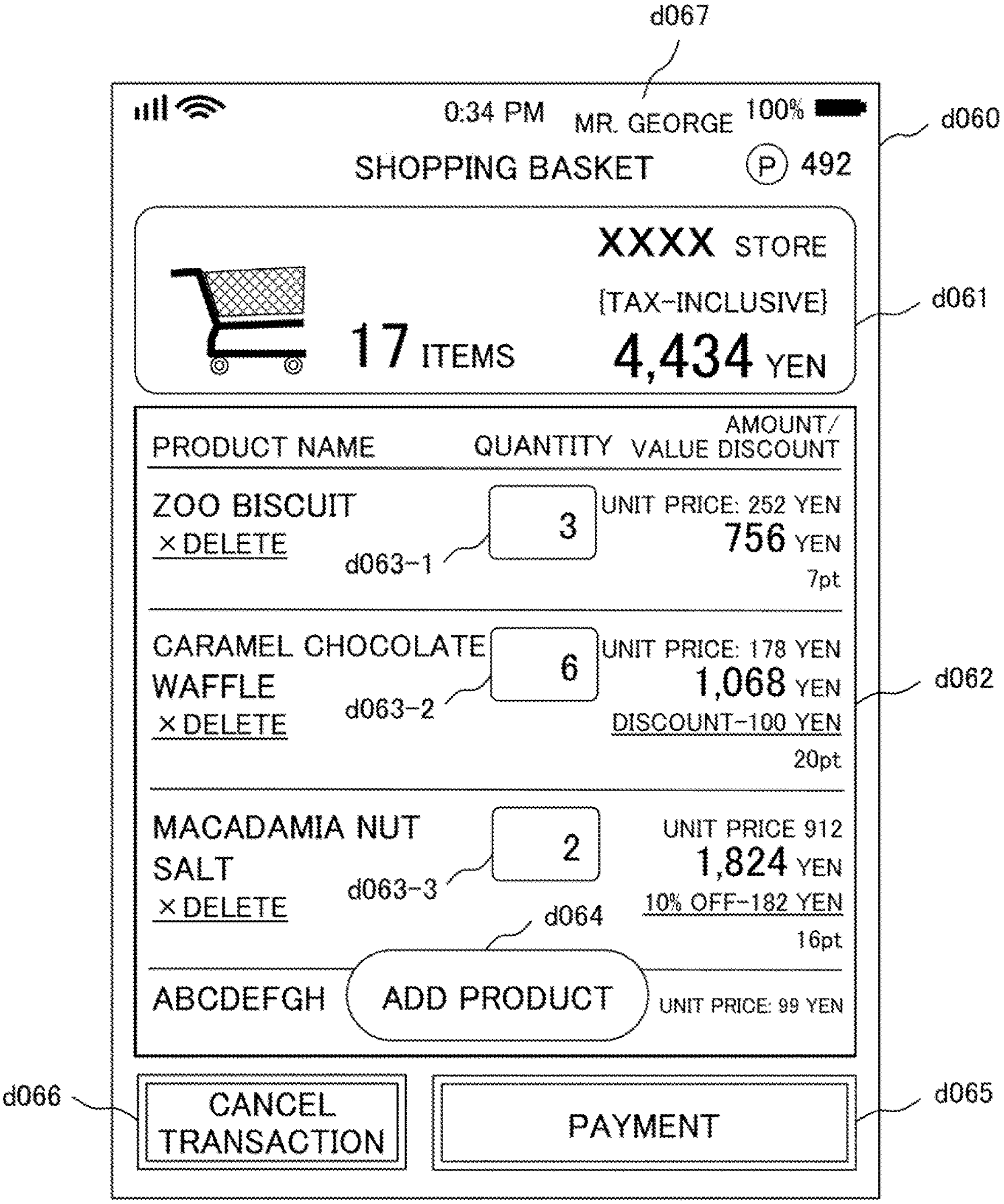
FIG. 16 is an explanatory diagram illustrating a display example of a purchase product list.

FIG. 16 is an explanatory diagram illustrating a display example of a purchase product list. The display unit 1010 displays a screen d060 related to the received purchase product list. The screen d060 includes, for example, an outline field d061 of the purchase product list, a detail field d062, a product addition button d064, a payment button d065, a transaction cancel button d066, and a name display field d067 of the operator. In the outline field d061, for example, information such as the tax-inclusive total quantity of products registered in the purchase product list, the total purchase price, and the store name is displayed. In the detail field d062, for example, information such as the name of the product registered in the purchase product list, the purchase quantity, the unit price, the discount rate, and the discount amount is displayed for each product. For example, the detail field d062 may have an input field d063 of the purchase quantity for each product. In the detail field d062, for example, the product information may be displayed in descending order of registration. In the detail field d062, for example, the display order of the product information may be specifiable.

When the input field d063 of the purchase quantity is tapped, the display unit 1010 may display a screen (not illustrated) where a number can be selected to be superimposed on part or all of the screen d060. Then, the quantity reception unit 104 receives the selected number as the purchase quantity. The quantity reception unit 104 transmits the received purchase quantity to the POS server 11. Then, the list generation unit 112 of the POS server 11 updates the purchase product list according to the received purchase quantity. List generation unit 112 transmits the updated purchase product list to store mobile terminal device 10. Then, the display unit 1010 displays the purchase product list in which the purchase quantity has been updated. A method of changing the purchase quantity is not particularly limited. For example, although not illustrated, an input field capable of inputting the purchase quantity may be provided on the screen d060 where the product code as illustrated in FIG. 15 can be read.

When the product addition button d064 is pressed on the screen d060 in FIG. 16, the display unit 1010 may display the screen d050 where a product code as illustrated in FIG. 15 can be read.

When the transaction cancel button d066 is pressed, the transaction is canceled, and the display unit 1010 may display the screen d001 for receiving a mode as illustrated in FIG. 9 or the screen d010 for receiving an ID and a password as illustrated in FIG. 10.

In FIG. 16, when the payment button d065 is pressed, the store mobile terminal device 10 shifts the process to a settlement process. The settlement process will be described later.

In the name display field d067, the name of the customer who is the user is displayed. When the member ID (customer identification information) is received, the name of the customer can be displayed in the name display field d067. For example, when the member ID is received as in the screen d010 illustrated in FIG. 10, the name display field d067 may be provided. When the member ID is not received as in the screen d001 illustrated in FIG. 9, the name display field d067 may not be included in the screen d060, or the name display field d067 may be blank. The name of the customer is identified from a member DB 116 by the information about the member ID described above. In the name display field, a title of respect that is not used for the store clerk mode may be added to the name in such a way that the store clerk can recognize at a glance that the mode of the store mobile terminal device 10 is the self-scan mode. For example, the display unit 1010 may add a title of respect or the like to the name of a customer such as Mr. or Ms. When the name or the like is input without receiving the member ID, the input name may be displayed in the name display field d067.

In order to make it possible to determine that the mode is the self-scan mode, the display unit 1010 may cause the background color of the screen d060 to be different from the background color of the screen of the purchase product list in the store clerk mode. The display unit 1010 may display information indicating the self-scan mode on the screen d060. The type of information indicating the self-scan mode is not particularly limited. For example, the information indicating the self-scan mode may be information about a picture, a character, a number, a color, or a combination thereof. The display unit 1010 may similarly display information indicating the self-scan mode on each screen to be used in the self-scan mode.

The screen d060 may include information about points included in the member DB 115. The screen d060 may include information such as a remaining battery level and time.

<Flowchart of Product Registration Process in Self-Scan Mode>

Figure 17:
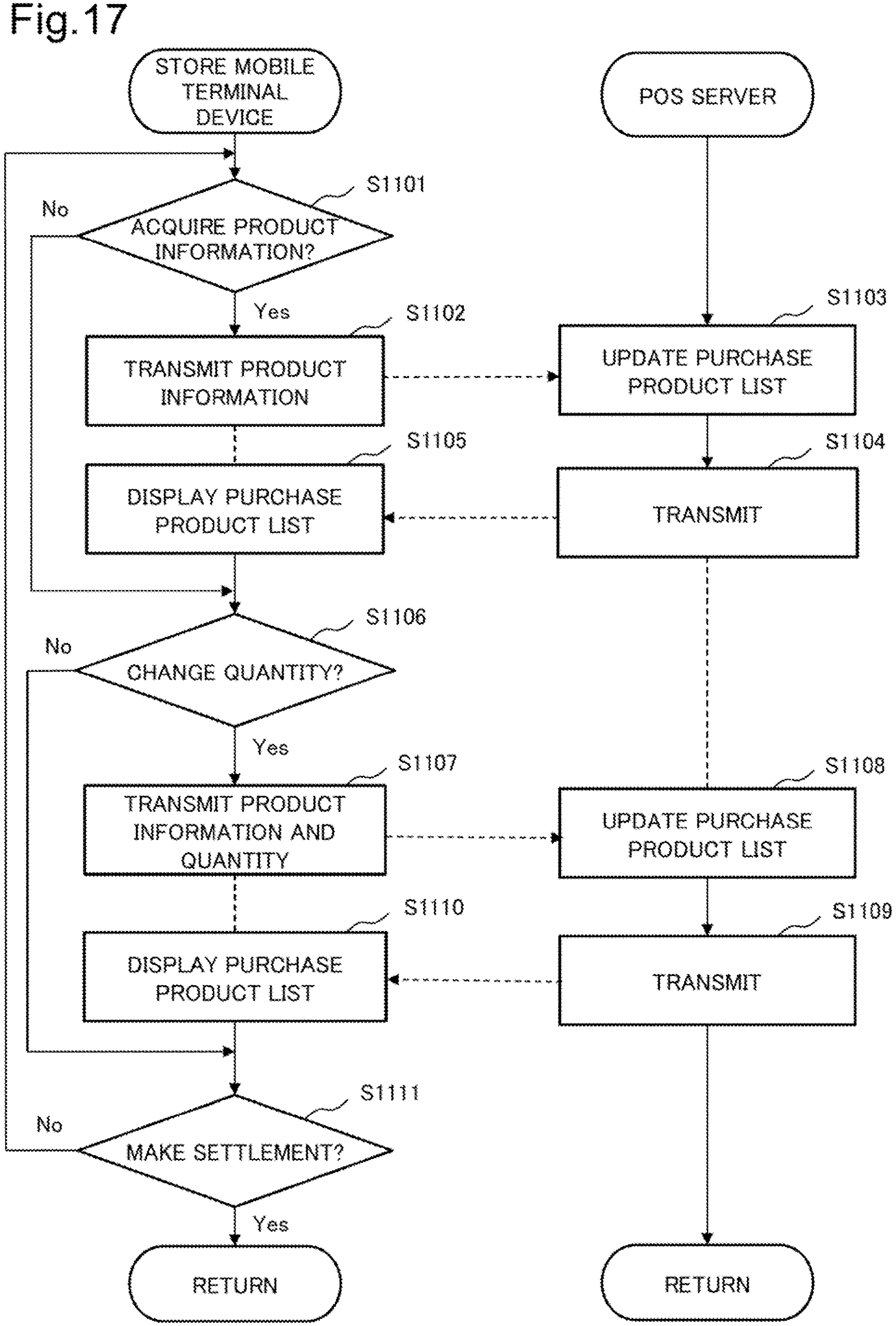
FIG. 17 is a flowchart illustrating an example of a product registration process.

FIG. 17 is a flowchart illustrating an example of a product registration process. In FIG. 17, the operator of each process is a customer. The product registration process here is a product registration process in the self-scan mode in step S103 illustrated in FIG. 14. The product information acquisition unit 103 determines whether the product information has been acquired (step S1101). In step S1101, the product information acquisition unit 103 acquires the product information by reading the product code by the imaging device or the like. As described above, the product information here is not particularly limited. The product information to be acquired here may be product ID information. Alternatively, the product information may be product image data or information about feature amount obtained from the product image data. In step S1101, in FIG. 17, product information acquisition unit 103 may determine whether the product information is acquired and the button d053 displaying "to shopping basket" illustrated in FIG. 15 is displayed is tapped. When the product information is acquired (step S1101: Yes), the product information acquisition unit 103 transmits the product information to the POS server 11 (step S1102). Next, the list generation unit 112 of the POS server 11 updates the purchase product list based on the received product information (step S1103). The list generation unit 112 transmits the purchase product list to the store mobile terminal device (step S1104). The display unit 1010 displays a purchase product list (step S1105).

Next to the case of No in step S1105 or step S1101, the quantity reception unit 104 determines whether a change in the quantity has been received (step S1106). When receiving the change in quantity (step S1106: Yes), the quantity reception unit 104 transmits the product information about the product whose quantity is changed and the received quantity in association with each other (step S1107). The list generation unit 112 updates the purchase product list based on the product information and the quantity (step S1108). List generation unit 112 transmits the updated purchase product list (step S1109). The display unit 1010 displays a purchase product list (step S1110).

Next to the case of No in step S1110 or step S1106, the payment information management unit 107 determines whether the settlement is made (step S1111). In step S1111, for example, it is assumed that when the payment button d065 on the screen d060 illustrated in FIG. 16 is tapped, the payment information management unit 107 receives the settlement process. That is, in step S1111, when the payment button d065 on the screen d060 illustrated in FIG. 16 is tapped, the payment information management unit 107 determines that the settlement is made (step S1111: Yes). In step S1111, when the payment button d065 of the screen d060 illustrated in FIG. 16 is not tapped, the payment information management unit 107 determines that the settlement is not made (step S1111: No). When the settlement is not made (step S1111: No), the store mobile terminal device 10 returns the process to step S1101. On the other hand, when the settlement is made (step S1111: Yes), the store mobile terminal device 10 terminates the product registration process and return. As a result, the process proceeds to the settlement process next to the product registration process illustrated in FIG. 14. As illustrated in FIG. 14, in the case of the self-scan mode, the system 1 advances the process to the settlement process in the self-scan mode (step S104).

The flowchart illustrated in FIG. 17 is an example. For example, the step of acquiring the product information and the step of changing the purchase quantity may be different flowcharts, for example.

<Settlement Process in Self-Scan Mode>

Figure 18:
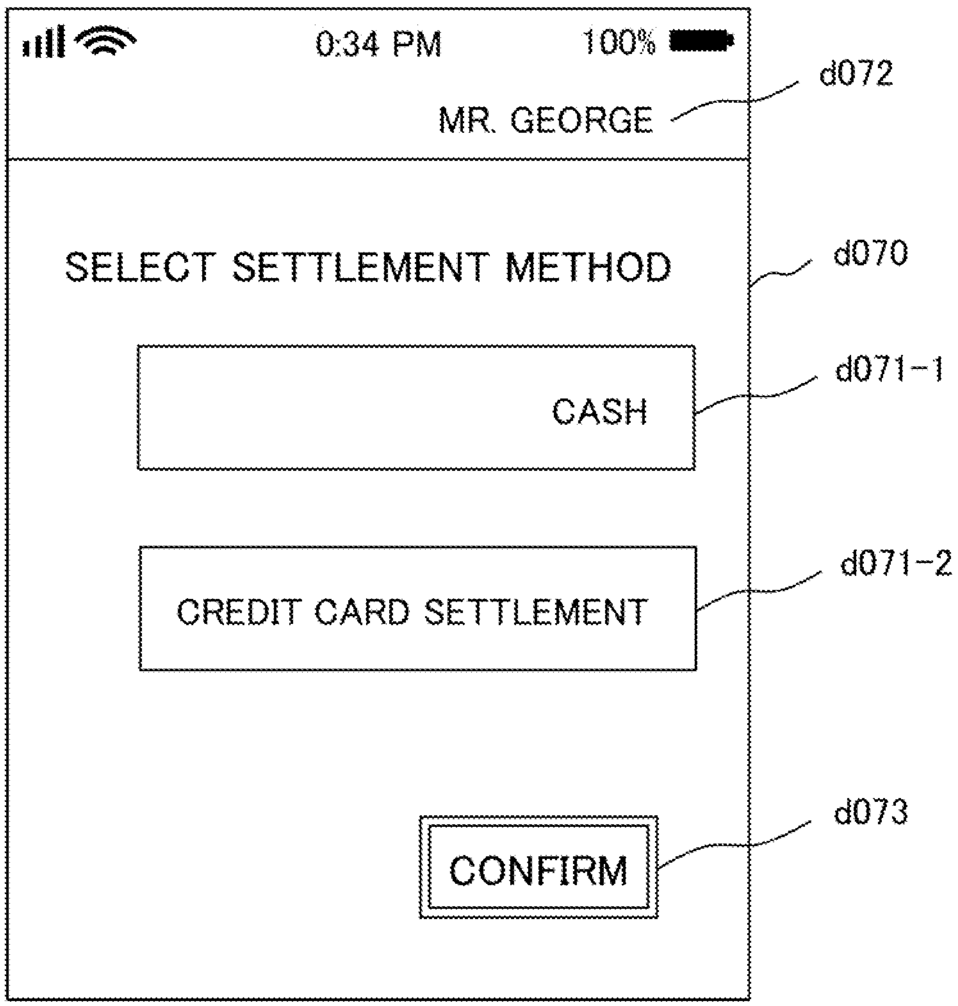
FIG. 18 is an explanatory diagram illustrating an example of selection for a settlement method.

Next, the settlement process in the self-scan mode will be described. In the self-scan mode, the settlement method reception unit 105 receives a settlement method. For example, the settlement method reception unit 105 receives a settlement method among from the cash settlement and the electronic settlement. Examples of the settlement method include the cash settlement and the electronic settlement. As described above, the type of the electronic settlement is not particularly limited. The settlement method reception unit 105 may receive an electronic settlement method from a plurality of the electronic settlement methods. The reception method of the settlement method is not particularly limited. For example, the settlement method reception unit 105 may receive the settlement method by the operator selecting the settlement method from a selection button on the screen. An example of reception of the settlement method will be described with reference to FIG. 18. In the example of FIG. 18, a credit card settlement will be described as an example of the electronic settlement.

FIG. 18 is an explanatory diagram illustrating an example of selection for a settlement method. The display unit 1010 displays a screen d070 capable of receiving selection of a settlement method by the cash settlement or selection of a settlement method by the credit settlement. The screen d070 includes a cash settlement button d071-1 capable of selecting the cash settlement and a credit settlement button d071-2 capable of selecting the credit settlement. Furthermore, the screen d070 may include a confirmation button d073 for confirming the settlement method. The screen d070 may have a display field d072 of the name of the customer.

For example, the display unit 1010 may control the display of the screen d070 in such a way that the color of the tapped button is different from the color of the button before being tapped.

For example, when the confirmation button d073 is tapped after the cash settlement button d071-1 is tapped, the settlement method reception unit 105 receives the cash settlement. On the other hand, when the confirmation button d073 is tapped after the credit settlement button d071-2 is tapped, the settlement method reception unit 105 receives the credit settlement.

Next, in the self-scan mode, for example, in the case of a credit card settlement, the settlement method reception unit 105 further receives selection of a device that makes a settlement. In the self-scan mode, in the case of the cash settlement, the payment device 14 makes a settlement.

Figure 19:
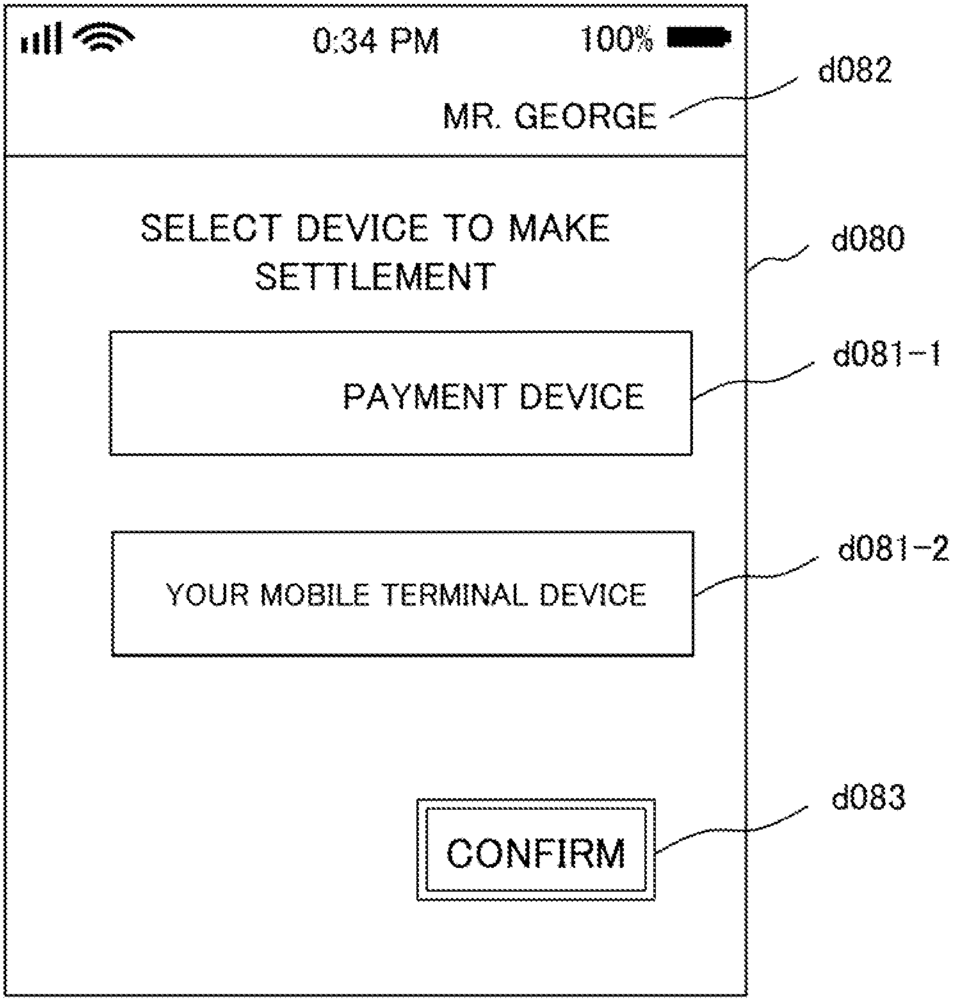
FIG. 19 is an explanatory diagram illustrating an example of receiving selection of a device that makes a settlement.

FIG. 19 is an explanatory diagram illustrating an example of receiving selection of a device that makes a settlement. The display unit 1010 displays a screen d080 capable of receiving selection of a device that makes a settlement. The screen d080 includes, for example, a button d081-1 capable of selecting the payment device 14 and a button d081-2 capable of selecting the customer mobile terminal device 12. Furthermore, the screen d080 may include a confirmation button d083 for confirming selection of a device that makes a settlement. The screen may include a display field d082 of the name of the customer.

When the confirmation button d083 is tapped after the button d081-1 that can select the payment device 14 is tapped, the settlement method reception unit 105 receives a settlement by the payment device 14. When the confirmation button d083 is tapped after the button d081-2 capable of selecting the customer mobile terminal device 12 is tapped, the settlement method reception unit 105 receives a settlement by the customer mobile terminal device 12.

<<Settlement by Payment Device 14>>

First, the settlement by the payment device 14 will be described. The output unit 109 outputs the payment information based on the acquired product information in such a way that the payment device 14 can read the payment information. More specifically, for example, the payment information management unit 107 notifies the POS server 11 of a settlement request for making a settlement by the payment device 14. For example, upon receiving the settlement request, the payment information generation unit 111 of the POS server 11 generates the payment information based on the purchase product list of the customer. The payment information may be encoded at the time of display, for example, in order to be readable by another device. The encoded payment information is referred to as, for example, a payment code. The payment code is not particularly limited. The payment code may be represented by a one-dimensional code such as a barcode or a two-dimensional code. The payment information management unit 107 delivers the generated payment information to the output unit 109 of the store mobile terminal device 10.

The payment information includes at least information for identifying the purchase product list of the customer. The information for identifying the purchase product list is, for example, information about a customer ID. In addition to the information for identifying the purchase product list of the customer, the payment information may further include information about the purchase price. The information about the purchase price includes, for example, information about the total purchase price of the products scheduled to be purchased.

In the settlement by the payment device 14, there are two different settlement procedures according to the information included in the payment information. A settlement procedure A when the payment information includes the purchase price information and a settlement procedure B when the payment information does not include the purchase price information will be described. First, the settlement procedure A will be briefly described. After reading the payment code, the payment device 14 makes a settlement based on the purchase price information included in the payment information. The payment device 14 decrypts the payment code to determine the payment information, and then makes a settlement based on the purchase price information included in the payment information. Then, the payment device 14 makes a notification of the end of the settlement related to the purchase product list based on the information for identifying the purchase product list. Then, the POS server 11 counts sales based on the purchase product list in which the settlement has been completed. Further, the POS server 11 may delete the purchase product list from a purchase product list DB. The description of the settlement procedure A ends.

Next, the settlement procedure B will be briefly described. The payment device 14 reads a payment code which is encoded payment information from the store mobile terminal device 10, and acquires information for identifying a purchase product list. The payment device 14 acquires information for identifying the product purchase list by decoding the payment code and determining the payment information. Then, the payment device 14 transmits a settlement request based on information for identifying the purchase product list to the POS server 11. Then, when receiving the settlement request, the POS server 11 transmits the purchase product list or the purchase price information to the payment device 14. The payment device 14 makes a settlement based on the purchase product list or the purchase price information. Then, the payment device 14 makes a notification of the end of the settlement related to the purchase product list based on the information for identifying the purchase product list. Then, the POS server 11 makes a notification of the end of the settlement related to the purchase product list based on the information for identifying the purchase product list. Then, the POS server 11 counts sales based on the purchase product list in which the settlement has been completed. Further, the POS server 11 may delete the purchase product list from a purchase product list DB. The description of the settlement procedure B ends.

In the following description, the settlement procedure A will be used, but the settlement procedure B may be used.

The payment information for settlement by the payment device 14 may include other information in addition to the information for identifying the purchase product list and the purchase price information. For example, the payment information may include information included in the purchase product list. The information included in the purchase product list is product information about a product and information about a purchase quantity. The product information included in the payment information is, for example, a product ID, a product name, a unit price of a product, and the like. When the information about the member ID is present in the purchase product list, the payment information may include member information (information such as a member name) obtained from the information about the member ID. The payment information may include information about the ID of the store mobile terminal device 10 that has performed the product registration process. The payment information may include, for example, store information about a store serving as a payee. Alternatively, the payment information may include information about a transaction ID. The payment information may include information indicating a mode of the store mobile terminal device 10. The information indicating the mode indicates the self-scan mode. In this way, when the payment information includes the information indicating the operator of the store mobile terminal device 10, the information about the ID of the store mobile terminal device 10, the information indicating the mode, and the like, it is possible to facilitate the analysis of the cause when a trouble occurs at the time of settlement due to the contents of the product registration and the like. The payment information may not include part of the information described above. The payment information may include information other than the above-described information.

The output unit 109 outputs the payment information in such a way that the payment device 14 can read the payment information. The output method is not particularly limited. As described above, for example, the display unit 1010 may display the payment code obtained by encoding the payment information.

Figure 20:
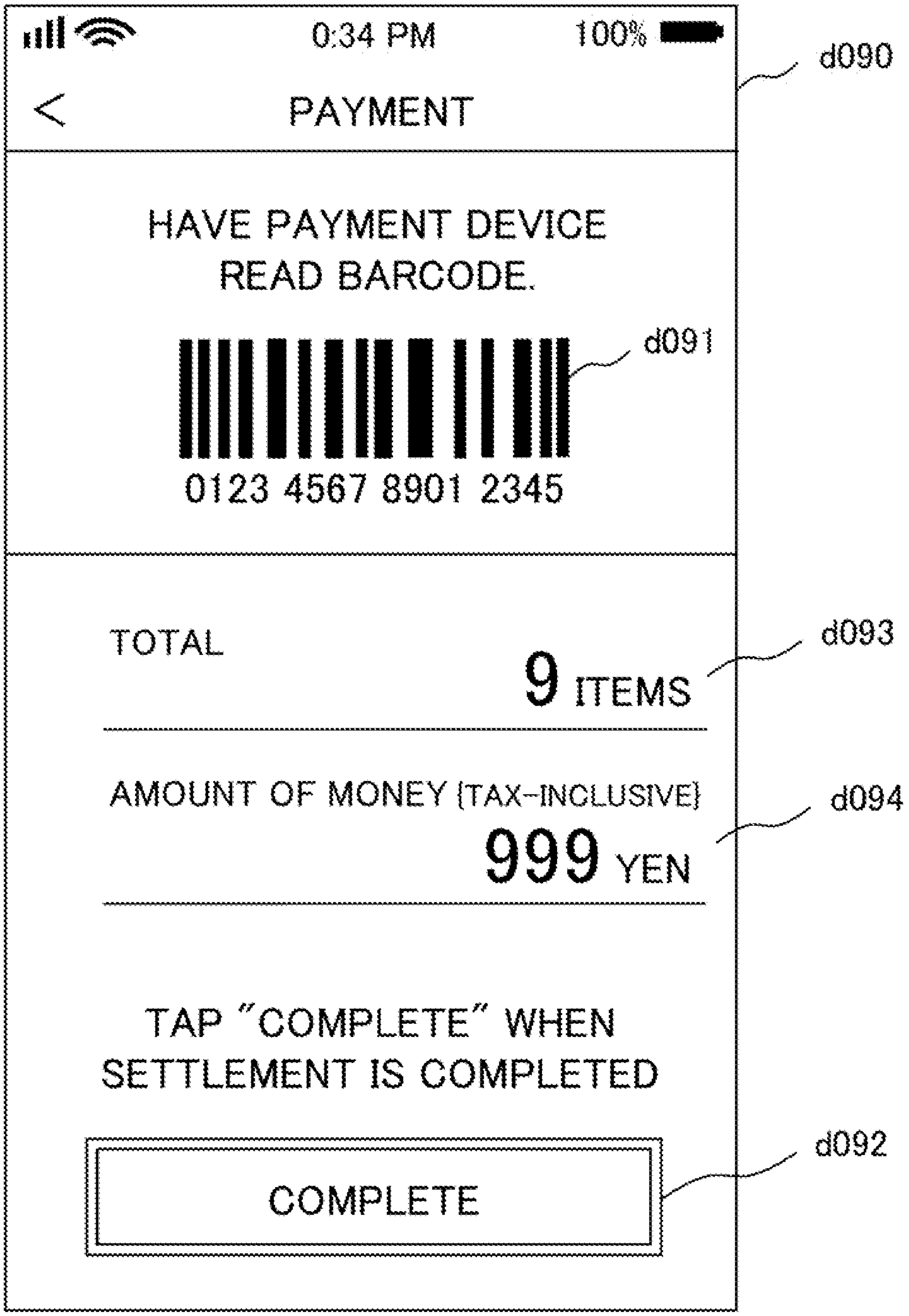
FIG. 20 is an explanatory diagram illustrating a display example of a payment code readable by the payment device.

FIG. 20 is an explanatory diagram illustrating a display example of a payment code readable by the payment device 14. The display unit 1010 displays a screen d090 including a payment code obtained by encoding the payment information. For example, the screen d090 includes a display field d091 of the payment code, a display field d093 of the total quantity, and a display field d094 of the purchase price. The total purchase quantity of the products to be purchased by the customer is displayed in the total quantity display field d093. In the purchase price display field d094, for example, the tax-inclusive total price of the products to be purchased by the customer is displayed. The screen d090 include a completion button d092 that is tapped after the settlement is completed.

For example, the customer brings the store mobile terminal device where the payment code is displayed to the payment device 14. Then, in the case of the manned payment device 14, the reading unit 141 of the payment device 14 reads the payment code by the operation by the store clerk. In the case of the unattended payment device 14, the reading unit 141 of the payment device 14 reads the payment code by the operation by the customer. Then, the settlement unit 142 makes a settlement based on the read payment code. Since the settlement is made by the payment device 14, the settlement method is not particularly limited.

The issuance control unit 143 issues a receipt by the printing device after the settlement is completed. The printing device here may be included, for example, in the payment device 14. Alternatively, the printing device may be, for example, a device connected to the payment device 14 via the communication network 16, such as the printing device 13.

The receipt may include, for example, purchase price information, member information, and information about a store. The purchase price information included in the receipt is information such as product information, a purchase quantity of the product, a discount amount, a discount rate, whether a coupon is used, a total purchase price, a deposit amount, and a change amount. Examples of the product information included in the receipt include information such as a product code, a product name, and a unit price of the product. Examples of the member information included in the receipt include information such as a member ID, a member name, and a point of a customer. The information about the store included in the receipt is, for example, information such as a store name, a store ID, a store address, and a store contact information. Although not illustrated, a DB or the like that manages information about a store may be stored in advance in the POS server 11 or the like. The receipt may include information about the ID of the store mobile terminal device 10 that has performed product registration and information about the ID of the payment device 14. When the payment device 14 is manned, the receipt may include store clerk information related to a store clerk who operates the payment device 14. Examples of the store clerk information include a store clerk ID, a name of the store clerk, and the like. The receipt may include information such as a date and time when settlement is completed. The receipt may include information about an ID of the receipt. The receipt may include information about a transaction ID. The receipt may include information indicating that it is a cash settlement. The information indicating the cash settlement may be, for example, information such as characters or pictures indicating the cash settlement, a deposit amount, and a change amount. The receipt may include information indicating the mode of the store mobile terminal device 10. The information indicating the mode indicates the self-scan mode. In this manner, since the receipt includes the information indicating the operator of each device, the information indicating the mode, and the like, it is possible to facilitate the analysis of the contents of the product registration and the cause when a trouble occurs in the settlement. The receipt may not include part of the information described above. The receipt may include information other than the above-described information.

After completing the settlement, the customer taps the completion button d092 included in the screen d090 of the store mobile terminal device 10 illustrated in FIG. 20. When the completion button d092 is tapped, the display unit 1010 may display the screen d001 illustrated in FIG. 9 or the screen d010 illustrated in FIG. 10 again.

<<Electronic Settlement by Customer Mobile Terminal Device 12>>

Next, an example in which the electronic settlement is made by the customer mobile terminal device 12 will be described. A portable store mobile terminal device such as a smartphone or a tablet may not be connected to a device capable of reading a card such as a credit card, a debit card, or a loyalty card, or a device capable of reading a short-distance wireless communication IC card. According to this electronic settlement, even when the store mobile terminal device 10 does not include a reading means for an electronic settlement, the customer can make the electronic settlement. The output unit 109 outputs the payment information based on the purchase product list in such a way that the customer mobile terminal device 12 can read the payment information. In the electronic settlement by the customer mobile terminal device 12, the payment information includes at least store information about a store serving as a payee and information about a purchase price based on a purchase product list. The payment information in the settlement by the customer mobile terminal device 12 includes store information about the store serving as a payee in addition to the information for identifying the purchase product list, and the payment information in the electronic settlement by the customer mobile terminal device 12 is different from the payment information in the settlement by the payment device 14 described above.

As described in the settlement by the payment device 14, the payment information may include the product information about the product and the information about the purchase quantity. The payment information may include member information such as information about a member ID of a customer who is an operator of the product registration process. The payment information may include information about the ID of the store mobile terminal device 10 that has performed the product registration process. The payment information may include information about a transaction ID. The payment information may include information indicating a mode of the store mobile terminal device 10. The information indicating the mode indicates the self-scan mode. The payment information may not include part of the information described above. The payment information may include information other than the above-described information. For example, the payment information may further include other information depending on the presence or absence of a predetermined application.

A method of outputting the payment information is not particularly limited. For example, the display unit 1010 may display the payment code obtained by encoding the payment information as described above. Then, the reading unit 121 of the customer mobile terminal device 12 reads the payment code. In the case of the screen display by the payment code, the reading unit 121 of the customer mobile terminal device 12 reads the payment code by the imaging device.

A more detailed example will be described. The processing varies depending on the presence or absence of a predetermined application program. Hereinafter, the predetermined application program is referred to as a store application (application for a store). The store application operates in the customer mobile terminal device 12. The store application is, for example, an application program capable of setting settlement information of a customer. As described above, the settlement information of the customer is information related to the electronic settlement of the customer used for the electronic settlement. More specifically, the settlement information is, for example, information for making an electronic settlement by card. In the case of a credit card settlement, the settlement information is, for example, information such as a credit card settlement number, an expiration date, a name, and a security code. In the case of a point settlement, the settlement information is, for example, information about a point settlement number. In the case of a debit settlement, as in the credit settlement, the settlement information is, for example, information such as a debit card number, a name, and an identification number. In the case of an electronic money settlement, the settlement information is, for example, information such as a number and an ID with which electronic money can be associated. For example, the store application can make the registered electronic settlement other than the cash settlement.

Figure 21:
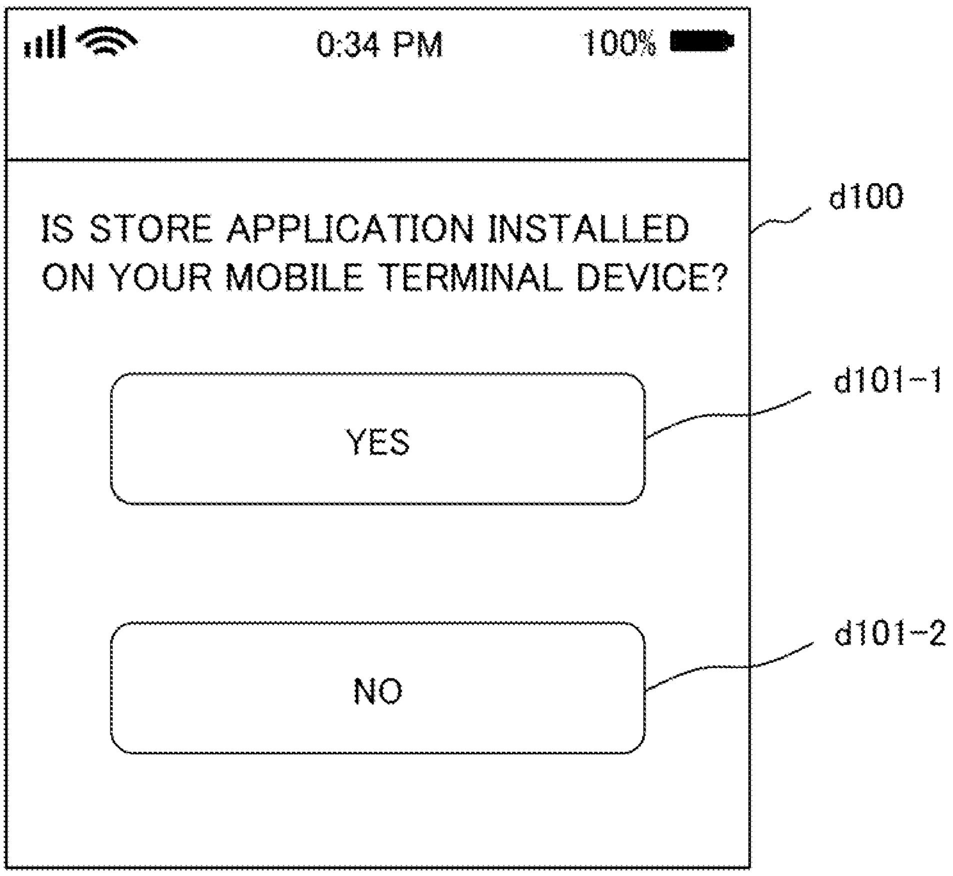
FIG. 21 is an explanatory diagram illustrating an example of the presence or absence reception of a store application.

The application presence/absence reception unit 106 receives the presence or absence of an application for a store. FIG. 21 is an explanatory diagram illustrating an example of the presence or absence reception of a store application. The display unit 1010 displays a screen d100 capable of receiving the presence or absence of the store application. For example, the screen d100 includes a yes button d101-1 for receiving that the store application is present and a no button d101-2 for receiving that the store application is not present.

For example, when the yes button d101-1 is tapped, the application presence/absence reception unit 106 receives that the store application is installed on the customer mobile terminal device 12. For example, when the No button d101-2 is tapped, the application presence/absence reception unit 106 receives that the store application is not installed on the customer mobile terminal device 12.

<<Case where Store Application is not Present in Customer Mobile Terminal Device 12>>

First, a case where the store application is not installed in the customer mobile terminal device 12 will be described.

When the store application is not present in the customer mobile terminal device 12, the payment information further includes information for the customer mobile terminal device 12 to receive an input of the settlement information of the customer. This information is, for example, information about a URL of a page having an input field in which settlement information can be input. This information is referred to as link information. The page here is, for example, an HTML page.

For example, the display unit 1010 displays the payment information in such a way that the customer mobile terminal device 12 can read the payment information. The reading unit 121 of the customer mobile terminal device 12 reads, for example, payment information. When reading the payment information, the settlement unit 122 receives an input of the settlement information of the customer based on the read payment information. The settlement unit 122 makes an electronic settlement using settlement information of the customer and the payment information input to the settlement server 15.

Figure 22:
FIG. 22 is an explanatory diagram illustrating a display example of a payment code.

A credit card settlement will be described in detail as an example. FIG. 22 is an explanatory diagram illustrating a display example of a payment code. Specifically, for example, the display unit 1010 displays a screen d110 including a payment code (two-dimensional code in FIG. 22) obtained by encoding the payment information. The screen d110 includes a display field dill of the payment code (two-dimensional code), a display field d114 of the total purchase quantity, a display field d115 of the total purchase price, and a display field d116 of the payment method. The screen d110 further includes a completion button d112 to be pressed after the settlement is completed, and a button d113 displaying "To shopping basket" for interrupting the payment and returning to the product registration process.

The reading unit 121 of the customer mobile terminal device 12 reads, for example, the payment code (two-dimensional code) displayed in the display field d111. As a result, the settlement information reception unit 125 activates a browser that can browse a page where the settlement information can be input and a request for the settlement server 15 to make a settlement is possible. Then, the settlement information reception unit 125 opens the page of the URL based on the link information by the browser.

Figure 23:
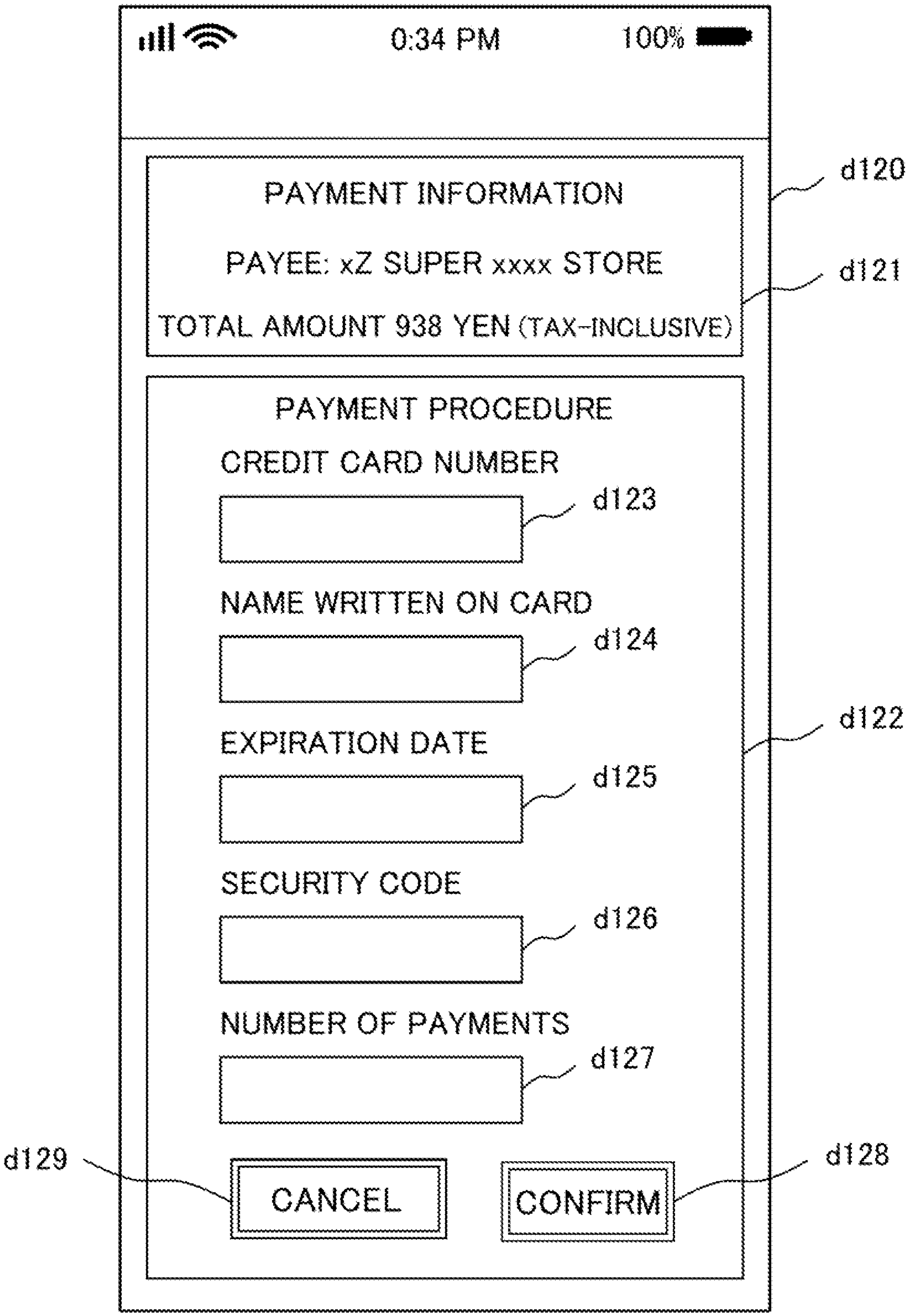
FIG. 23 is an explanatory diagram illustrating a display example of a page to which settlement information can be input.

FIG. 23 is an explanatory diagram illustrating a display example of a page where settlement information can be input. The display unit 1210 of the customer mobile terminal device 12 displays a screen d120 of a page based on the link information. The screen d120 includes, for example, a display field d121 of the use content and a display field d122 of the payment procedure. In the display field d121 of the use content, for example, a name of the store that is a payee, a total purchase price, and the like are displayed. The display field d122 of the payment procedure includes an input field d123 of the credit card number, an input field d124 of the name written on the credit card, an input field d125 of the expiration date of the credit card, an input field d126 of the security code, and an input field d127 of the number of payments. The input field d127 of the number of payments may be a pull-down menu. The screen d120 includes a confirmation button d128 for confirming a credit card settlement and a cancel button d129 for quitting the credit card settlement procedure in the middle.

The settlement information reception unit 125 receives an input to each input field. When the confirmation button is tapped, the settlement unit 122 makes an electronic settlement using the settlement server 15 based on the received settlement information and payment information. Making the electronic settlement by the settlement unit 122 means, for example, requesting the settlement server 15 to perform the electronic settlement.

The method of receiving the settlement information is not limited to the example using the input field of the screen d120. For example, the settlement information reception unit 125 may receive credit information (settlement information) by extracting credit information described in a credit card from an image of the credit card captured by the imaging device.

Figure 24:
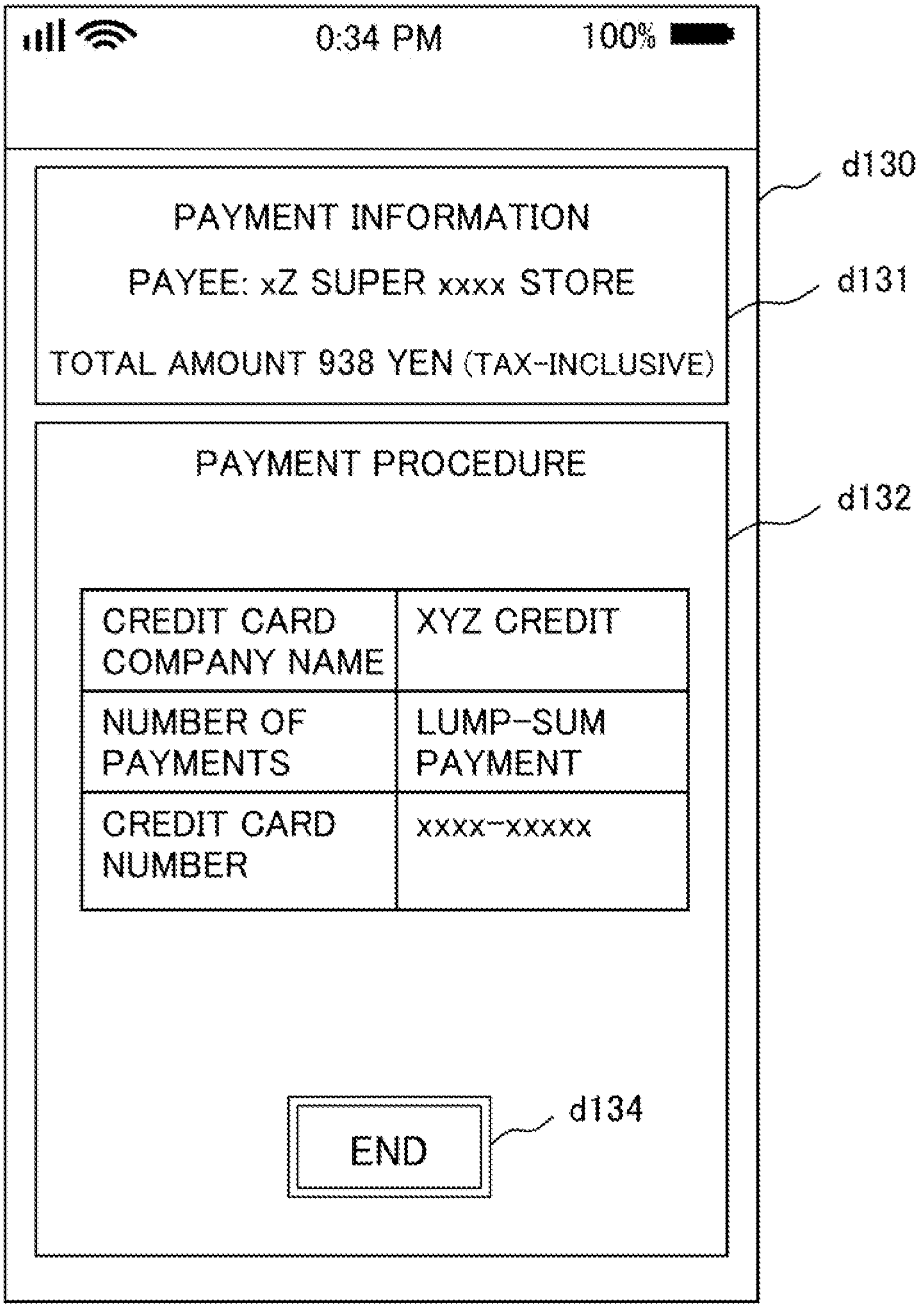
FIG. 24 is an explanatory diagram illustrating a display example of settlement completion.

FIG. 24 is an explanatory diagram illustrating a display example of settlement completion. The display unit 1210 of the customer mobile terminal device 12 displays a screen d130 of completion of the settlement. The screen d130 includes, for example, a display field d131 of the use content and a display field d132 of the payment procedure. As in the example of FIG. 23, the use content display field d131 displays the name of the store as a payee, the total purchase price, and the like. In the payment procedure display field d132, a credit card company name, the number of payments, a credit card number, and the like are displayed.

The screen d130 has an end button d134 for ending the display of the screen d130. When an end button d13 is tapped, the page of the screen d130 ends in the browser.

When the settlement is completed, the completion button d112 illustrated on the screen d110 of the store mobile terminal device 10 illustrated in FIG. 22 is tapped according to the operation by the customer. This completes the electronic settlement when the store application is not present. As a result, even when the store mobile terminal device 10 does not include a reading means for an electronic settlement, a customer can make an electronic settlement.

When the electronic settlement is completed, the issuance control unit 1011 of the store mobile terminal device 10 may issue a receipt by the printing device 13. Specifically, the receipt may include, for example, purchase price information, member information, and information about a store. The information about the purchase price, the member information, and the information about the store included in the receipt may be similar to that in the receipt issued by cash settlement. The receipt may include information about the ID of the store mobile terminal device 10 that has performed product registration. The receipt may include information such as a date and time when settlement is completed. The receipt may include information about an ID of the receipt. The receipt may include information about a transaction ID. The receipt may include information indicating that it is an electronic settlement. The information indicating the electronic settlement is, for example, information such as characters or pictures indicating the settlement method such as the name of the settlement method, and part of the settlement information. The receipt may include information indicating the mode of the store mobile terminal device 10. The information indicating the mode indicates the self-scan mode. The receipt may not include part of the information described above. The receipt may include information other than the above-described information.

<<Case where Store Application is Present in Customer Mobile Terminal Device 12>>

Next, an example in which the store application is present in the customer mobile terminal device 12 will be described. The output unit 109 of the store mobile terminal device 10 outputs the payment information in such a way that the store application can read the payment information. As described above, the payment information includes the store information about the store as a payee and the purchase price information. The payment information may include other information described above. When the store application is present in the customer mobile terminal device 12, since the settlement information is set in the store application or can be registered, the payment information does not need to include information for the customer mobile terminal device 12 to receive the input of the settlement information of the customer. This information is the link information described above. As described above, when the store application is not present in the customer mobile terminal device 12, the payment information includes link information. The method of outputting the payment information may be display of a payment code or the like obtained by encoding the payment information, as in the example of the case where the store application is not present. The screen example may be similar to the screen d110 illustrated in FIG. 22.

The reading unit 121 of the customer mobile terminal device 12 reads the payment information by the store application. That is, the store application is activated in the customer mobile terminal device 12. Then, the store application reads the payment information by the imaging device. Then, the settlement unit 122 makes an electronic settlement by the store application via the settlement server 15 using the settlement information of the customer set in the store application and the read payment information. Although not illustrated, the display unit 1210 may display a screen indicating that the electronic settlement is completed by the store application. The description of the electronic settlement using the customer mobile terminal device 12 ends.

When the electronic settlement is completed, the issuance control unit 1011 of the store mobile terminal device 10 may issue a receipt by the printing device 13. Specifically, the receipt may include information similar to that in the receipt in the case without the store application. The receipt may include information indicating that it is an electronic settlement using the store application.

When the store application can use the printing device 13 of the store, an issuance control unit (not illustrated) of the customer mobile terminal device 12 may issue a receipt by the printing device 13.

In the electronic settlement, there is a case where settlement information of a customer can be input to the store mobile terminal device 10. In such a case, the process similar to that in the case where the store application is not provided in the customer mobile terminal device 12 may be performed by the store mobile terminal device 10. For example, the settlement unit 108 of the store mobile terminal device 10 receives the settlement information of the customer. The display unit 1010 displays the page of the link information described above via, for example, a browser. For example, the display unit 1010 may display a screen similar to the screen d120 illustrated in FIG. 23. Then, the settlement unit 108 makes an electronic settlement via the settlement server 15 based on the settlement information and the payment information received via the browser. The display unit 1010 may display a screen similar to the screen d130 of FIG. 24 as a screen after completion of the settlement.

<Flowchart of Settlement Process in Self-Scan Mode>

Figure 25:
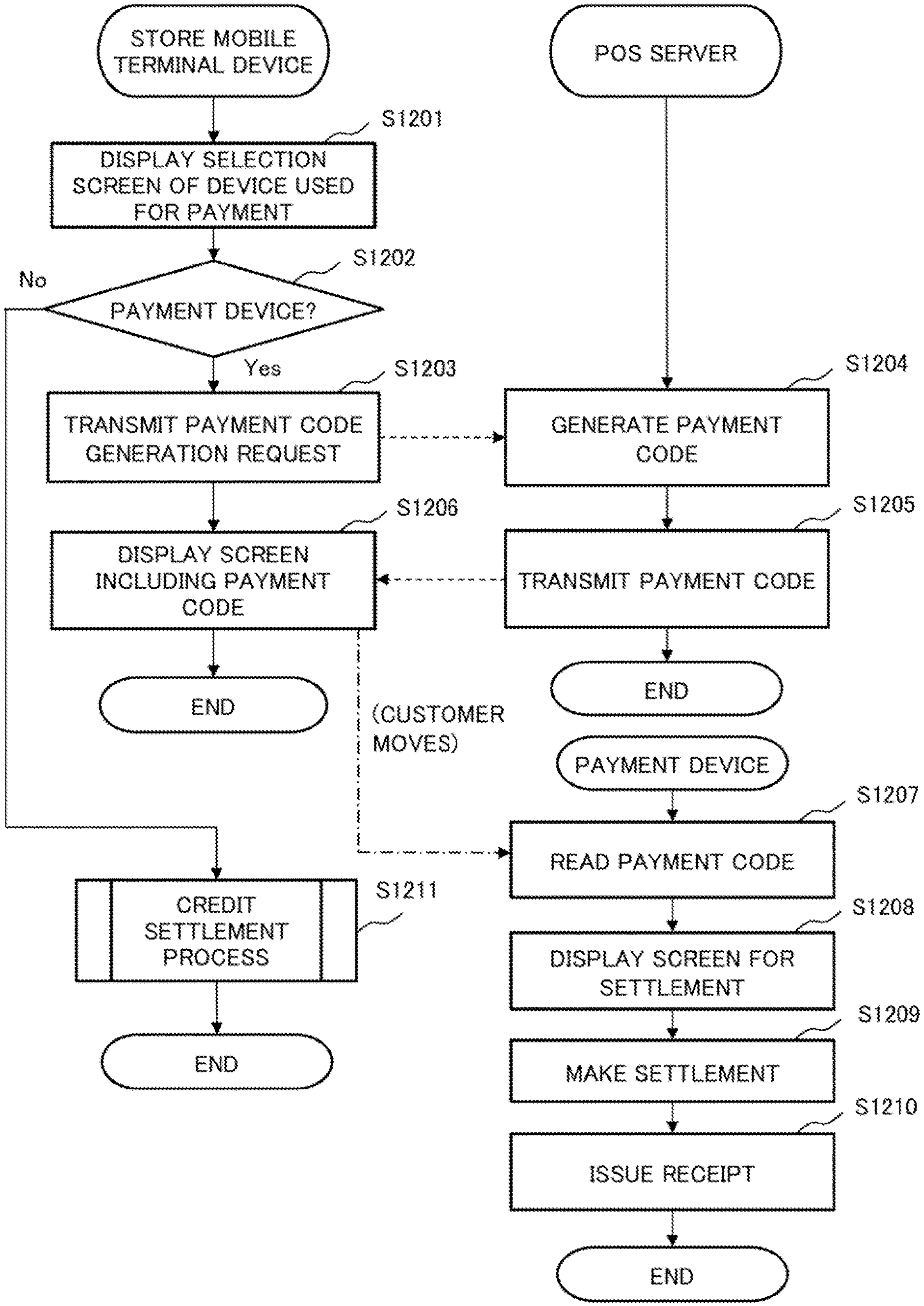
FIG. 25 is a flowchart illustrating a settlement process example in a self-scan mode.

The settlement process in the self-scan mode will be described with reference to FIGS. 25 to 27. The settlement process in the self-scan mode is a settlement process in the self-scan mode in step S104 illustrated in FIG. 14. FIG. 25 is a flowchart illustrating a settlement process example in the self-scan mode. The display unit 1010 displays a screen for selecting a device to be used for payment (step S1201). In step S1201, for example, the display unit 1010 may display the information about the purchase price in the screen for selection for the payment method.

Next, the settlement method reception unit 105 determines whether the device used for payment is the payment device 14 (step S1202). When the device used for payment is the payment device 14 (step S1202: Yes), the payment information management unit 107 transmits a request for generating a payment code (settlement request) to the POS server 11 (step S1203). As described above, the payment code is obtained by encoding the payment information. A description will be given using the above-described settlement procedure A in a case where the payment information includes information about the purchase price. Therefore, the payment information includes at least information for identifying the purchase product list and information about the purchase price, for example. In addition to the above, the payment information may include information about the ID of the store mobile terminal device 10 and information about the member ID of the operator. As described above, the payment information may include other information. The payment information generation unit 111 generates a payment code (step S1204). In step S1204, the payment information generation unit 111 calculates the total purchase price based on the purchase product list. Then, in step S1204, the payment information generation unit 111 generates the payment information. In step S1204, the payment information generation unit 111 encodes the payment information to generate a payment code. The payment information generation unit 111 transmits the payment code to the store mobile terminal device 10 (step S1205). The display unit 1010 displays a screen including the payment code (step S1206). The customer moves with the mobile terminal device 10.

The reading unit 141 of the payment device 14 reads the payment code (step S1207). Next, the display unit 144 displays a screen for settlement based on the read payment code (step S1208). In practice, there is processing such as decoding the payment code, but since it is an existing technology, description thereof is omitted. The screen here is not particularly limited as long as the function of the existing payment device 14 is used. Then, the settlement unit 142 makes a settlement (step S1209). In step S1209, the settlement method is not particularly limited as long as the settlement method available in the existing payment device 14 is used, and is not particularly limited to the cash settlement, the electronic settlement, and the like. The issuance control unit 143 issues a receipt (step S1210), and ends the flow. The information included in the receipt is as described above. The display unit 144 may display the settlement end screen after step S1209.

Although not illustrated, when the settlement is completed, the sales management unit 113 of the POS server 11 updates the sales information based on the settlement details. More specifically, the settlement unit 142 notifies the POS server 11 of the purchase product list for which the settlement has been completed based on the information for identifying the purchase product list included in the payment information and the settlement details. The settlement details may be information indicating which settlement method has been used. Then, the sales management unit 113 updates the sales DB 118 based on the purchase product list for which the settlement has been completed and the settlement details. The list generation unit 112 may delete the purchase product list for which the settlement has been completed from the purchase product list DB 119.

In step S1209, the settlement unit 142 may perform the above-described settlement procedure B when the payment information does not include the purchase price information. That is, the payment information includes at least information for identifying the purchase product list. In step S1209, for example, the settlement unit 142 transmits a settlement request based on information for identifying the purchase product list. Then, in step S1209, upon receiving the settlement request, the payment information generation unit 111 transmits the purchase product list or the purchase price information to the payment device 14. In step S1209, the payment device 14 makes a settlement based on the purchase product list or the purchase price information. Since the processing in the payment device 14 and the processing in the POS server 11 after the settlement are the same as those of the settlement procedure A, the description thereof will be omitted.

On the other hand, when the device used for payment is not the payment device 14 (step S1202: No), the store mobile terminal device 10 performs a credit settlement process (step S1211). When the device is not the payment device 14, for example, the customer mobile terminal device 12 is used for settlement. The settlement using the customer mobile terminal device 12 is an electronic settlement. In step S1211, a credit card settlement is taken as an example of the electronic settlement.

Figure 26:
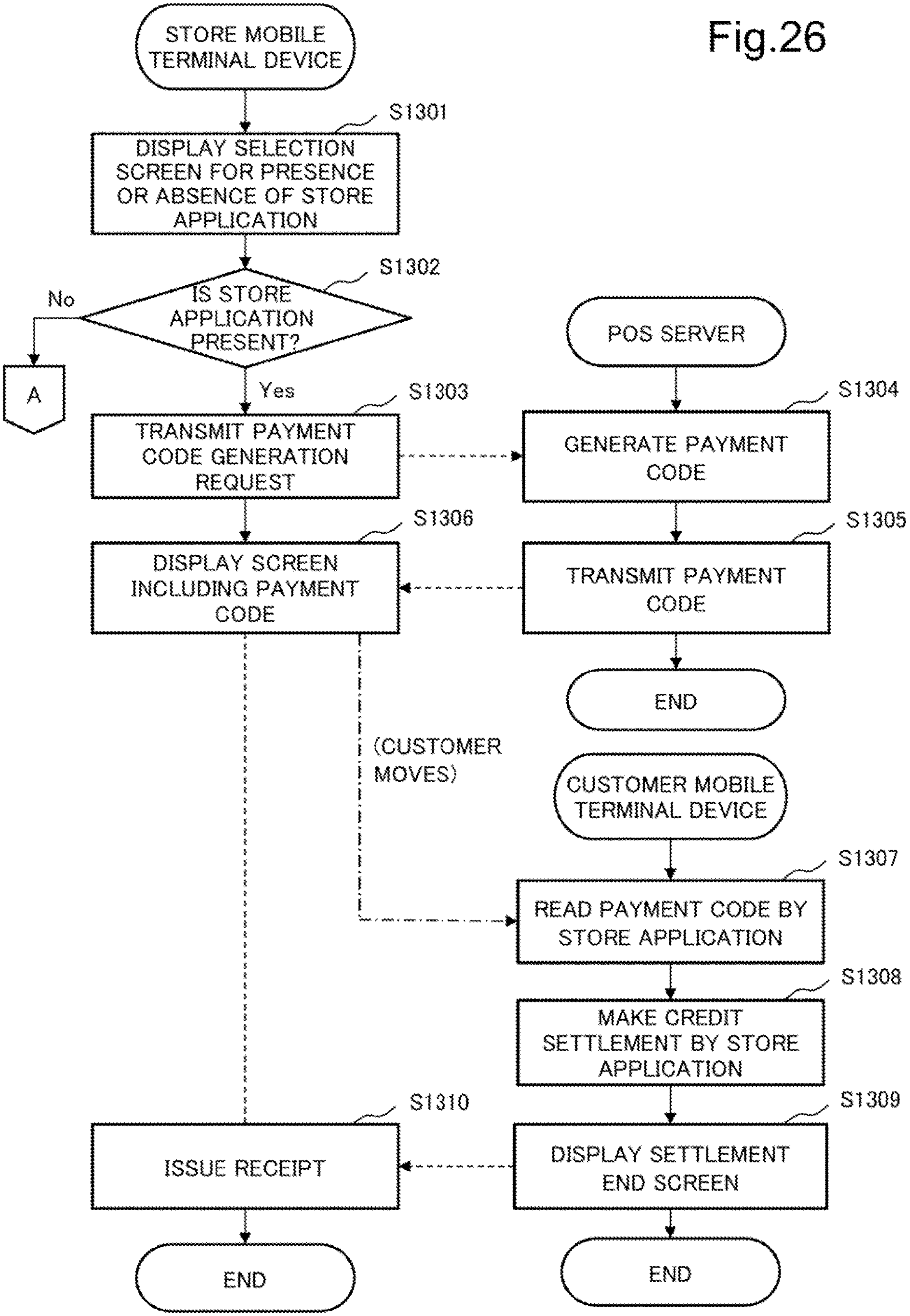
FIG. 26 is a flowchart (26 part 1) illustrating a credit settlement process.
Figure 27:
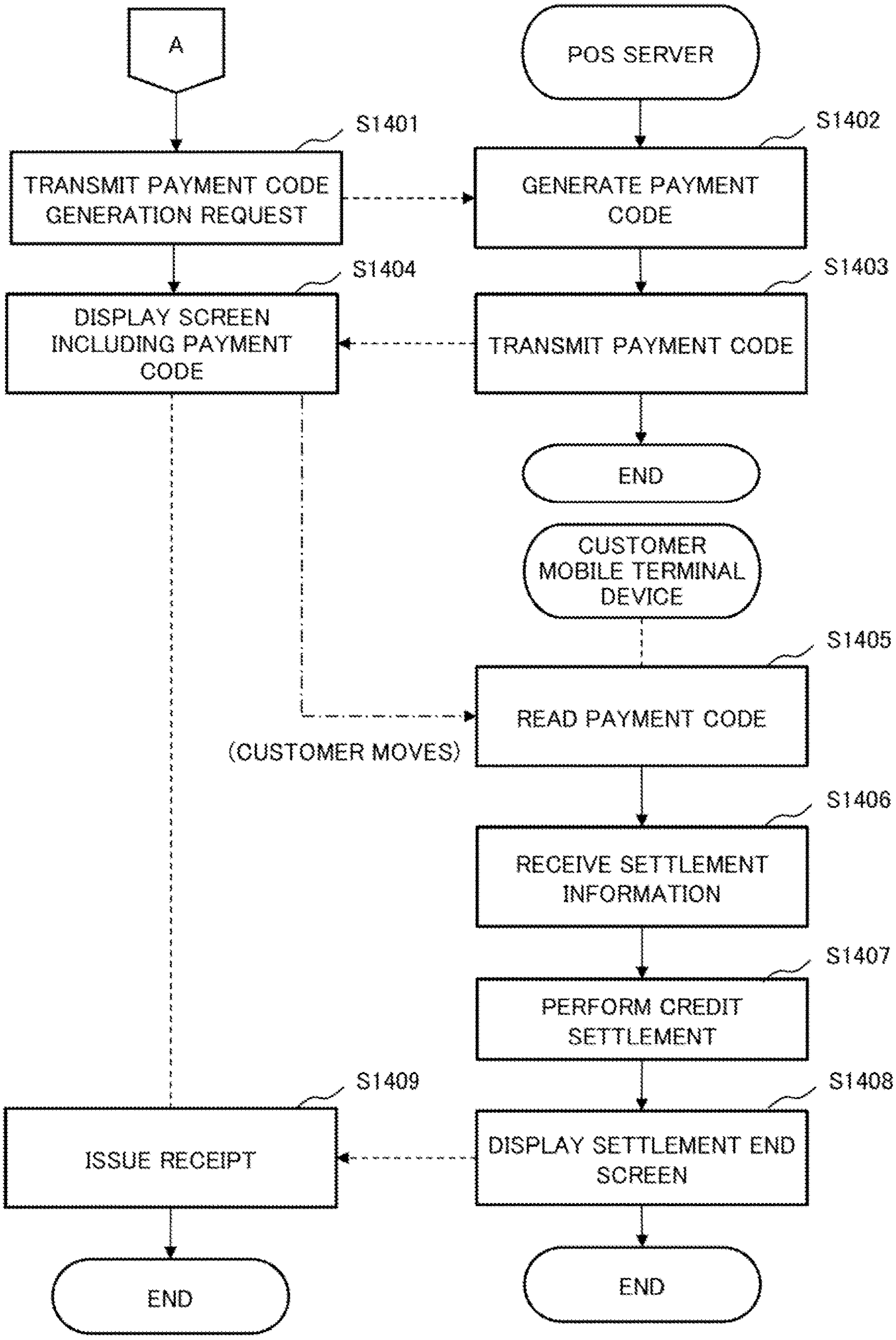
FIG. 27 is a flowchart (27 part 2) illustrating a credit settlement process.

FIGS. 26 and 27 are flowcharts illustrating a credit settlement process. The credit settlement process illustrated in FIGS. 26 and 27 is details of the credit settlement process in step S1211 illustrated in FIG. 25. The display unit 1010 displays a screen for selecting the presence or absence of a store application (step S1301). The application presence/absence reception unit 106 determines whether the store application is present (step S1302). When the store application is present (step S1302: Yes), the payment information management unit 107 transmits a request for generating a payment code (settlement request) (step S1303). The payment information generation unit 111 generates a payment code obtained by encoding the payment information (step S1304). The payment code can be read by the customer mobile terminal device 12. In step S1304, the payment information generation unit 111 calculates a purchase price based on the purchase product list. Then, in step S1304, the payment information generation unit 111 generates the payment information. In step S1304, the payment information generation unit 111 encodes the payment information to generate a payment code. The payment information includes at least purchase price information and payee information, for example. In addition to these pieces of information, the payment information may include member information such as information about the member ID of the operator and information about the ID of the store mobile terminal device 10. Next, the payment information generation unit 111 transmits the generated payment code (step S1305). The display unit 1010 displays a screen for payment including the payment code (step S1306).

The customer mobile terminal device 12 activates the store application by the operation by the customer. The reading unit 121 reads the payment code from the store mobile terminal device 10 using the store application (step S1307). The settlement unit 122 makes a credit settlement using the store application (step S1308). In step S1308, more specifically, the settlement unit 122 makes the credit settlement via the settlement server 15 based on the settlement information set in the store application and the payment code (payment information).

Next, the display unit 1210 displays a settlement end screen (step S1309). When the credit card settlement is completed, the issuance control unit 1011 of the store mobile terminal device 10 issues a receipt by the printing device 13 (step S1310). The information included in the receipt is as described above. Then, the system 1 ends the operation of the flow when the store application is present. Although not illustrated, when the settlement ends, the sales management unit 113 of the POS server 11 updates the sales information based on the settlement details.

On the other hand, when the store application is not present (step S1302: No), the description moves on to FIG. 27, and the payment information management unit 107 transmits a request for generating a payment code (settlement request) (step S1401). The payment information generation unit 111 generates a payment code (step S1402). In step S1402, the payment information generation unit 111 calculates a purchase price. Then, in step S1402, the payment information is generated. Then, the payment information generation unit 111 generates a payment code by encoding the payment information. The payment code can be read by the customer mobile terminal device 12. The payment information when the store application is not present includes, for example, at least purchase price information, payee information, and link information. In addition to these pieces of information, the payment information may include information about the member ID and information about the ID of the mobile terminal device. Next, the payment information generation unit 111 transmits the generated payment code (step S1403). The display unit 1010 displays a screen including the payment code (step S1404).

The reading unit 121 of the customer mobile terminal device 12 reads the payment code from the store mobile terminal device 10 (step S1405). The settlement information reception unit 125 opens a page where the settlement information can be input by the browser based on the link information included in the read payment code. The settlement information reception unit 125 receives the settlement information via the page (step S1406). The settlement unit 122 makes a credit settlement using the settlement server 15 (step S1407). In step S1407, more specifically, the settlement unit 122 makes the credit settlement via the settlement server 15 based on the received settlement information and payment code. The display unit 1210 displays a settlement end screen (step S1408). When the credit card settlement is completed, the issuance control unit 1011 issues a receipt by the printing device 13 (step S1409). The information included in the receipt is as described above. Then, the system 1 ends the operation of the flow when the store application is present. Although not illustrated, when the settlement ends, the sales management unit 113 of the POS server 11 updates the sales information based on the information indicating the purchase product list and the settlement details.

According to this electronic settlement method, even when the store mobile terminal device 10 does not include a reading means for an electronic settlement, a customer can make an electronic settlement according to the presence or absence of a store application of the customer mobile terminal device 12.

The description of the settlement process in the self-scan mode ends.

<Product Registration Process in Emergency Mode>

Next, a product registration process in the emergency mode will be described. In the emergency mode, the product information acquisition unit 103 acquires the information about the product to be purchased by the customer by the operation by the store clerk. A method of acquiring the product information may be similar to that of the product registration process in the self-scan mode except that the operator is a store clerk. As a result, the store mobile terminal device 10 can be utilized as an emergency product registration device operated by the store clerk, such as a BCP countermeasure. The list generation unit 112 of the POS server 11 may update the purchase product list. Then, the display unit 1010 may display the product information registered in the purchase product list together with the information indicating the emergency mode. The type of information indicating the emergency mode is not particularly limited. For example, the information indicating the emergency mode may be information about a picture, a character, a number, a color, or a combination thereof. In each screen in another emergency mode, the display unit 1010 may display information indicating the emergency mode.

Figure 28:
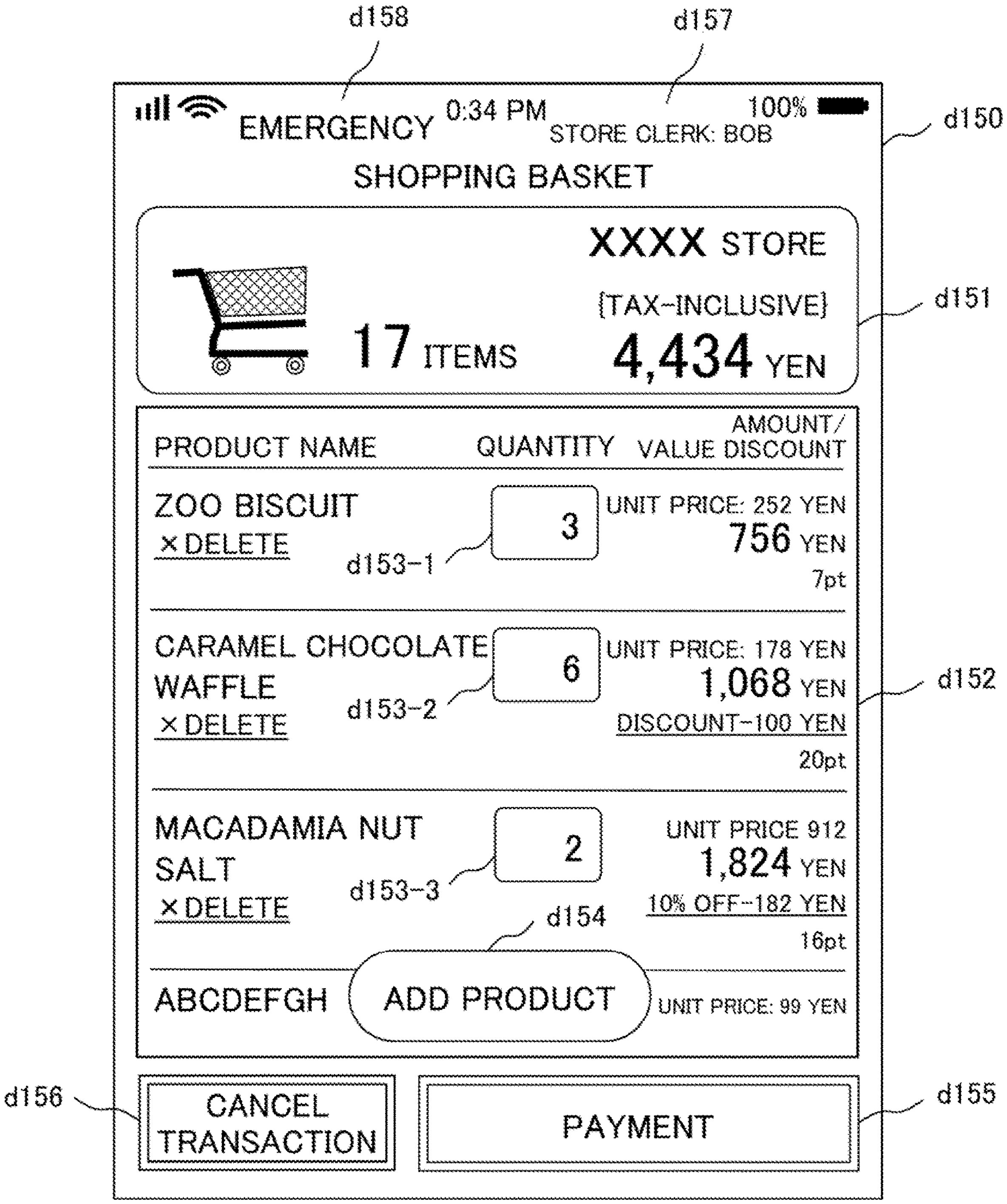
FIG. 28 is an explanatory diagram illustrating an example of a purchase product list in an emergency mode.

FIG. 28 is an explanatory diagram illustrating an example of a purchase product list in the emergency mode. The display unit 1010 displays a screen related to the purchase product list. A screen d150 includes, for example, an outline field d151 and a detail field d152 of the purchase product list, as in the screen in the self-scan mode. Further, the screen d150 includes a product addition button d154, a payment button d155, a transaction cancel button d156, a name display field d157 of a store clerk who is an operator, and an outline field d156 of the mode. Details other than the store clerk name display field d157 and a mode outline field d158 may be similar to those of the screen in the self-scan mode.

The name of the store clerk is displayed in the name display field d157. When the store clerk ID (store clerk identification information) is received, the name of the store clerk can be displayed in the name display field d157. For example, when the store clerk ID is received as in the screen d010 illustrated in FIG. 10, the name display field d157 may be displayed. When the store clerk ID is not received as in the screen d001 illustrated in FIG. 9, the name display field d157 may not be included in the screen d150, or the name display field d157 may be blank. The presence or absence of the title of respect is not limited. The screen d150 of the purchase product list in the emergency mode is different from the screen of the purchase product list in the self-scan mode in that it displays information indicating the emergency mode. In order to distinguish from the self-scan mode, the name of the store clerk may not have a title of respect in the name display field d157. Alternatively, in order to distinguish from the self-scan mode, a title of respect different from a title of respect attached to the name of the customer in the self-scan mode may be used.

In the mode outline field d158, information indicating the emergency mode is displayed on the screen d150. In FIG. 28, characters "emergency" are displayed in a mode outline field d18. For example, the background color of the screen d150 may be set in such a way that the emergency mode can be determined.

<Flowchart of Product Registration Process in Emergency Mode>

The product registration process in the emergency mode is the product registration process illustrated in FIG. 17 (step S107 in FIG. 14). The flowchart of the product registration process in the emergency mode may be the same as the flowchart of the product registration process in the self-scan mode illustrated in FIG. 17 except that the operator is different. Therefore, a detailed description using the drawings is omitted. In the case of the emergency mode, in Yes in step S1111 illustrated in FIG. 17, the store mobile terminal device 10 terminates the product registration process and returns. Therefore, in the case of the emergency mode, the system 1 proceeds to the settlement process (step S108) in the emergency mode next to the product registration process (step S107) illustrated in FIG. 14.

<Settlement Process in Emergency Mode>

Next, the settlement process in the emergency mode will be described. As described above, the emergency mode is for a BCP countermeasure, and it is assumed that the payment device 14 cannot be used. However, the generation processing and the like of the payment information may be performed by the POS server 11.

In the emergency mode, the settlement method reception unit 105 receives selection for a settlement method. Specifically, the settlement method reception unit 105 receives selection of a settlement method by the cash settlement or selection of a settlement method by the electronic settlement. As in the self-scan mode, the method of the electronic settlement is not particularly limited. The settlement method reception unit 105 may receive a settlement method from a plurality of types of the electronic settlement.

Figure 29:
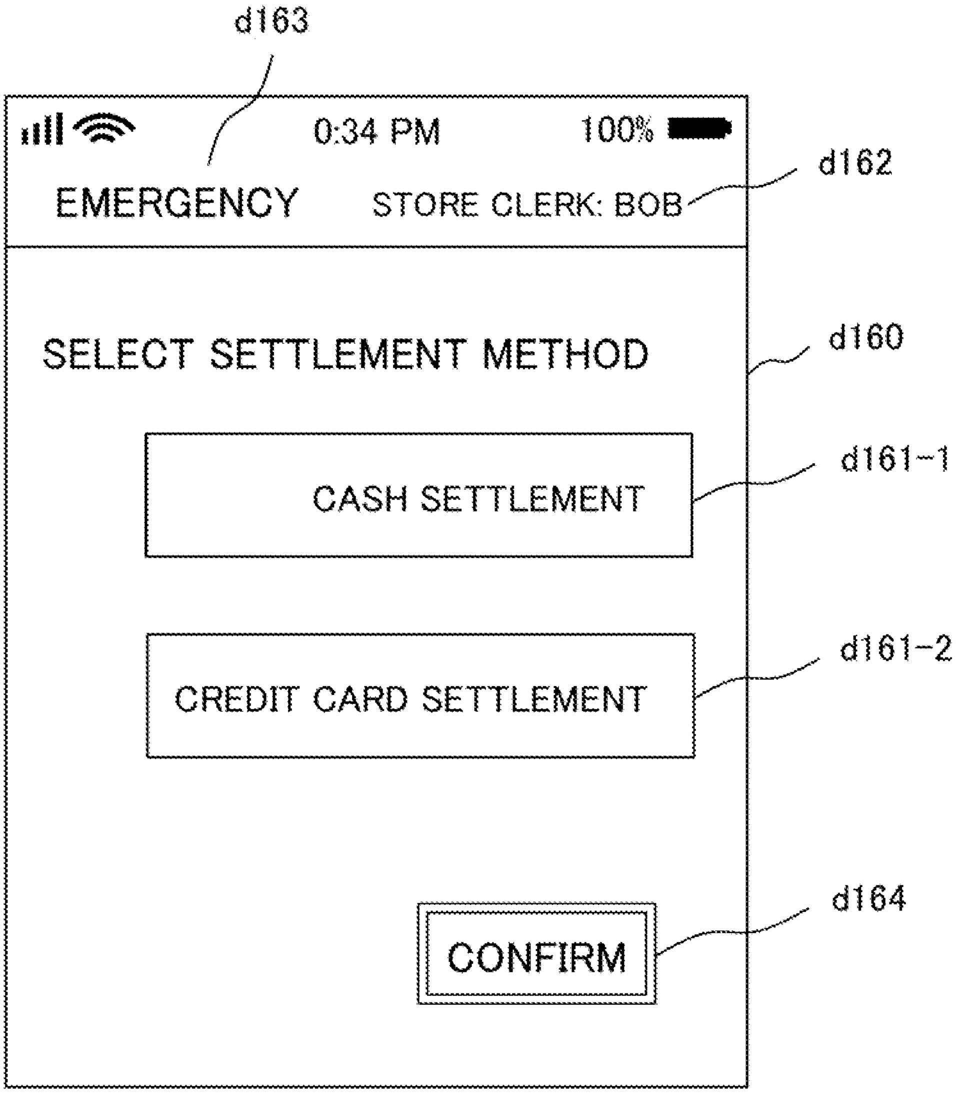
FIG. 29 is an explanatory diagram illustrating an example of selection for a settlement method.

FIG. 29 is an explanatory diagram illustrating a selection example of a settlement method. In FIG. 29, credit card settlement will be described as an example of the electronic settlement. The display unit 1010 displays a screen capable of receiving selection of a settlement method by the cash settlement or selection of a settlement method by the credit settlement. A screen d160 includes a cash settlement button d161-1 capable of selecting cash settlement and a credit settlement button d161-2 capable of selecting the credit settlement. Furthermore, the screen d160 may include a confirmation button d164 for confirming the settlement method.

The screen d160 may include a display field d162 of the name of the store clerk and a mode outline field d163 indicating the emergency mode. The mode outline field d163 may be similar to the mode outline field d158 of the screen d150 of the purchase product list illustrated in FIG. 28.

For example, when the confirmation button d164 is tapped after the cash settlement button d161-1 capable of selecting cash settlement is tapped, the settlement method reception unit 105 receives the cash settlement. On the other hand, when the confirmation button d164 is tapped after the credit settlement button d161-2 where the credit settlement can be selected is tapped, the settlement method reception unit 105 receives the credit settlement.

<<Cash Settlement in Emergency Mode>>

First, an example of the cash settlement in the emergency mode will be described. In the case of the cash settlement, the display unit 1010 displays cash payment information based on the purchase product list. For example, the cash payment information includes information about a purchase price of a product. The cash payment information may include information about the total quantity of products, the price of each product, and the like in addition to the information about the purchase price.

The cash payment information may be generated by the POS server 11. For example, the payment information management unit 107 notifies the POS server 11 of a settlement request for making a cash settlement by the mobile terminal device. For example, upon receiving the settlement request, the payment information generation unit 111 of the POS server 11 generates the cash payment information based on the purchase product list of the customer. The payment information management unit 107 delivers the generated payment information to the output unit 109 (display unit 1010) of the store mobile terminal device 10.

Figure 30:
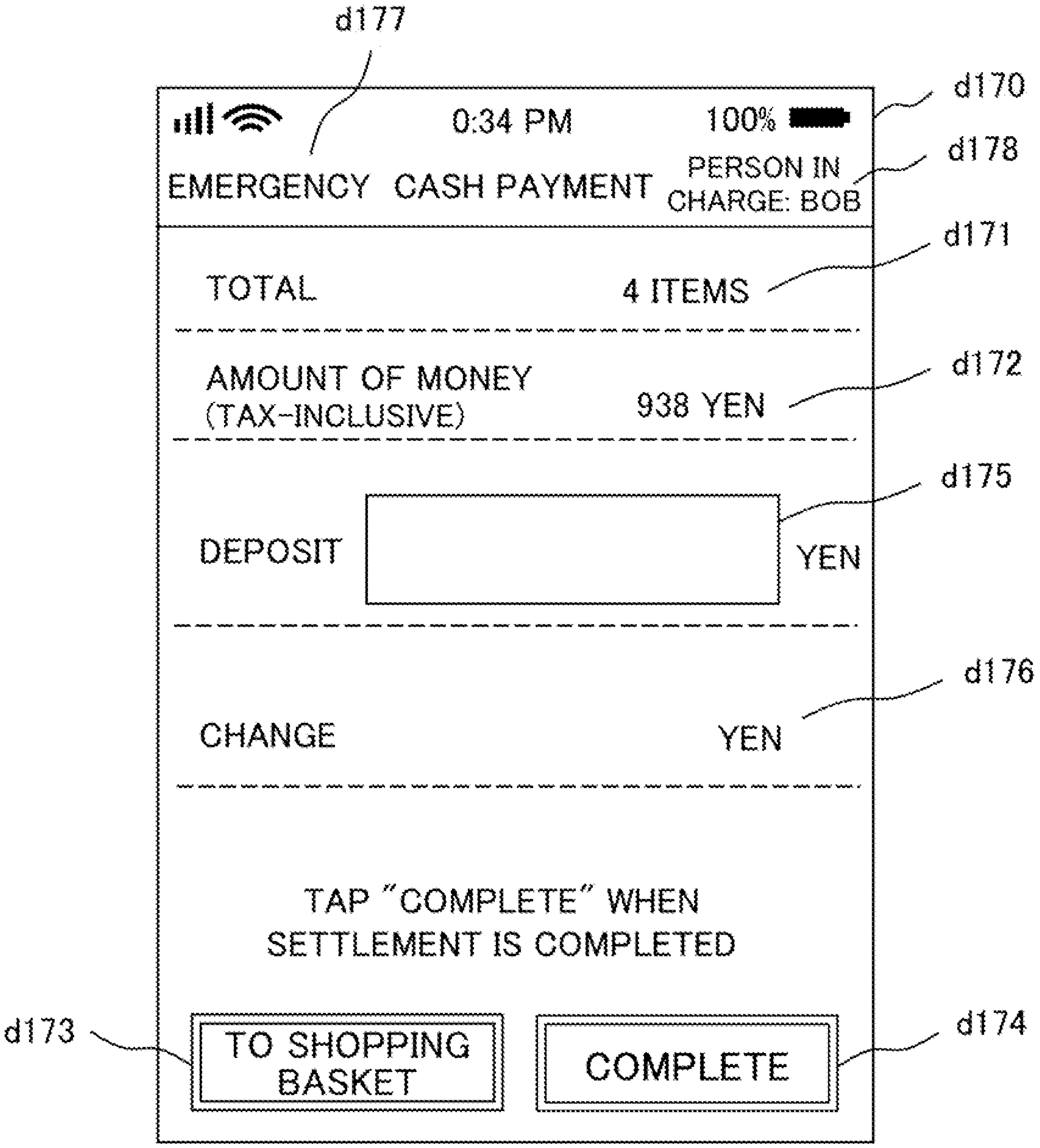
FIG. 30 is an explanatory diagram (30 part 1) illustrating an example of the cash settlement in the emergency mode.
Figure 31:
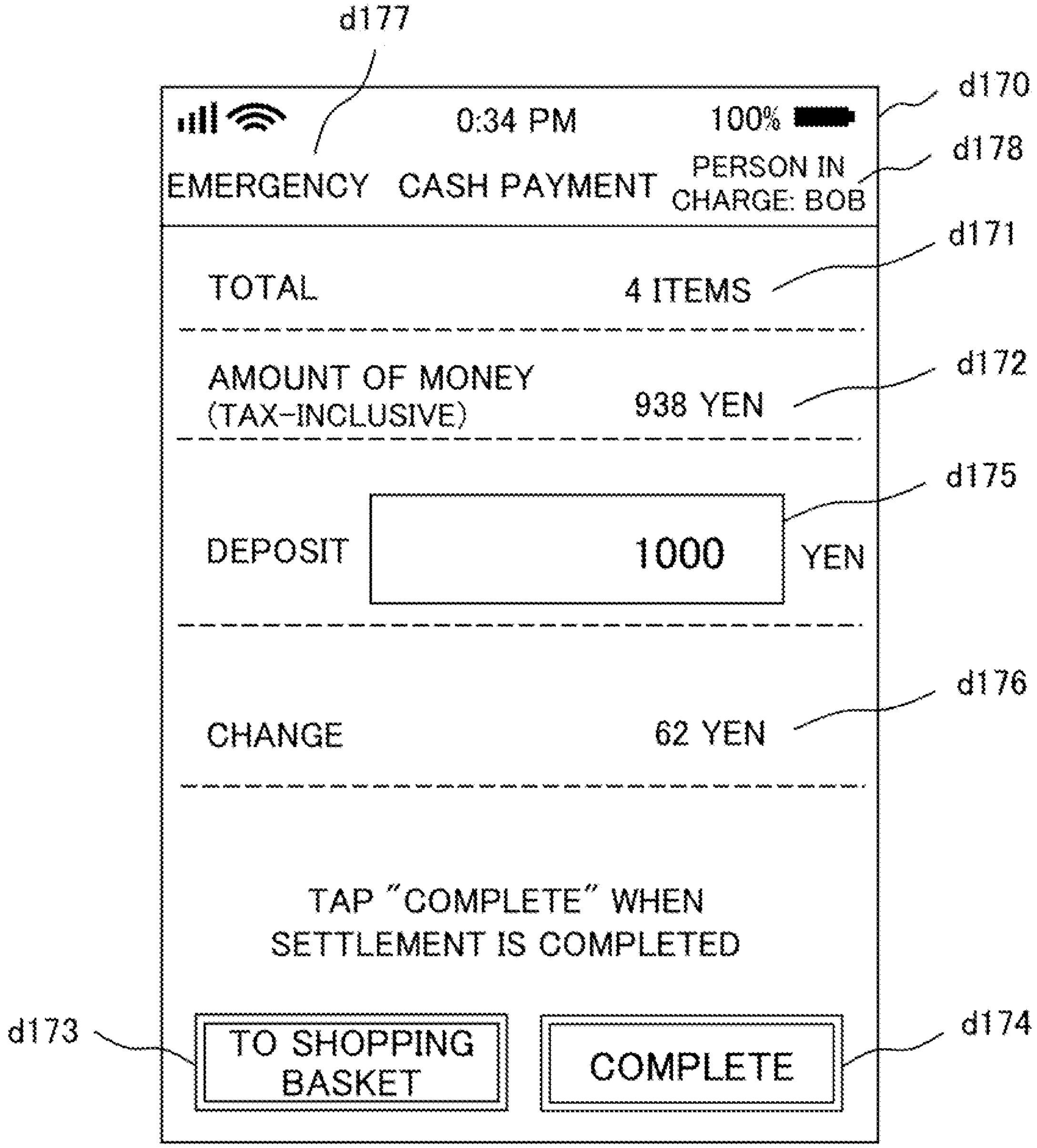
FIG. 31 is an explanatory diagram (31 part 2) illustrating an example of the cash settlement in the emergency mode.

FIGS. 30 and 31 are explanatory diagrams illustrating an example of the cash settlement in the emergency mode. The display unit 1010 displays a screen d170 for cash settlement. The screen d170 includes, for example, a display field d171 of the total purchase quantity, a display field d172 of the total purchase price, an input field d175 of the deposit amount, and a display field d176 of the change amount.

The total purchase quantity of the products to be purchased by the customer is displayed in the total purchase quantity display field d171. In the display field d172 of the total purchase price, for example, the total price of the products to be purchased by the customer including tax is displayed. In FIG. 30, the tax-inclusive price is displayed in the display field d172, but the present disclosure is not limited thereto. For example, both the tax-exclusive price and the tax-inclusive price may be displayed in the display field d162. The amount delivered by the customer can be input to the deposit amount input field d175. In the display field d176 of the change amount, the change amount as a result of subtracting the total purchase price from the deposit amount is displayed. In FIG. 30, since the deposit amount has not been input, nothing is displayed in the display field of the change amount.

The screen d170 includes a button d173 for canceling the cash settlement process and returning to the product registration process, and a completion button d174 for completing the cash settlement. Further, the screen d170 may include a mode display field d177 and a store clerk name display field d178. Information indicating the emergency mode is displayed in the mode display field d177. The display field d178 displays the name of the store clerk who is in charge. The display field d178 may display the ID of the store clerk.

For example, when receiving the input of the deposit amount in the deposit amount input field d175, the settlement unit 108 calculates the change amount. Then, in FIG. 31, the display unit 1010 displays the calculated change amount in the display field d176 of the change amount on the screen d170. When the completion button d174 is tapped, the settlement unit 108 ends the cash settlement.

When the cash settlement is completed, the issuance control unit 1011 of the store mobile terminal device 10 may issue a receipt by the printing device 13. The receipt may include information similar to the information included in the receipt issued in the self-scan mode. Specifically, the receipt may include, for example, purchase price information, information about a store, and store clerk information. The information about the purchase price and the information about the store included in the receipt may be similar to the information in the receipt issued in the self-scan mode. The store clerk information is information such as a store clerk ID of a store clerk who is an operator of the store mobile terminal device 10 and a store clerk name. The receipt may include information about the ID of the store mobile terminal device 10 that has performed product registration. The receipt may include information such as a date and time when settlement is completed. The receipt may include information about an ID of the receipt. The receipt may include information indicating that it is a cash settlement. The information indicating the cash settlement is, for example, information such as characters or pictures indicating a settlement method such as a name of the settlement method, a deposit amount, and a change amount. When input of a member ID or the like is received in order to provide a point or the like, the member information may be included in the receipt. The member information included in the receipt may be similar to the information in the receipt issued in the self-scan mode. The receipt may include information about a transaction ID. The receipt may include information indicating the mode of the store mobile terminal device 10. The information indicating the mode indicates the emergency mode. The receipt may not include part of the information described above. The receipt may include information other than the above-described information.

At the end of the cash settlement, the settlement unit 108 may notify the POS server 11 of the end of the cash settlement. At the time of notification, information about the customer ID for which the settlement has ended, information about the store, information about the ID of the store mobile terminal device 10, and the like may be notified together. The sales management unit 113 of the POS server 11 updates the sales information. The list generation unit 112 may delete the purchase product list in which the sales are counted.

When the cash settlement is completed, the list generation unit 112 may assign a customer ID to a new customer and newly generate a purchase product list. More specifically, when the completion button d174 is tapped, the store mobile terminal device 10 may request the POS server 11 to assign a new customer ID. Then, the list generation unit 112 may assign a customer ID to a new customer and newly generate a purchase product list. Then, the display unit 1010 may display a screen (not illustrated) in a state where the product information is not registered in the product registration list as the initial screen. Accordingly, in the emergency mode, the store mobile terminal device 10 can perform a new product registration process for the next customer.

The description of the cash settlement in the emergency mode ends.

<<Electronic Settlement in Emergency Mode>>

Next, the electronic settlement process in the emergency mode will be described. The electronic settlement process in the emergency mode is the same as the electronic settlement process by the customer mobile terminal device 12 in the self-scan mode. Therefore, detailed description is omitted. However, the emergency mode is different from the self-scan mode in that information indicating the emergency mode may be displayed on each screen in such a way that the emergency mode can be determined. The type of information indicating the emergency mode is not particularly limited as described above. The payment information may be the same as the payment information in the electronic settlement process by the customer mobile terminal device 12 in the self-scan mode. However, when the payment information includes information indicating the mode, the information indicating the mode indicates the emergency mode. When the information about the store clerk ID is received, the payment information may include the information about the store clerk ID.

In the electronic settlement process in the emergency mode, the customer can make the electronic settlement even when the store mobile terminal device 10 does not include a reading means for an electronic settlement and the payment device 14 cannot be used in the store.

When the electronic settlement is completed, the issuance control unit 1011 of the store mobile terminal device 10 may issue a receipt by the printing device 13. More specifically, as described in the self-scan mode, when the electronic settlement is completed, the completion button d112 illustrated in the screen d110 of the store mobile terminal device 10 illustrated in FIG. 22 is tapped. When the completion button d112 is tapped, the issuance control unit 1011 of the store mobile terminal device may issue a receipt by the printing device 13. The receipt may include information similar to the information included in the receipt issued in the self-scan mode. Specifically, the receipt may include, for example, purchase price information, information about a store, and store clerk information. The information about the purchase price and the information about the store included in the receipt may be similar to the information included in the receipt issued in the self-scan mode. The store clerk information included in the receipt may be similar to the information in the receipt in the cash settlement in the emergency mode. The receipt may include information about the ID of the store mobile terminal device 10 that has performed product registration. The receipt may include information such as a date and time when settlement is completed. The receipt may include information about an ID of the receipt. The receipt may include information indicating that it is an electronic settlement. When input of a member ID or the like is received in order to provide a point or the like, the member information may be included in the receipt. The member information included in the receipt may be similar to the information in the receipt issued in the self-scan mode. The receipt may include information about a transaction ID. The receipt may include information indicating the mode of the store mobile terminal device 10. The information indicating the mode indicates the emergency mode. The receipt may not include part of the information described above. The receipt may include information other than the above-described information.

In the emergency mode, when the electronic settlement ends, the list generation unit 112 may assign a customer ID to a new customer and newly generate a purchase product list. More specifically, when a completion button d112 illustrated in a screen d110 of the store mobile terminal device 10 illustrated in FIG. 22 is tapped, the store mobile terminal device 10 may request the POS server 11 to assign a new customer ID. Then, the list generation unit 112 may assign a customer ID to a new customer and newly generate a purchase product list. Then, the display unit 1010 may display a screen (not illustrated) in a state where the product information is not registered in the product registration list as the initial screen. Accordingly, in the emergency mode, the store mobile terminal device 10 can perform a new product registration process for the next customer.

The description of the electronic settlement process in the emergency mode ends.

<Flowchart of Settlement Process in Emergency Mode>

Figure 32:
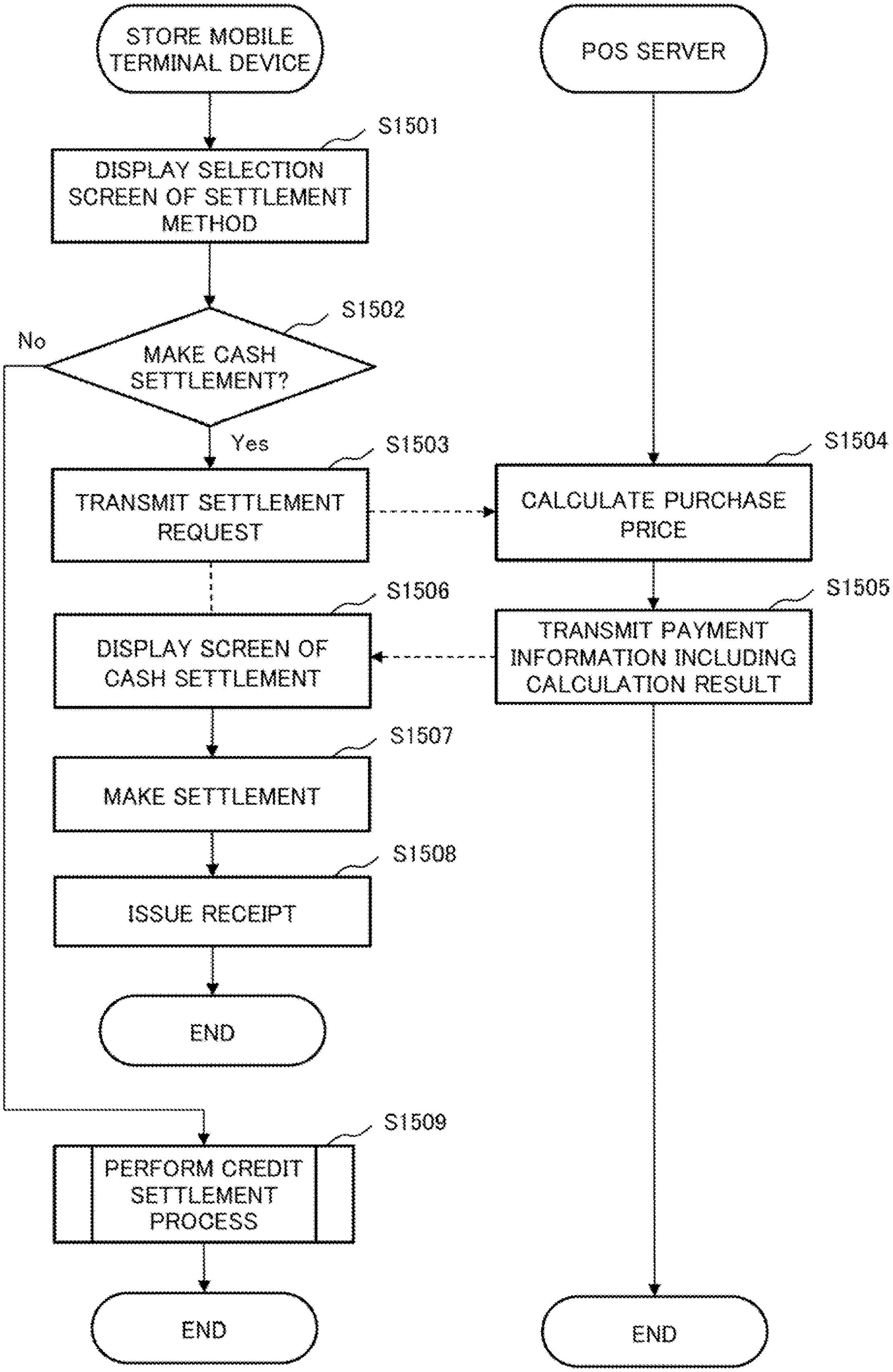
FIG. 32 is a flowchart illustrating a settlement process in the emergency mode.

The settlement process in the emergency mode will be described with reference to FIG. 32. The settlement process in the emergency mode is the settlement process in the emergency mode in step S108 illustrated in FIG. 14. FIG. 32 is a flowchart illustrating the settlement process in the emergency mode. The display unit 1010 of the store mobile terminal device 10 displays a settlement method selection screen (step S1501). Then, the settlement method reception unit 105 receives the settlement method. The settlement method reception unit 105 determines whether the received settlement method is the cash settlement (step S1502). In the case of the cash settlement (step S1502: Yes), the payment information management unit 107 transmits a settlement request (step S1503). Upon receiving the settlement request, the payment information generation unit 111 calculates the purchase price (step S1504). The payment information generation unit 111 transmits payment information (cash payment information) including the calculation result (step S1505).

Then, the display unit 1010 displays a cash settlement screen based on the payment information (cash payment information) (step S1506). The settlement unit 108 makes a cash settlement (step S1507). In step S107, the settlement unit 108 inputs the deposit amount received by the store clerk to the cash settlement screen. Then, the display unit 1010 displays a screen including the change amount obtained by subtracting the purchase price from the deposit amount. Then, the issuance control unit 1011 issues a receipt by the printing device 13 (step S1508). Then, the store mobile terminal device 10 ends the cash settlement. Although not illustrated, when the settlement is completed, the sales management unit 113 of the POS server 11 may update the sales information based on the settlement details.

On the other hand, when the settlement is not the cash settlement (step S1502: No), the store mobile terminal device 10 performs a credit settlement process (step S1509). A detailed flowchart of the credit settlement process (step S1509) in the emergency mode may be similar to the flowchart of the credit settlement process (step S1211 in FIG. 25) in the self-scan mode illustrated in FIGS. 26 and 27. Therefore, a detailed description of step S1509 is omitted.

In the example of FIG. 32, the settlement method is received after the settlement request is transmitted to the POS server 11, but the present disclosure is not limited thereto. For example, the store mobile terminal device 10 may transmit a settlement request after receiving a settlement method.

<Product Registration Process in Pre-Handling Mode>

The product registration process in the pre-handling mode will be described. In the pre-handling mode, the product information acquisition unit 103 acquires the information about the product to be purchased by the customer by the operation by the store clerk. A method of acquiring the product information may be similar to that of the product registration process in the self-scan mode except that the operator is a store clerk. The list generation unit 112 of the POS server 11 may update the purchase product list. Then, the display unit 1010 may display the product information registered in the purchase product list together with the information indicating the pre-handling mode. The type of information indicating the pre-handling mode is not particularly limited. For example, the information indicating the pre-handling mode may be information about a picture, a character, a number, a color, or a combination thereof. In each screen in another pre-handling mode, the display unit 1010 may display information indicating the pre-handling mode.

Figure 33:
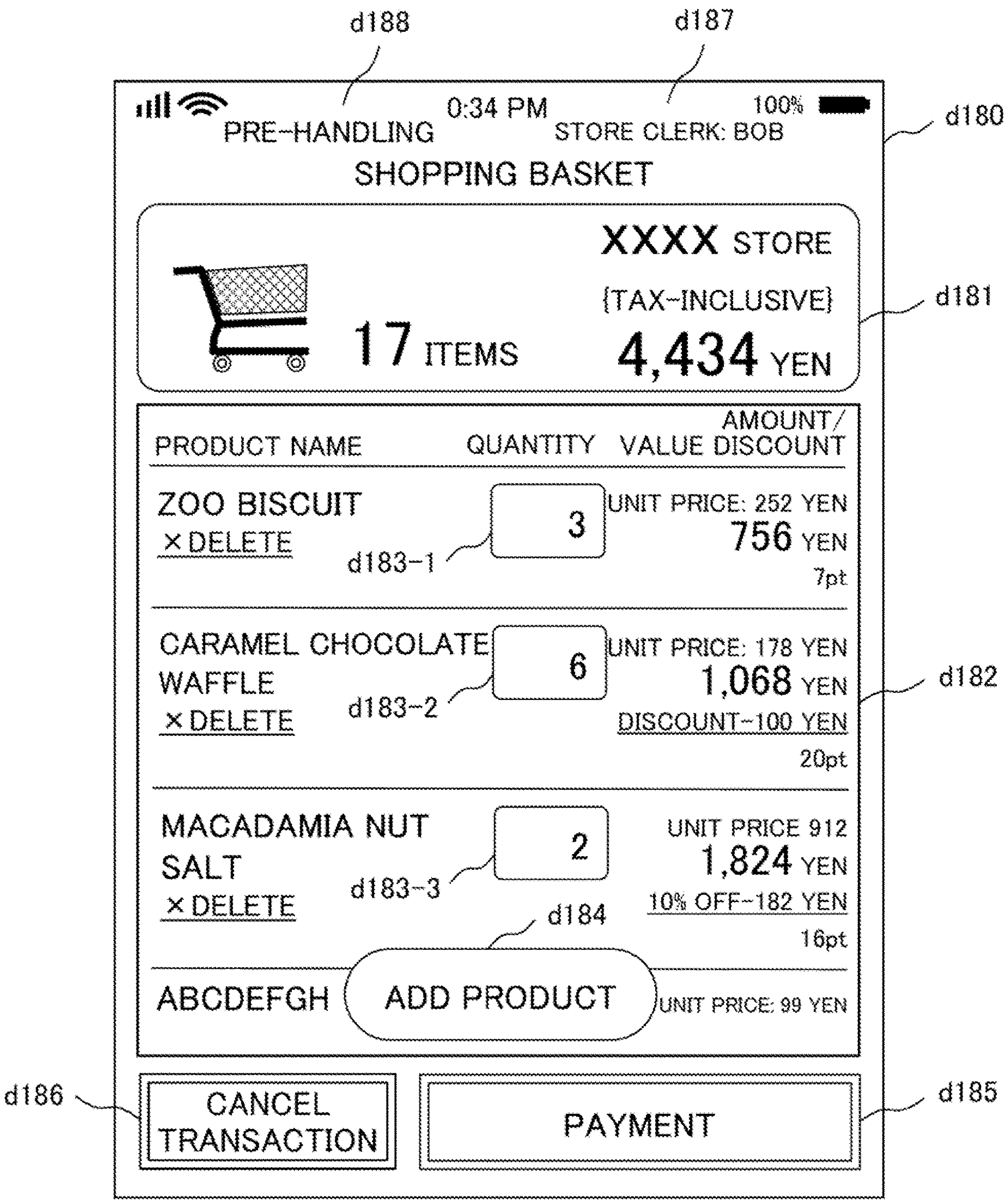
FIG. 33 is an explanatory diagram illustrating an example of a purchase product list in a pre-handling mode.

FIG. 33 is an explanatory diagram illustrating an example of a purchase product list in the pre-handling mode. The display unit 1010 displays a screen d180 related to the purchase product list. The screen d180 has, for example, information similar to that of the screen d060 in the self-scan mode illustrated in FIG. 16. The screen d180 includes, for example, an outline field d181 of the purchase product list, a detail field d182, a product addition button d184, a payment button d185, a transaction cancel button d186, a name display field d187 of the operator, and an outline field d188 of the mode. Details other than the name display field d187 of the operator and the outline field d188 of the mode may be similar to those of the screen d060 in the self-scan mode and the screen d150 in the emergency mode described above.

The name of the store clerk is displayed in the name display field d187. When the store clerk ID (store clerk identification information) is received, the name of the store clerk can be displayed in the name display field d187. For example, when the store clerk ID is received as in a screen d010 illustrated in FIG. 10, the name display field d187 may be displayed. When the store clerk ID is not received as in the screen d001 illustrated in FIG. 9, the name display field d187 may not be included in the screen d180, or the name display field d187 may be blank. The presence or absence of the title of respect is not limited. The screen d180 of the purchase product list in the pre-handling mode is different from the screen d060 in the self-scan mode and the screen d150 in the emergency mode in that information indicating the pre-handling mode is displayed. In order to distinguish from the self-scan mode, the store clerk name may not have a title of respect. Alternatively, in order to distinguish from the self-scan mode, a title of respect different from a title of respect attached to the name of the customer in the self-scan mode may be used. The screen d180 may be the same as the screen d060 in the self-scan mode and the screen d150 in the emergency mode except for the mode outline field d188.

Information indicating the pre-handling mode is displayed in the mode outline field d188. In FIG. 33, characters "pre-handling" are displayed in the outline field d188 of the mode.

For example, the background color of the screen d180 may be displayed in such a way that it can be determined that it is the pre-handling mode. For example, the background color in the pre-handling mode and the background color in the emergency mode may be displayed to be different from each other.

<Flowchart of Product Registration Process in Pre-Handling Mode>

The product registration process in the pre-handling mode is the product registration process illustrated in FIG. 17 (step S109 in FIG. 14). The detailed flowchart of the product registration process in the pre-handling mode may be same as the flowchart of the product registration process in the self-scan mode except that the operator is a store clerk. Therefore, a detailed description of the flowchart using the drawings is omitted. In the case of the pre-handling mode, in Yes in step S1111 illustrated in FIG. 17, the store mobile terminal device 10 terminates the product registration process and returns. Therefore, in the case of the pre-handling mode, the system 1 proceeds to the settlement process (step S110) in the pre-handling mode next to the product registration process (step S109) illustrated in FIG. 14.

The description of the product registration process in the pre-handling mode ends.

<Settlement Process in Pre-Handling Mode>

Next, the settlement process in the pre-handling mode will be described. As described with reference to FIGS. 2 and 3, in the pre-handling mode, the payment device 14 makes the final settlement. There are three types of settlement processes for causing the payment device 14 to read the payment information. The first settlement process (settlement process example 1) is a method in which the payment device 14 reads payment information from the store mobile terminal device 10. The second settlement process (settlement process example 2) is a method in which the payment device 14 reads payment information from the store mobile terminal device 10 via the customer mobile terminal device 12. The third settlement process (settlement process example 3) is a method in which the payment device 14 reads payment information from the store mobile terminal device 10 via printed matter.

Which of the settlement process example 1 to the settlement process example 3 is performed is not particularly limited. For example, which of the settlement process example 1 to the settlement process example 3 is performed may be fixed. Alternatively, for example, it may be configured in such a way that which of the settlement process example 1 to the settlement process example 3 is performed can be selected. For example, which settlement process is to be performed may be selected by the operation by the store clerk after receiving the input of the store clerk ID.

The payment information in the pre-handling mode will be described. The payment information in the pre-handling mode includes, for example, at least information for identifying the purchase product list and information about the received store clerk ID. The information for identifying the purchase product list is the information about the customer ID as described in the settlement by the payment device 14 in the self-scan mode. The information about the store clerk ID is included in the receipt issued by the payment device 14. The fact that the payment information includes the information about the received store clerk ID in the pre-handling mode is different from the payment information about the settlement by the payment device 14 in the self-scan mode. The payment information includes, for example, at least information about the purchase price of the product to be purchased by the customer. As in the settlement by the payment device 14 in the self-scan mode, the payment device 14 can perform either the settlement procedure A or the settlement procedure B according to the content of the payment information. As described above, in the case of the settlement procedure A, the payment information includes at least information for identifying the purchase product list and purchase price information. In the case of the settlement procedure B, the payment information includes at least information for identifying the purchase product list. A description will be given using the settlement procedure A.

The payment information may include other information in addition to the information for identifying the purchase product list, the information about the purchase price, and the information about the store clerk ID. For example, the payment information may include product information about a product and information about a purchase quantity. The product information included in the payment information is, for example, a product ID, a product name, a unit price of a product, and the like. The payment information may include member information such as information about a member ID of a customer who is an operator of the product registration process. The payment information may include information about the ID of the store mobile terminal device 10 that has performed the product registration process. The payment information may include, for example, store information. The payment information may include information indicating a mode. The information indicating the mode indicates the pre-handling mode.

Settlement Process Example 1

The settlement process example 1 will be described. For example, the payment information management unit 107 notifies the POS server 11 of a settlement request for making a settlement by the payment device 14. For example, upon receiving the settlement request, the payment information generation unit 111 of the POS server 11 generates the payment information based on the purchase product list of the customer. The payment information management unit 107 delivers the generated payment information to the output unit 109 of the store mobile terminal device 10. The payment information is as described above. The payment information in the settlement process example 1 is directly read from the store mobile terminal device 10 to the payment device 14.

The output unit 109 outputs payment information readable by the payment device 14. Specifically, the display unit 1010 displays the payment information about the payment device 14. More specifically, for example, the display unit 1010 displays a screen including a payment code obtained by encoding the payment information. A display example of the payment code may be similar to that of the screen d090 illustrated in FIG. 20 used for description of the self-scan mode. The customer moves to the payment device 14 with the store mobile terminal device 10.

The reading unit 141 of the payment device 14 reads the payment information from the store mobile terminal device 10. In the case of the manned payment device 14, the reading unit 141 may read the payment information by the operation by the store clerk. In the case of the unattended payment device 14, the reading unit 141 reads the payment information by the operation by the customer. The settlement unit 142 makes a settlement using the read payment information. The settlement is not particularly limited to the cash settlement, the electronic settlement, and the like.

The issuance control unit 143 issues, by the printing device of the payment device 14, a receipt including the information about the store clerk ID included in the payment information. The receipt may include store clerk information such as a store clerk name in addition to the store clerk ID. As a result, the customer and the store clerk can identify the store clerk who has performed product registration. For example, when a problem is found in the registered contents after the payment, the customer or the store clerk can easily identify the store clerk who has performed product registration by looking at the receipt. The receipt may include information included in the receipt issued in the self-scan mode or the emergency mode described above. The receipt may include, for example, purchase price information and information about a store. The information about the purchase price and the information about the store included in the receipt may be similar to the information in the receipt issued in the self-scan mode. The receipt may include information about the ID of the store mobile terminal device 10 that has performed the product registration process. The receipt may include information about the ID of the payment device 14 that has performed the settlement process. The receipt may include information such as a date and time when settlement is completed. The receipt may include information about an ID of the receipt. The receipt may include information indicating a settlement method and information about the settlement. When input of a member ID or the like is received in order to provide a point or the like, the member information may be included in the receipt. The member information included in the receipt may be similar to the information in the receipt issued in the self-scan mode. The receipt may include information indicating the mode. The information indicating the mode indicates the pre-handling mode.

According to the settlement process example 1, since it is easy to exchange between the store clerk who has performed product registration and the customer, it is possible to save time and effort of the store clerk who performs the product registration.

In the settlement process example 1 in the pre-handling mode, when the settlement is completed, the list generation unit 112 may assign a customer ID to a new customer and newly generate a purchase product list. More specifically, when the completion button d092 on the screen d090 illustrated in FIG. 20 used for describing the self-scan mode is tapped, the store mobile terminal device 10 may request the POS server 11 to assign a new customer ID. Then, the list generation unit 112 may assign a customer ID to a new customer and newly generate a purchase product list. Then, the display unit 1010 may display a screen (not illustrated) in a state where the product information is not registered in the product registration list as the initial screen. Accordingly, in the emergency mode, the store mobile terminal device 10 can perform a new product registration process for the next customer.

Settlement Process Example 2

Next, the settlement process example 2 will be described. As described above, the settlement process example 2 is a method in which the payment device 14 reads payment information from the store mobile terminal device 10 via the customer mobile terminal device 12. As in the settlement process example 1, the payment information management unit 107 notifies the POS server 11 of a settlement request by the payment device 14, for example. For example, upon receiving the settlement request, the payment information generation unit 111 of the POS server 11 generates the payment information based on the purchase product list of the customer. The payment information management unit 107 delivers the generated payment information to output unit 109 (display unit 1010) of the mobile terminal device. The payment information is as described above. Therefore, either the settlement procedure A or the settlement procedure B described above may be performed. A description will be given using the settlement procedure A.

The output unit 109 outputs, to the customer mobile terminal device 12, payment information that includes information about the received store clerk ID and that is readable by the payment device 14. More specifically, the display unit 1010 displays the payment information to the customer mobile terminal device 12. More specifically, for example, the display unit 1010 displays a screen including a payment code obtained by encoding the payment information. A display example of the payment code may be similar to that of the screen d090 illustrated in FIG. 20 used for description of the self-scan mode.

The reading unit 121 of the customer mobile terminal device 12 reads the payment information from the store mobile terminal device 10. Then, the output unit 123 outputs the read payment information to the payment device 14. Specifically, the display unit 1210 displays a payment code obtained by encoding the payment information. The customer moves to the payment device 14 with the customer mobile terminal device 12.

The reading unit 141 of the payment device 14 reads the payment information from the customer mobile terminal device 12. In the case of the manned payment device 14, the reading unit 141 may read the payment information by the operation by the store clerk. In the case of the unattended payment device 14, the reading unit 141 reads the payment information by the operation by the customer. The settlement unit 142 makes a settlement using the read payment information. The settlement is not particularly limited to the cash settlement, the electronic settlement, and the like.

Then, the issuance control unit 143 issues, by the printing device of the payment device 14, the receipt including the information about the store clerk ID included in the payment information. The receipt issued here may be similar to the receipt described in the settlement process example 1.

In the settlement process example 2 in the pre-handling mode, after the payment information is read from the store mobile terminal device 10 by the reading unit 121 of the customer mobile terminal device 12, the list generation unit 112 may assign a customer ID to a new customer and newly generate the purchase product list. Although not illustrated, a screen including a payment code obtained by encoding the payment information may have a reading end button. When the reading end button is tapped after the reading is completed by the reading unit 121 of the customer mobile terminal device 12, the store mobile terminal device 10 may request the POS server 11 to assign a new customer ID, as in the settlement process example 1. Then, the list generation unit 112 may assign a customer ID to a new customer and newly generate a purchase product list. Then, the display unit 1010 may display a screen (not illustrated) in a state where the product information is not registered in the product registration list as the initial screen.

According to the settlement process example 2, the store mobile terminal device 10 can immediately register a product for a new customer after the end of the product registration. Therefore, the store mobile terminal device 10 can be more effectively used.

Settlement Process Example 3

Finally, the settlement process example 3 will be described. The settlement process example 3 is a method in which the payment device 14 reads payment information from the store mobile terminal device 10 via printed matter. Other portable media may be used instead of the printed matter. As in the settlement process example 1 and the settlement process example 2, the payment information management unit 107 of the store mobile terminal device 10 notifies the POS server 11 of a settlement request by the payment device 14, for example. For example, upon receiving the settlement request, the payment information generation unit 111 of the POS server 11 generates the payment information based on the purchase product list of the customer. The payment information is as described above. Therefore, either the settlement procedure A or the settlement procedure B described above may be performed. A description will be given using the settlement procedure A. The payment information management unit 107 delivers the generated payment information to the output unit 109 (issuance control unit 1011) of the store mobile terminal device 10.

The issuance control unit 1011 issues the printed matter on which the payment information readable by the payment device 14 is printed. The payment information may be a payment code represented by a number, a character, a one-dimensional code, a two-dimensional code, or a combination thereof. For example, the printed matter not illustrated includes this payment code. The customer moves to the payment device 14 with the printed matter.

The reading unit 141 of the payment device 14 reads the payment information from the printed matter. In the case of the manned payment device 14, the reading unit 141 may read the payment information by the operation by the store clerk. In the case of the unattended payment device 14, the reading unit 141 reads the payment information by the operation by the customer. The settlement unit 142 makes a settlement using the read payment information. The settlement is not particularly limited to the cash settlement, the electronic settlement, and the like.

The issuance control unit 143 issues, by the printing device of the payment device 14, a receipt including the information about the store clerk ID included in the payment information. The receipt issued here may be similar to the receipt described in the settlement process example 1 and the settlement process example 2.

In the settlement process example 3 in the pre-handling mode, after the printed matter including the payment information is issued, the list generation unit 112 may assign a customer ID to a new customer and newly generate a purchase product list. More specifically, as in the settlement process example 1, after the printed matter is issued, the store mobile terminal device 10 may request the POS server 11 to assign a new customer ID. Then, the list generation unit 112 may assign a customer ID to a new customer and newly generate a purchase product list. Then, the display unit 1010 may display a screen (not illustrated) in a state where the product information is not registered in the product registration list as the initial screen.

According to the settlement process example 3, the store mobile terminal device 10 can immediately register a product for a new customer after the end of the product registration. Since it is easy to exchange between the store clerk who has performed product registration and the customer, it is possible to save time and effort of the store clerk who performs product registration.

<Flowchart of Each Settlement Process in Pre-Handling Mode>

The settlement process in the pre-handling mode is the settlement process in the pre-handling mode in FIG. 14 (step S110). Flowcharts related to the above-described settlement process examples 1 to 3 will be described with reference to FIGS. 34, 35, and 36.

Flowchart of Settlement Process Example 1

Figure 34:
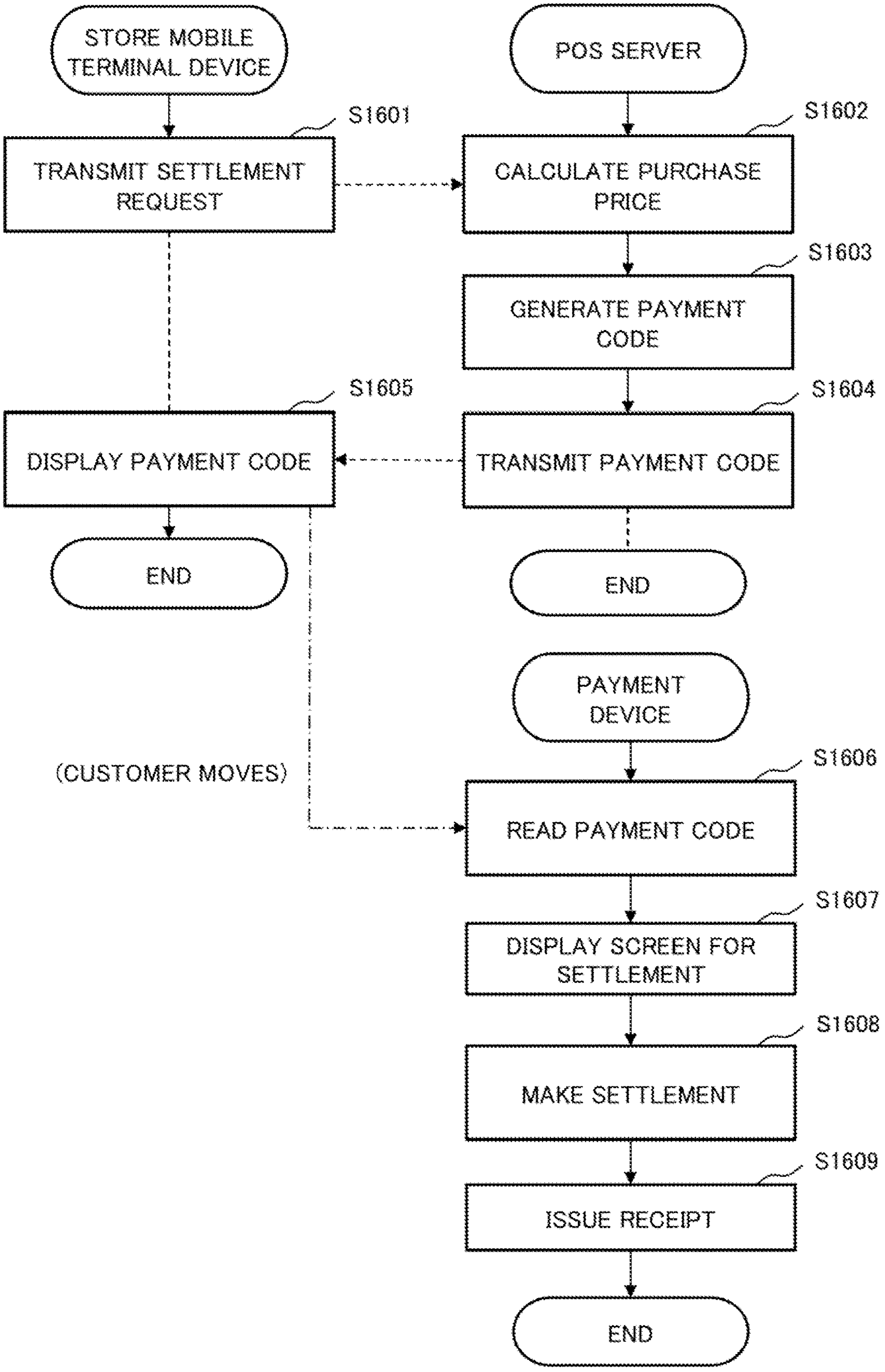
FIG. 34 is a flowchart illustrating the settlement process example 1 in the pre-handling mode.

FIG. 34 is a flowchart illustrating the settlement process example 1 in the pre-handling mode. The payment information management unit 107 transmits the settlement request (step S1601). Upon receiving the settlement request, the payment information generation unit 111 calculates the purchase price (step S1602). After generating the payment information, the payment information generation unit 111 generates a payment code obtained by encoding the payment information (step S1603). The payment code can be read by the payment device 14. The above-described settlement procedure A will be described as an example. The payment information includes at least information for identifying the purchase product list, purchase price information, and store clerk ID information. In addition to these pieces of information, the payment information includes information about the ID of the store mobile terminal device 10 and information about a store that is a payee. The payment information generation unit 111 transmits the generated payment code (step S1604). When receiving the payment code, the display unit 1010 displays the payment code (step S1605).

For example, the customer moves to the payment device 14 with the store mobile terminal device 10. The reading unit 141 of the payment device 14 reads the payment code (step S1606). The display unit 144 displays a screen for settlement based on the read payment code (step S1607). The settlement unit 142 makes a settlement (step S1608). In step S1608, the settlement is not particularly limited to the cash settlement, the electronic settlement, and the like. Then, the issuance control unit 143 issues a receipt (step S1609). Then, the system 1 ends the operation of the flow. The details of the receipt are as described above. At least information about the store clerk ID and information about the purchase price are printed on the receipt. The display unit 144 may display a screen indicating the completion of the settlement after step S1608.

Although the settlement procedure A is described, the settlement procedure B described above may be used. An example of using the settlement procedure B is as described in the settlement process by the payment device 14 in the self-scan mode.

Flowchart of Settlement Process Example 2

Figure 35:
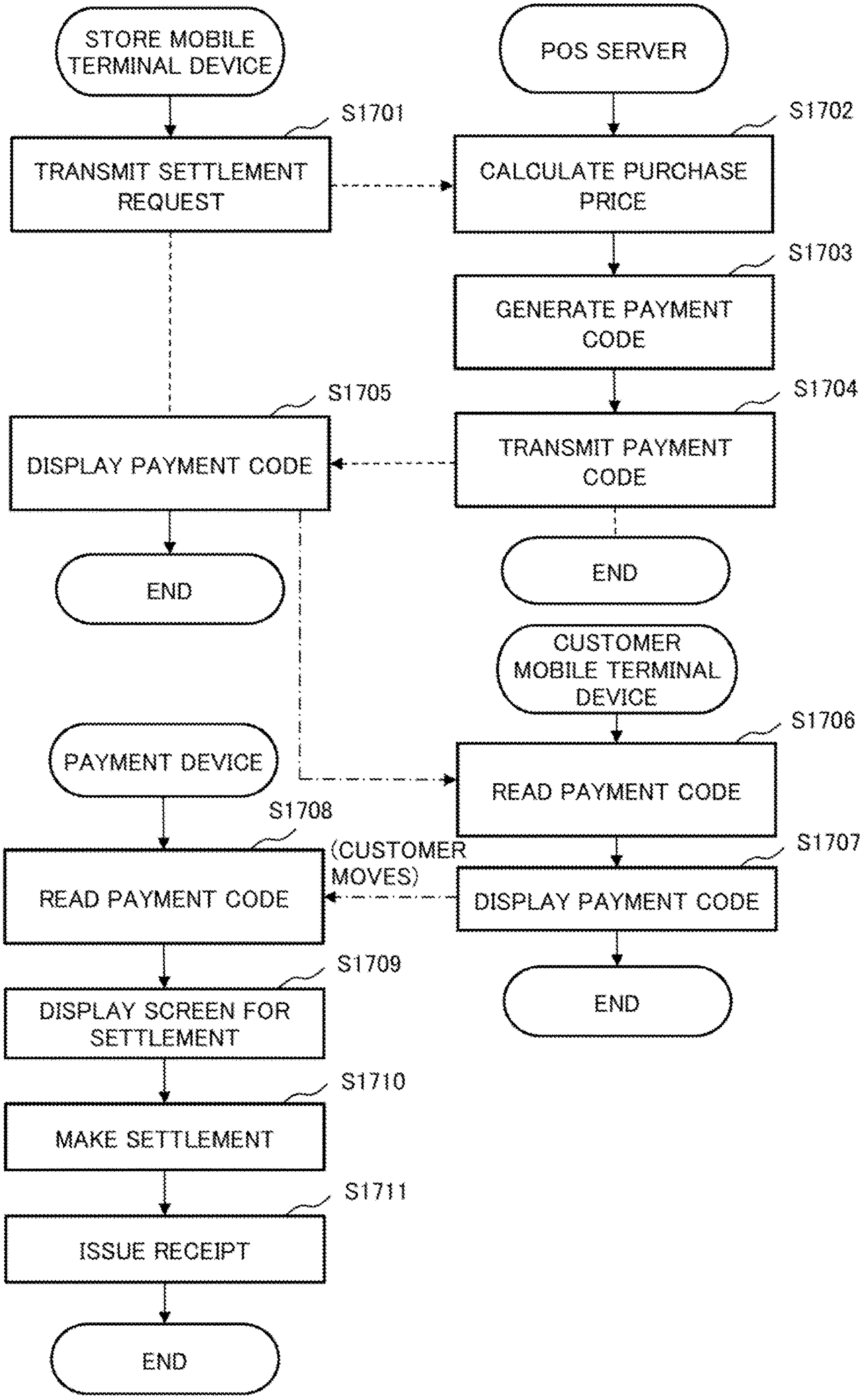
FIG. 35 is a flowchart illustrating the settlement process example 2 in the pre-handling mode.

FIG. 35 is a flowchart illustrating the settlement process example 2 in the pre-handling mode. The payment information management unit 107 transmits the settlement request (step S1701). Upon receiving the settlement request, the payment information generation unit 111 calculates the purchase price (step S1702). After generating the payment information, the payment information generation unit 111 generates a payment code obtained by encoding the payment information (step S1703). The payment code can be read by the customer mobile terminal device 12. The above-described settlement procedure A will be described as an example. The payment information includes at least information for identifying the purchase product list, purchase price information, and store clerk ID information. Moreover, in addition to these pieces of information, the payment information may include, for example, information about an ID of a mobile terminal device and information about a store that is a payee. The payment information generation unit 111 transmits the payment code (step S1704). When receiving the payment code, the display unit 1010 displays the payment code that can be read by customer mobile terminal device 12 to the customer mobile terminal device 12 (step S1705).

The reading unit 121 of the customer mobile terminal device 12 reads the payment code from the store mobile terminal device 10 (step S1706). Then, the display unit 1210 displays the payment code to the payment device 14 based on the read payment code (step S1707). The read payment code and the displayed payment code may be the same or different in encoding type. For example, the payment code read by the reading unit 121 may be a barcode, and the payment code displayed by the display unit 1210 may be a two-dimensional code.

The reading unit 141 of the payment device 14 reads the payment code from the customer mobile terminal device 12 (step S1708). The display unit 144 displays a screen for settlement based on the read payment code (step S1709). The settlement unit 142 makes a settlement (step S1710). In step S1710, the settlement is not particularly limited to the cash settlement, the electronic settlement, and the like. Then, the issuance control unit 143 issues a receipt (step S1711), and ends the operation of the flow. The details of the receipt are as described above. At least information about the store clerk ID and information about the purchase price are printed on the receipt. The display unit 144 may display the settlement end screen after step S1711.

Although the settlement procedure A is described, the settlement procedure B described above may be used. An example of using the settlement procedure B is as described in the settlement process by the payment device 14 in the self-scan mode.

Flowchart of Settlement Process Example 3

Figure 36:
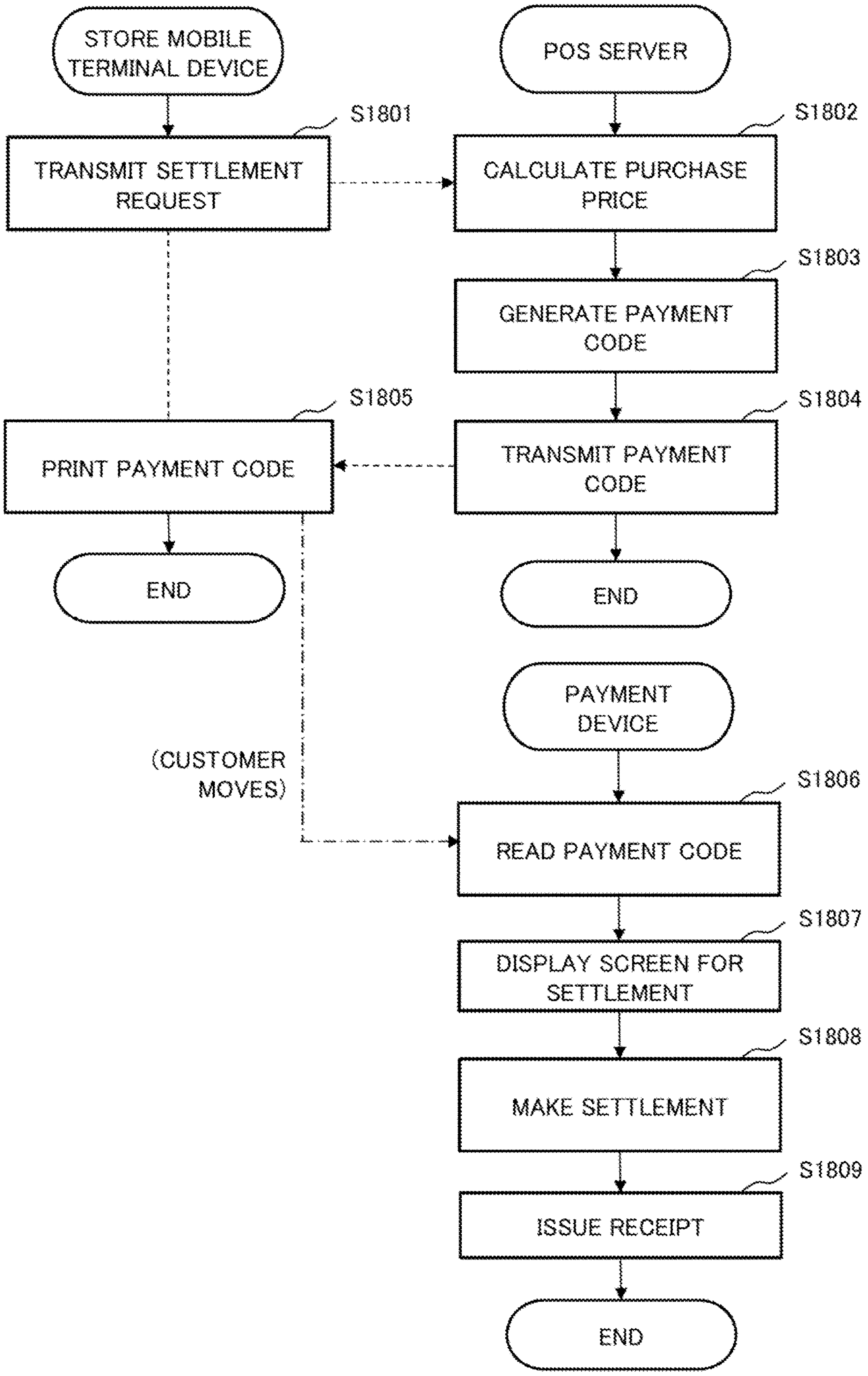
FIG. 36 is a flowchart illustrating the settlement process example 3 in the pre-handling mode.

FIG. 36 is a flowchart illustrating the settlement process example 3 in the pre-handling mode. The payment information management unit 107 transmits the settlement request (step S1801). Upon receiving the settlement request, the payment information generation unit 111 calculates the purchase price (step S1802). The payment information generation unit 111 generates the payment information including the calculation result, and generates a payment code obtained by encoding the payment information (step S1803). The payment code can be read by the payment device 14. The payment information includes information about a store clerk ID and information about a purchase price. Further, the payment information includes, for example, information about an ID of the mobile terminal device and information about a store which is a payee. The payment information generation unit 111 transmits the payment code to the store mobile terminal device 10 (step S1804). When receiving the payment code, the issuance control unit 1011 prints printed matter including the payment code by the printing device 13 (step S1805).

The customer moves to the payment device 14 with the printed matter. The reading unit 141 of the payment device 14 reads the payment code of the printed matter (step S1806). Then, the display unit 144 displays a screen for settlement based on the read payment code (step S1807). The settlement unit 142 makes a settlement (step S1808). In step S1808, the settlement is not particularly limited to the cash settlement, the electronic settlement, and the like. Then, the issuance control unit 143 issues a receipt (step S1809), and ends the operation of the flow. The details of the receipt are as described above. At least information about the store clerk ID and information about the purchase price are printed on the receipt. The display unit 144 may display the settlement end screen after step S1808.

Although the settlement procedure A is described, the settlement procedure B described above may be used. An example of using the settlement procedure B is as described in the settlement process by the payment device 14 in the self-scan mode. The description of the pre-handling mode ends.

The first example embodiment is not limited to the example described above, and various modifications can be made. For example, regarding a button, an input field, a display field, and a text on each screen, an arrangement position, a character font, and a color are not particularly limited. For example, respective buttons may have different colors. Each screen may have a display field, a button, and the like that are not illustrated. Each screen may not have some display fields illustrated.

Modifications of the first example embodiment will be described.

<First Modification in First Example Embodiment (Reception of Mode)>

An example in which either the self-scan mode or the store clerk mode is received by the identification information about the user (information about the user ID) has been described. For example, biometric information may be used as the identification information about the user. For example, the mode reception unit 101 may receive either the self-scan mode or the store clerk mode (the pre-handling mode and) based on the biometric information. For example, it is assumed that the mode reception unit 101 receives the self-scan mode when the newly acquired biometric information is the biometric information about the customer. It is assumed that the mode reception unit 101 receives the store clerk mode when the newly acquired biometric information is the biometric information about the store clerk. Then, the mode reception unit 101 may receive an input of each of the pre-handling mode and the emergency mode according to a tap on the button displayed on the screen described above. When the biometric information is the feature amount of the face, the mode reception unit 101 may receive the self-scan mode by, for example, authenticating a feature amount of the face extracted from the newly captured face image and a feature amount of the face registered in the member DB 115. For example, the mode reception unit 101 may receive the store clerk mode by authenticating a feature amount of the face extracted from the newly captured face image and a feature amount of the face registered in the store clerk DB 116. Alternatively, for example, the mode reception unit 101 may receive the self-scan mode unless the person is not the store clerk by authenticating a feature amount of the face extracted from the newly captured face image and a feature amount of the face registered in the store clerk DB 116. When the biometric information is registered in both the store clerk DB 116 and the customer DB, the mode reception unit 101 may receive the mode by inputting the ID information described above.

<Second Modification of First Example Embodiment>

In the first example embodiment, an example in which one of the self-scan mode, the emergency mode, and the pre-handling mode is received is described. The store mobile terminal device 10 is not limited to an example having three modes. For example, the store mobile terminal device 10 may have two modes of the emergency mode and the pre-handling mode. Then, the mode reception unit 101 may receive either the emergency mode or the pre-handling mode. For example, the store mobile terminal device 10 may have two modes of the self-scan mode and the emergency mode. The mode reception unit 101 may receive either the self-scan mode or the emergency mode. For example, the mobile terminal device may have two modes of the self-scan mode and the pre-handling mode. The mode reception unit 101 may receive either the self-scan mode or the pre-handling mode.

When there is one store clerk mode such as two modes of the self-scan mode and the pre-handling mode, the mode reception unit 101 can determine the mode by the ID.

The store mobile terminal device 10 may be a device having a single function of each mode. The store mobile terminal device 10 may be a device that has the self-scan mode but does not have the emergency mode and the pre-handling mode. Alternatively, for example, the store mobile terminal device 10 may be a device that has the emergency mode but does not have the self-scan mode and the pre-handling mode. Alternatively, for example, the store mobile terminal device 10 may be a device that has the pre-handling mode but does not have the self-scan mode and the emergency mode.

In the case of the store mobile terminal device 10 having the self-scan mode, for example, the system 1 may not have a device not used in the self-scan mode among the illustrated devices. The store mobile terminal device 10 having the self-scan mode may not have, for example, function units other than the function units used in the self-scan mode among the function units.

In the case of the store mobile terminal device 10 having the emergency mode, for example, the system 1 may not have a device that is not used in the emergency mode among the illustrated devices. For example, since it is not necessary to use the payment device 14 in the emergency mode, the system 1 may not include the payment device 14. The store mobile terminal device 10 may not include function units other than the function units used in the emergency mode among the function units. For example, the store mobile terminal device 10 may not include the mode reception unit 101.

In the case of the store mobile terminal device 10 having the pre-handling mode, for example, the system 1 may not have a device that is not used in the pre-handling mode among the illustrated devices. For example, the store mobile terminal device 10 may not include function units other than the function units used in the pre-handling mode among the function units. For example, the store mobile terminal device 10 may not include the mode reception unit 101. Alternatively, for example, the store mobile terminal device 10 may not include the application presence/absence reception unit 106.

<Third Modification of First Example Embodiment>

In the first example embodiment, an example in which the mode is received by the information about the ID of the user is described. The information about the ID of the user may be input to identify the user regardless of the reception of the mode. Therefore, the store mobile terminal device 10 may include an identification information reception unit (not illustrated) in addition to the mode reception unit 101. Therefore, as described in the second modification, when the store mobile terminal device 10 is achieved as a device having a single function of each mode, the identification information reception unit may receive information about the ID of the user.

<Fourth Modification in First Example Embodiment (Self-Scan Mode)>

The present disclosure is not limited to the example in which the device to be used for the settlement is selected after the selection for the settlement method. For example, in the self-scan mode, the device to be used for the settlement may be selected without selecting the settlement method. For example, the display unit 1010 may display that a credit card settlement and a cash settlement can be made in the case of the payment device 14 and a credit card settlement can be made in the case of the customer mobile terminal device 12 on the screen for receiving the selection of the device used for the settlement illustrated in FIG. 19.

<Fifth Modification of First Example Embodiment>

Although not illustrated, a process related to age verification and a process of issuing coupons or the like may be performed. The store mobile terminal device 10 may perform a process related to age verification different in each mode. The store mobile terminal device 10 may perform a process of issuing coupons or the like different in each mode.

For example, in the self-scan mode, the product registration process is performed by the operation by the customer. Therefore, the store mobile terminal device 10 may perform the age verification process when performing the product registration process in the customer mode. For example, in the self-scan mode and the pre-handling mode, when the settlement is made by the manned payment device 14 operated by the store clerk, the customer mobile terminal device 12 may output payment information including information indicating that the payment device 14 performs the process related to age verification.

<Sixth Modification of First Example Embodiment>

As an example in which the output unit 109 of the store mobile terminal device 10 outputs the payment information in each mode, an example in which the display unit 1010 displays the payment code is described. The output example is not limited thereto. For example, short-distance wireless communication such as an RFID may be used as an output method. The output unit 109 may include a communication unit that performs short-distance wireless communication such as an RFID. Then, the communication unit may transmit the payment information to the customer mobile terminal device 12 or the payment device 14. The reading unit 121 of the customer mobile terminal device 12 or the reading unit 141 of the payment device 14 may read the payment information by receiving the payment information by the RFID reading device.

The short-distance wireless communication such as an RFID may be used as a method of transferring information between the customer mobile terminal device 12 and the payment device 14. In the settlement process example 2 in the pre-handling mode, the output unit 123 of the customer mobile terminal device 12 may output the payment information to the payment device 14 by a communication unit that performs short-distance wireless communication such as an RFID. The reading unit 141 of the payment device 14 may read the payment information by receiving the payment information by the RFID reading device.

As an output method, the payment information may be output to the customer mobile terminal device 12 by transmission of an electronic message or transmission of an electronic mail. Then, the customer mobile terminal device 12 includes a payment information acquisition unit (not illustrated). The payment information acquisition unit may acquire the payment information by receiving the payment information.

<Seventh Modification of First Example Embodiment>

In the first example embodiment, the receipt is printed matter, but the present disclosure is not limited thereto. For example, the receipt may be an electronic receipt. The electronic receipt is notified to the customer by, for example, an electronic message, an electronic mail, or the like. The address and the like of the electronic mail, the telephone number, and the like may be acquired from the member DB 115. Alternatively, the payment device 14 and the store mobile terminal device may include an address reception unit (not illustrated). Taking the payment device 14 as an example, the address reception unit may receive information about an address such as an address of an electronic message and a telephone number. The issuance control unit may make notification of the electronic receipt based on the received address information. Alternatively, the electronic receipt may be browsable as the purchase history by the store application.

<Eighth Modification of First Example Embodiment>

In each mode, the POS server 11 updates a purchase product list, calculates a purchase price, generates payment information, updates the sales DB 118, and the like. For example, the store mobile terminal device 10 may perform at least one of the processes by the POS server 11. For example, the POS server 11 may transmit information necessary for the payment information to the store mobile terminal device 10, and the store mobile terminal device 10 may generate the payment information and generate a payment code obtained by encoding the payment information. The information necessary for the payment information transmitted from the POS server 11 may be, for example, information that the store mobile terminal device 10 does not have.

For example, it may not be possible to connect to another device such as the POS server 11 in an emergency such as a disaster. In preparation for such a case, the store mobile terminal device 10 may store various types of information stored in the POS server 11 and perform a process by the POS server 11. Therefore, the store mobile terminal device 10 may have function units similar to the payment information generation unit 111, the list generation unit 112, and the sales management unit 113 of the POS server 11. The store mobile terminal device 10 may store the member DB 115, the store clerk DB 116, the product DB 117, the sales information, and the purchase product list DB 119. Further, the store mobile terminal device 10 may have a function of an inquiry unit (not illustrated) which inquires about the received ID information and the received password information. The store mobile terminal device 10 may include some of the function units of the POS server 11.

<Ninth Modification in First Example Embodiment (Store Clerk Mode)>

In the store clerk mode, when the store mobile terminal device 10 can receive the input of the information about the member ID of the customer in addition to the information about the store clerk ID of the store clerk who is the operator, the store mobile terminal device may display the member information such as the information about the point on the screen of the purchase product list such as the screen d150 illustrated in FIG. 28 and the screen d180 illustrated in FIG. 33.

<Tenth Modification in First Example Embodiment>

When the settlement is made using the payment device 14, the store mobile terminal device 10 may be able to designate the payment device 14. For example, the payment information may be information readable by the designated payment device 14, and may be information that cannot be read by another payment device 14. Alternatively, the payment information may be information allowing the designated payment device 14 to make a settlement.

<Eleventh Modification in First Example Embodiment (Self-Scan Mode)>

In the first example embodiment, an example in which the settlement method reception unit 105 receives a settlement method in the self-scan mode is described. In the first example embodiment, an example in which the settlement method reception unit 105 receives selection of a device that makes a settlement is described. For example, the store mobile terminal device 10 may not receive selection of a settlement method and a device that makes a settlement, and the payment device 14 may make a settlement in the self-scan mode. Without receiving the selection of the settlement method or the device making a settlement, in a case where the payment device 14 makes a settlement, when the payment button d065 of the screen d060 illustrated in FIG. 16 is tapped, the display unit 1010 may display the screen d090 of FIG. 20 including the payment code obtained by encoding the payment information.

The description of the modifications ends. Next, effects of the first example embodiment will be described. The store mobile terminal device 10 receives the mode, performs a product registration process by the operation by the store clerk in the store clerk mode, and performs a product registration process by the operation by the customer in the customer mode. As a result, the store mobile terminal device 10 can switch the use of the store mobile terminal device according to the received mode. In the store mobile terminal device 10, it is possible to more effectively utilize the store mobile terminal device.

The store mobile terminal device 10 receives the mode using the information about the ID of the user. As a result, the store mobile terminal device 10 can easily receive the mode while identifying the user.

The store mobile terminal device 10 outputs payment information including information about the received ID. That is, the store mobile terminal device 10 outputs payment information that can identify the operator who has performed product registration. As a result, when a problem is found in the registered contents at the time of settlement, the store mobile terminal device 10 can easily identify the operator who has performed product registration.

The store mobile terminal device 10 has a pre-handling mode and an emergency mode as store clerk modes. The store mobile terminal device 10 outputs payment information used for a settlement by the store payment device 14 when receiving the pre-handling mode, and outputs payment information used for a payment by the terminal device when receiving the emergency mode.

In the emergency mode, the store mobile terminal device 10 outputs payment information used for a payment by the store mobile terminal device. As a result, the store mobile terminal device 10 can make a cash settlement in the emergency mode. When the input of the settlement information can be received, the store mobile terminal device 10 can make an electronic settlement.

The store mobile terminal device 10 outputs payment information used for a payment by the customer mobile terminal device 12 in the emergency mode. As a result, the store mobile terminal device 10 can make an electronic settlement using the customer mobile terminal device 12 in the emergency mode.

Second Example Embodiment

Next, the second example embodiment will be described in detail with reference to the drawings. In the second example embodiment, a basic configuration of the contents described in the first example embodiment will be described.

Figure 37:
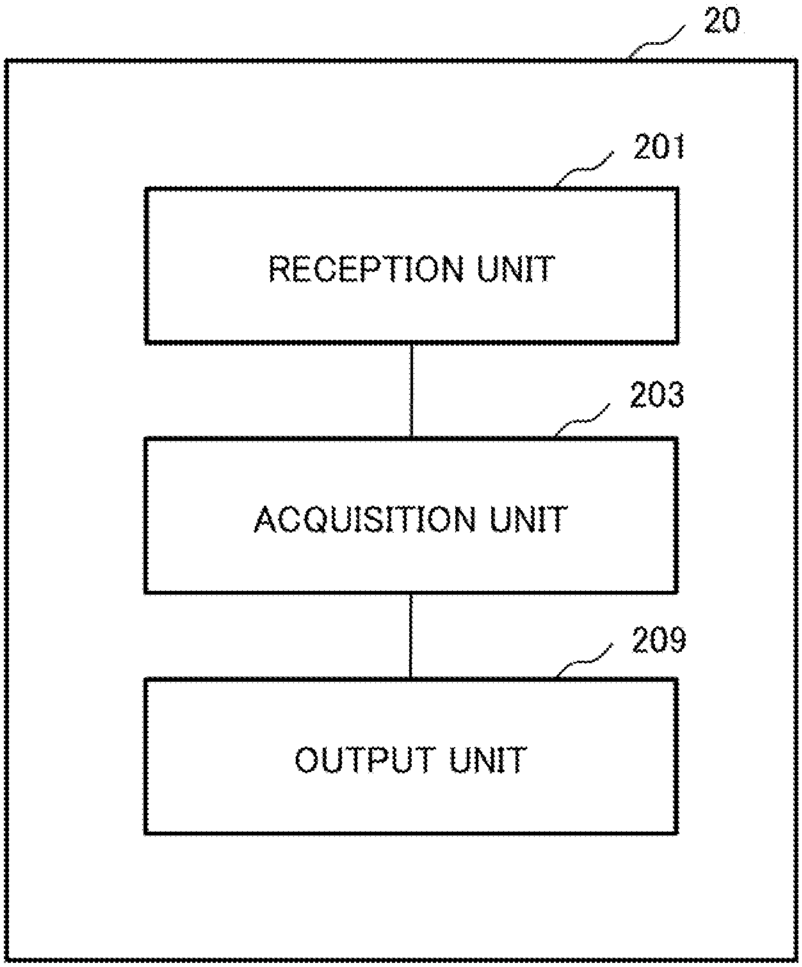
FIG. 37 is a block diagram illustrating a configuration example of a store mobile terminal device according to the second example embodiment.

FIG. 37 is a block diagram illustrating a configuration example of a store mobile terminal device according to the second example embodiment. The store mobile terminal device 20 includes a reception unit 201, an acquisition unit 203, and an output unit 209.

The reception unit 201 is a mode reception unit that receives a mode. The mode here includes a store clerk mode and a customer mode. The reception unit 201 receives a mode via an input device, for example. For example, the reception unit 201 may receive the mode by inputting the identification information about the user. More specifically, when the identification information about the user is the identification information about the store clerk, the reception unit 201 receives the store clerk mode. When the identification information about the user is the identification information about the customer, the reception unit 201 receives the customer mode.

Acquisition unit 203 is a product information acquisition unit that acquires product information about a product to be purchased by a customer. When receiving the customer mode, the acquisition unit 203 acquires the product information about the product to be purchased by the customer by the operation by the customer. The product information is, for example, at least one of information about a product ID, data of an image obtained by imaging a product, and data of an image related to a product. When receiving the store clerk mode, the acquisition unit 203 acquires the product information by the operation by the store clerk.

An output unit 209 outputs payment information according to the mode based on the product information. The payment information includes, for example, information about a purchase price related to the product information. When the identification information about the user is received, the payment information may include the identification information about the user. The payment information may include information about the ID of the store mobile terminal device 20.

Figure 38:
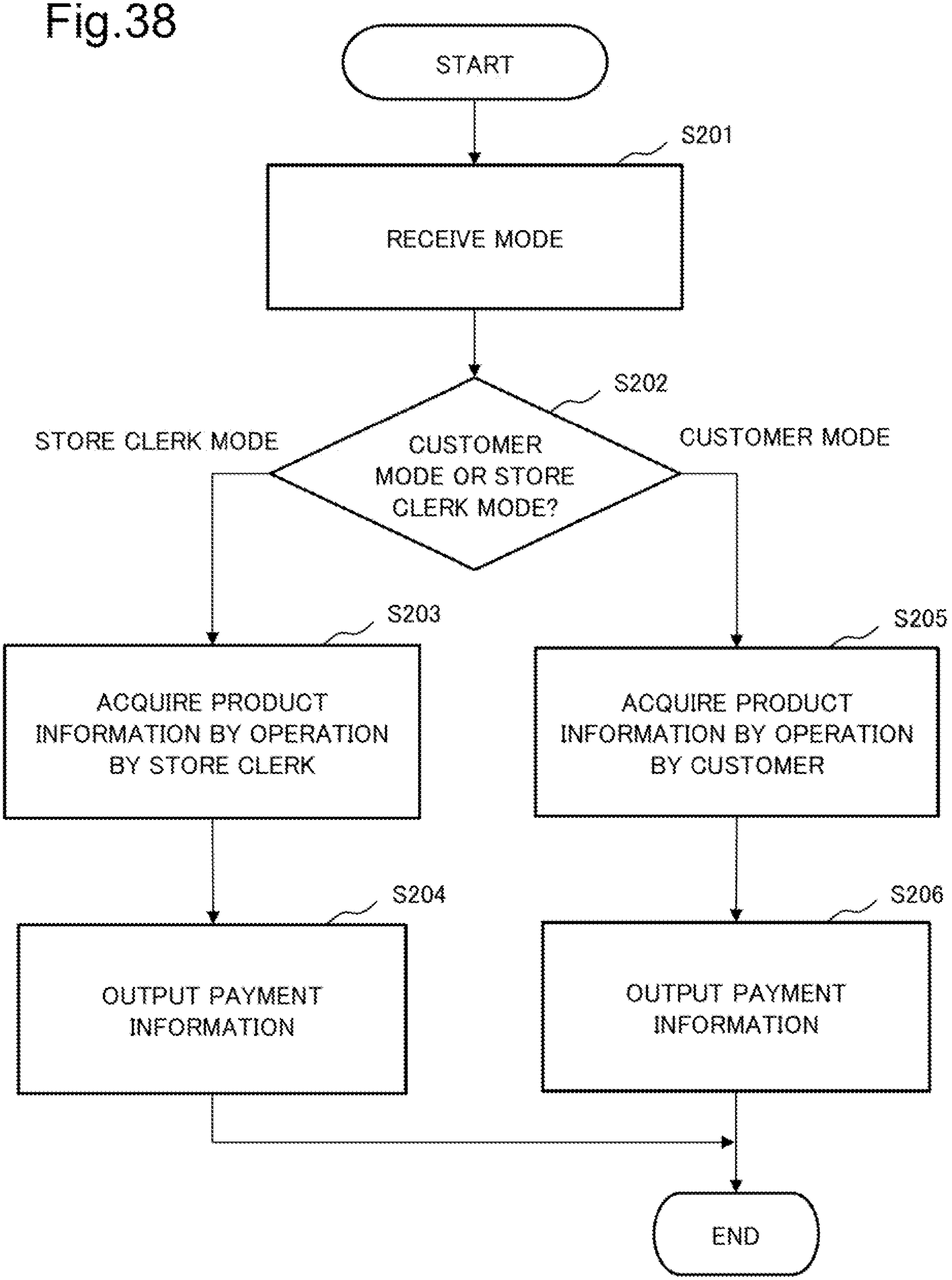
FIG. 38 is a flowchart 38 illustrating an operation example of the store mobile terminal device according to the second example embodiment.

FIG. 38 is a flowchart illustrating an operation example of the store mobile terminal device 20 according to the second example embodiment. The reception unit 201 receives a mode (step S201). Reception unit 201 determines whether the mode is the customer mode or the store clerk mode (step S202). In the case of the store clerk mode (step S202: store clerk mode), acquisition unit 203 acquires the product information about the product to be purchased by the customer by the operation by the store clerk (step S203). Then, the output unit 209 outputs the payment information related to the store clerk mode based on the product information (step S204), and ends the operation of the flow.

On the other hand, in the case of the customer mode (step S202: customer mode), the acquisition unit 203 acquires the product information about the product to be purchased by the customer by the operation by the customer (step S205). The output unit 209 outputs the payment information related to the customer mode based on the product information (step S204), and ends the operation of the flow.

Next, effects of the second example embodiment will be described. The store mobile terminal device 20 receives the mode, performs a product registration process by the operation by the store clerk in the store clerk mode, and performs a product registration process by the operation by the customer in the customer mode. As a result, the store mobile terminal device 20 can switch the use of the store mobile terminal device according to the received mode. In the store mobile terminal device 20, it is possible to more effectively utilize the store mobile terminal device.

Figure 39:
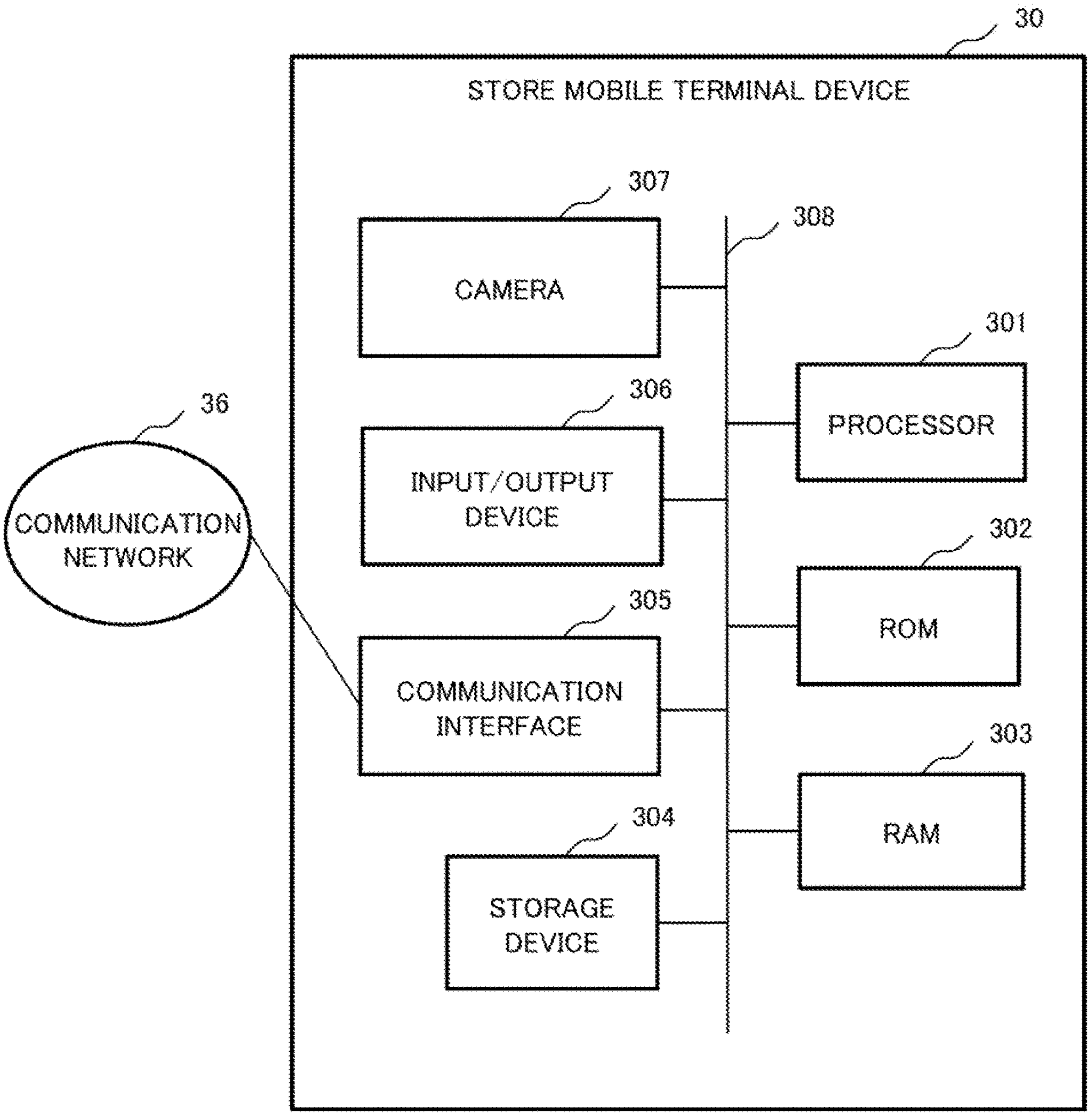
FIG. 39 is an explanatory diagram 39 illustrating a hardware configuration example of a store mobile terminal device.
Figure 40:
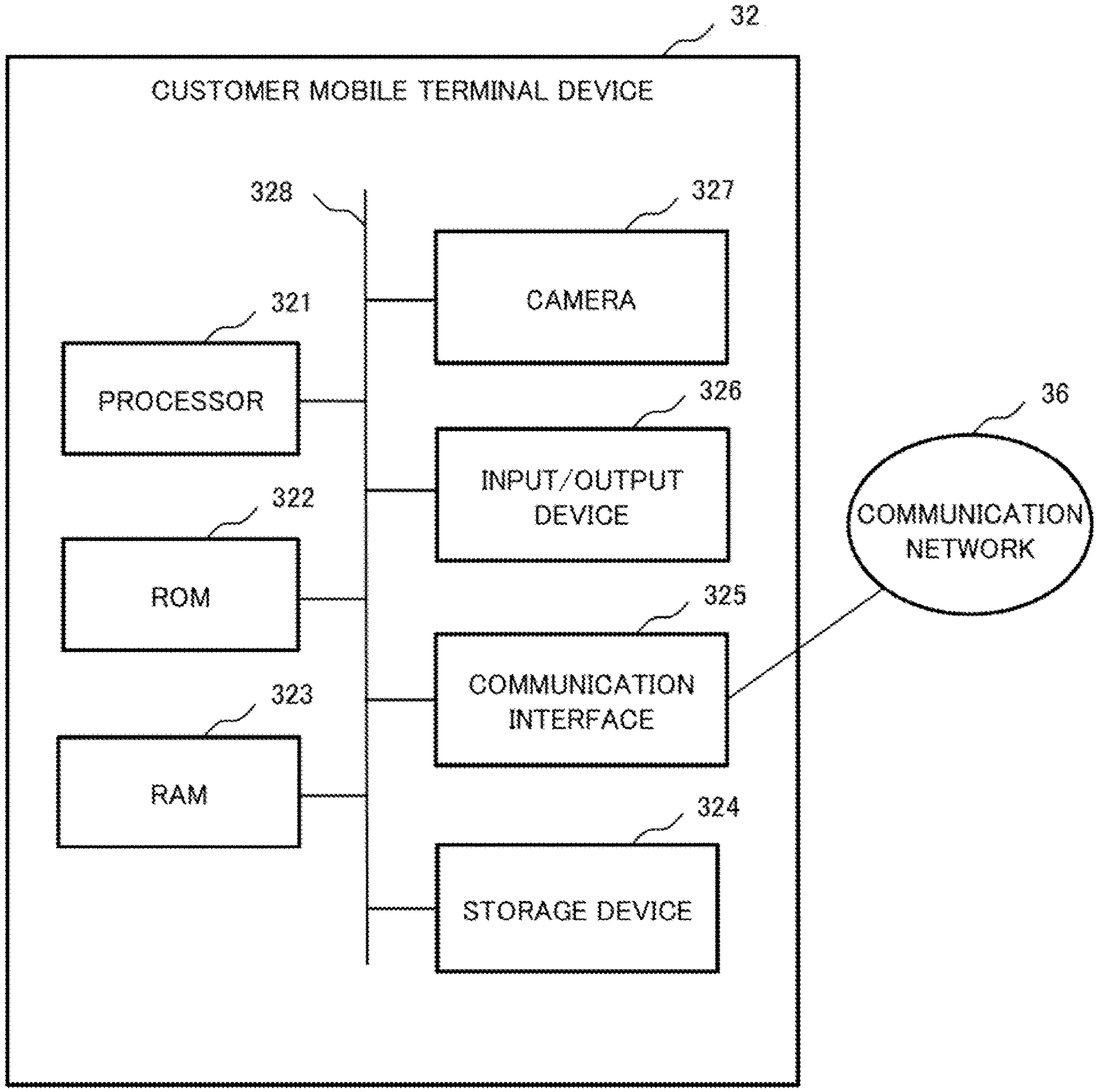
FIG. 40 is an explanatory diagram 40 illustrating a hardware configuration example of a customer mobile terminal device.
Figure 41:
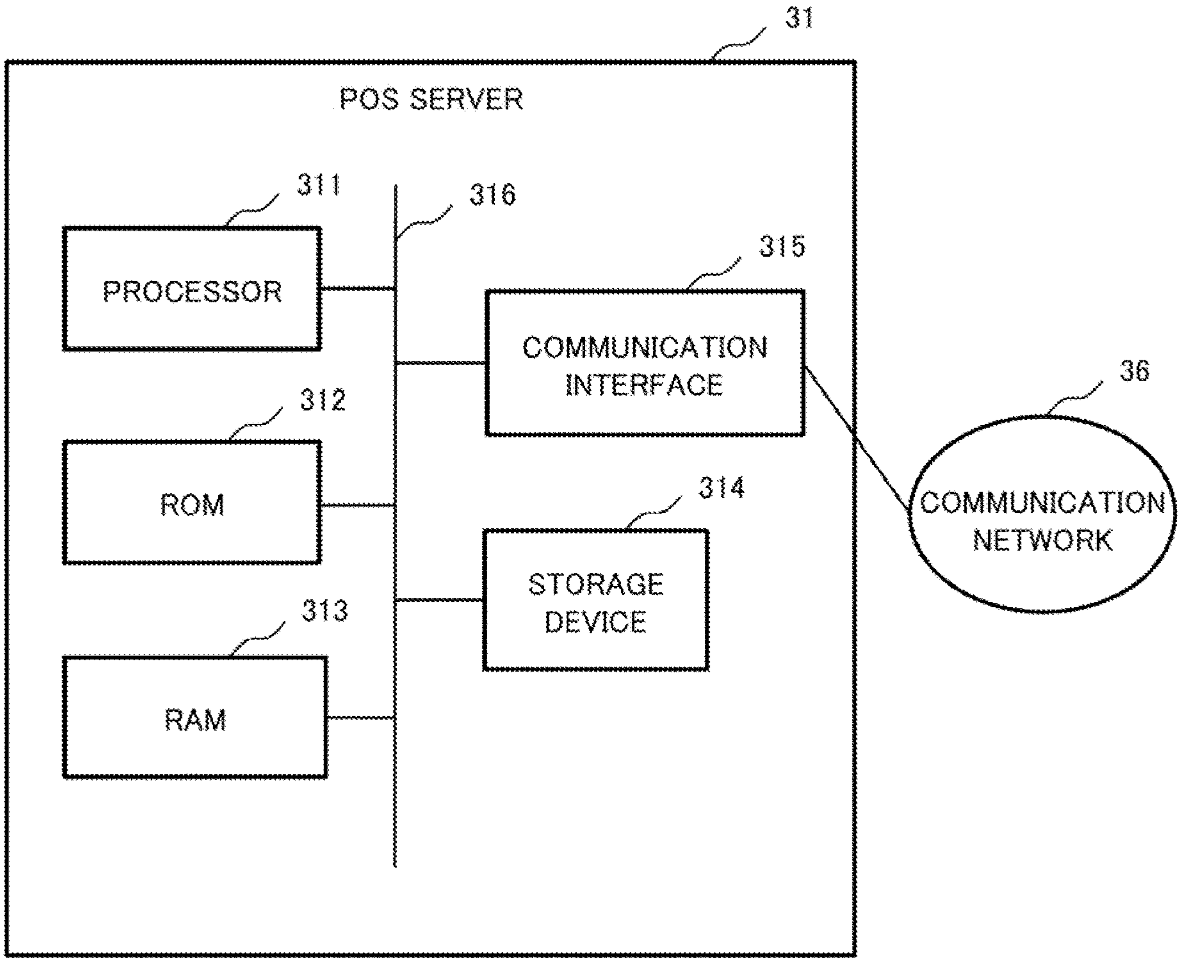
FIG. 41 is an explanatory diagram 41 illustrating a hardware configuration example of a POS server.
Figure 42:
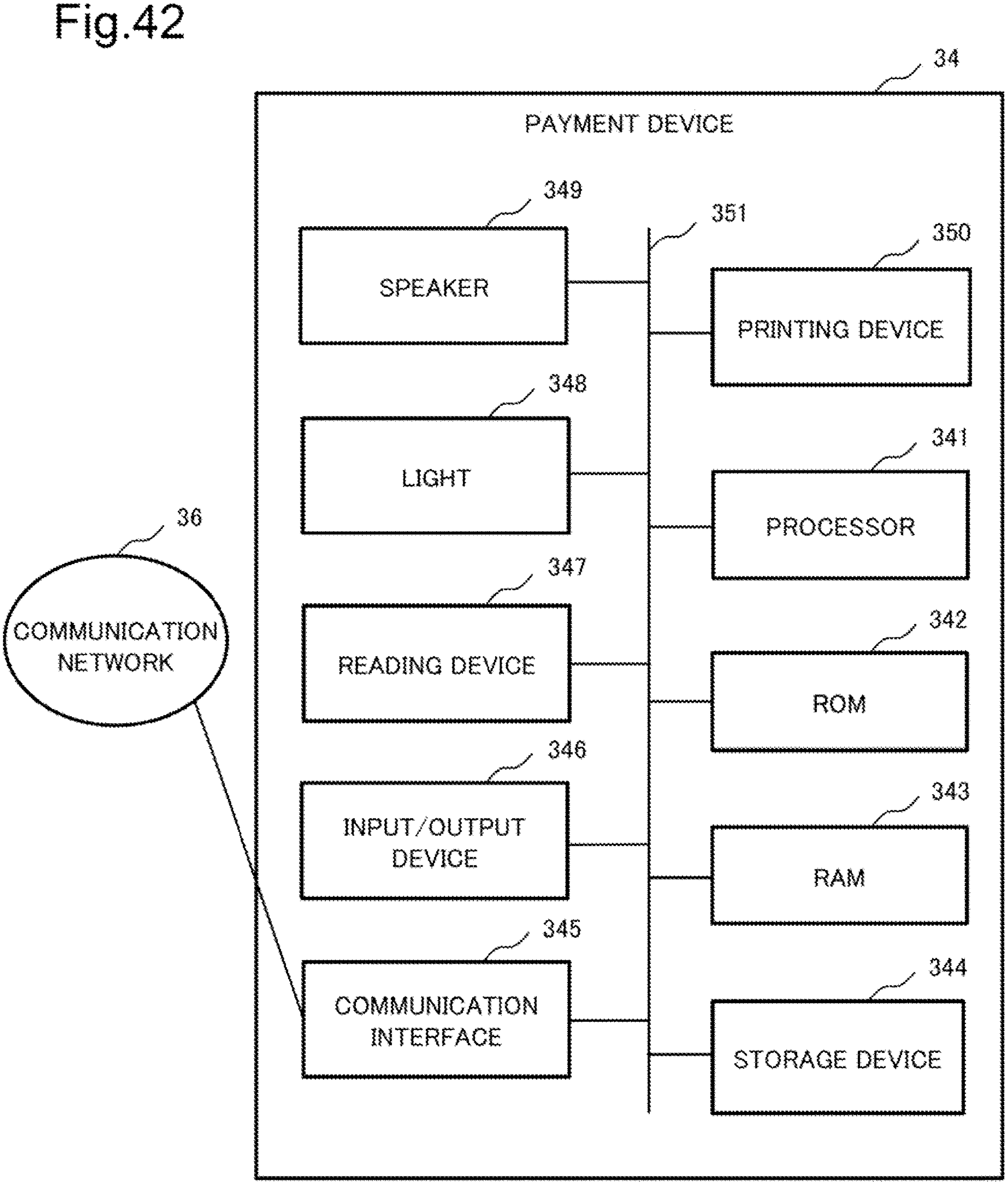
FIG. 42 is an explanatory diagram 42 illustrating a hardware configuration example of a payment device.

The description of each example embodiment ends. Next, a hardware configuration of the store mobile terminal device 10, 20, the customer mobile terminal device 12, the POS server 11, and the payment device 14 will be described. FIG. 39 is an explanatory diagram illustrating a hardware configuration example of the store mobile terminal device. FIG. 40 is an explanatory diagram illustrating a hardware configuration example of the customer mobile terminal device. FIG. 41 is an explanatory diagram illustrating a hardware configuration example of the POS server. FIG. 42 is an explanatory diagram illustrating a hardware configuration example of the payment device.

First, a hardware configuration example of a store mobile terminal device 30 illustrated in FIG. 39 will be described. The store mobile terminal device 30 is, for example, an example in which the store mobile terminal device 10, 20 according to the first and second example embodiments is achieved by a computer. The store mobile terminal device 30 includes, for example, a processor 301, a ROM 302, a RAM 303, a storage device 304, a communication interface 305, an input/output device 306, and a camera 307. The components are connected via a bus 308.

The processor 301 controls the entire store mobile terminal device Examples of the processor 301 include a central processing unit (CPU), a digital signal processor (DSP), and the like. The store mobile terminal device 30 includes the ROM 302, the RAM 303, the storage device 304, and the like as storage units. Examples of the storage device 304 include a semiconductor memory such as a flash memory, an HDD, and an SSD. For example, the storage device 304 stores an OS program, an application program, and the like. Alternatively, the ROM 302 stores an application program. Then, the RAM 303 is used as a work area of the processor 301.

The processor 301 loads a program stored in the storage device 304, the ROM 302, or the like. Then, the processor 301 executes each process coded in the program. The processor 301 may download various programs via the communication network 36. The processor 301 functions as part or all of the store mobile terminal device 30. Then, the processor 301 may execute processing or instructions in the flowchart illustrated based on the program.

The communication interface 305 is connected to a communication network 36 such as a local area network (LAN) or a wide area network (WAN) through a wireless or wired communication line. As a result, the store mobile terminal device 30 is connected to an external device or an external computer via the communication network 36. The communication interface 305 manages an interface between the communication network 36 and the inside of the store mobile terminal device 30. Then, the communication interface 305 controls an input/output of data from an external device or an external computer. The input/output device 306 receives an input by an operation by a customer or an operation by a store clerk. The input/output device 306 outputs data. The input/output device 306 may display an image. The input/output device 306 is, for example, a touch panel display.

The hardware configuration of the store mobile terminal device 30 illustrated in FIG. 39 is an example. The store mobile terminal device 30 may not have some components illustrated in FIG. 39. The store mobile terminal device 30 may have components other than those illustrated in FIG. 39. For example, the store mobile terminal device 30 may include a drive device or the like. Then, the processor 301 may read a program or data from a recording medium attached to a drive device or the like to the RAM 303. Examples of the recording medium include an optical disk, a flexible disk, a magnetic optical disk, and a Universal Serial Bus (USB) memory. For example, the store mobile terminal device 30 may include an input device such as a keyboard and a mouse. The store mobile terminal device 30 may have an output device such as a display. The store mobile terminal device 30 may include an input device and an output device like a PC. The store mobile terminal device 30 may include various sensors. Examples of the sensor include an acceleration sensor, a gyro sensor, a magnetic sensor, a global positioning system (GPS), and a sensor. Examples of the sensor include a fingerprint sensor, light, detection and ranging (LiDAR), a proximity sensor, and an ambient optical sensor.

Next, a hardware configuration example of a customer mobile terminal device 32 illustrated in FIG. 40 will be described. The customer mobile terminal device 32 is an example in which the customer mobile terminal device 12 described in the first example embodiment is achieved by a computer. As in the store mobile terminal device 30, the customer mobile terminal device 32 includes a processor 321, a ROM 322, a RAM 323, a storage device 324, a communication interface 325, an input/output device 326, and a camera 327. The components are connected via a bus 328. As in the store mobile terminal device 30, each component of the customer mobile terminal device 32 is connected via the bus 328. The function of each component of the customer mobile terminal device 32 may be similar to that of the store mobile terminal device 30, and thus a detailed description thereof will be omitted.

As in the store mobile terminal device 30, the hardware configuration of the customer mobile terminal device 32 illustrated in FIG. 40 is an example. The customer mobile terminal device 32 may not include some components illustrated in FIG. 40. The customer mobile terminal device 32 may have components other than those illustrated in FIG. 40

Next, a hardware configuration example of a POS server 31 will be described with reference to FIG. 41. The POS server 31 is an example in which the POS server 11 described in the first example embodiment is achieved by a computer. The POS server 31 includes, for example, a processor 311, a ROM 312, a RAM 313, a storage device 314, and a communication interface 315.

The processor 311 controls the entire POS server 31. Examples of the processor 311 include a CPU and a DSP. The POS server 31 includes, as a storage unit, the ROM 312, the RAM 313, the storage device 314, and the like. Examples of the storage device 314 include a semiconductor memory such as a flash memory, an HDD, and an SSD. For example, the storage device 314 stores an OS program, an application program, and the like. Alternatively, the ROM 312 stores an application program. Then, the RAM 313 is used as a work area of the processor 311.

The processor 311 loads a program stored in the storage device 314, the ROM 312, or the like. Then, the processor 311 executes each process coded in the program. The processor 311 may download various programs via the communication network 36. The processor 311 functions as part or all of the POS server 31. Then, the processor 311 may execute processing or instructions in the flowchart illustrated based on the program.

The communication interface 315 is connected to the communication network 36 such as a LAN or a WAN through a wireless or wired communication line. As a result, the POS server 31 is connected to an external device or an external computer via the communication network 36. The communication interface 315 manages an interface between the communication network 36 and the inside of the POS server 31. Then, the communication interface 315 controls an input/output of data from an external device or an external computer.

The hardware configuration of the POS server 31 illustrated in FIG. 41 is an example. The POS server 31 may not include some components illustrated in FIG. 41. The POS server 31 may include components other than those illustrated in FIG. 41.

Next, a hardware configuration example of a payment device 34 illustrated in FIG. 42 will be described. The payment device 34 is an example in which the payment device 14 described in the first example embodiment is achieved by a computer. The payment device 34 includes, for example, a processor 341, a ROM 342, a RAM 343, a storage device 344, and a communication interface 345. The payment device 34 further includes the communication interface 345, an input/output device 346, a reading device 347, a light 348, a speaker 349, and a printing device 350. The components are connected by a bus 351.

The processor 341 controls the entire payment device 34. Examples of the processor 341 include a CPU and a DSP. The payment device 34 includes the ROM 342, the RAM 343, the storage device 344, and the like as a storage unit. Examples of the storage device 344 include a semiconductor memory such as a flash memory, an HDD, and an SSD. For example, the storage device 344 stores an OS program, an application program, and the like. Alternatively, the ROM 342 stores an application program. Then, the RAM 343 is used as a work area of the processor 341.

The processor 341 loads a program stored in the storage device 344, the ROM 342, or the like. Then, the processor 341 executes each process coded in the program. The processor 341 may download various programs via the communication network 36. The processor 341 functions as part or all of the payment device 34. Then, the processor 341 may execute processing or instructions in the flowchart illustrated based on the program.

The communication interface 345 is connected to the communication network 36 such as a LAN or a WAN through a wireless or wired communication line. As a result, the payment device 34 is connected to an external device or an external computer via the communication network 36. The communication interface 345 manages an interface between the communication network 36 and the inside of the payment device 34. Then, the communication interface 345 controls an input/output of data from an external device or an external computer.

The input/output device 346 receives an input by an operation by a customer or an operation by a store clerk. The input/output device 346 outputs data. The input/output device 346 may display an image. The input/output device 346 is, for example, a touch panel display.

The reading device 347 is, for example, a device capable of reading a payment code such as a one-dimensional code or a two-dimensional code. Examples of the reading device 347 include a barcode reader, an imaging device, and the like. The reading device 347 may be an RFID reader capable of reading an RFID.

The light 348 is, for example, an output device that lights up. The light 348 is turned on when a store clerk is called, or the like in a case where the payment device 34 is abnormal. The speaker 349 is, for example, an output device that outputs an operation sound, a voice message, and the like. The printing device 350 is, for example, an output device capable of printing a receipt.

The hardware configuration of the payment device 34 illustrated in FIG. 42 is an example. Components other than those illustrated in FIG. 42 may be added, or some components may not be included. For example, the payment device 34 may include an input device such as a keyboard, a mouse, and a physical button. The payment device 34 may not include the printing device 350. For example, the printing device 350 may be externally attached. Alternatively, the printing device 350 may be connected via the communication network 36.

The description of the hardware configuration of each device ends. There are various modifications in a method of achieving each device. For example, the system may be achieved by any combination of computers and programs different for respective components. A plurality of components included in each device may be achieved by any combination of one computer and a program.

Part or all of each component of the system may be achieved by an application specific circuit. Part or all of the system may be achieved by a general-purpose circuit including a processor such as a field programmable gate array (FPGA). Part or all of the system may be achieved by a combination of an application specific circuit, a general-purpose circuit, and the like. The circuit may be a single integrated circuit. Alternatively, the circuit may be divided into a plurality of integrated circuits. The plurality of integrated circuits may be configured by being connected via a bus or the like.

When part or all of each component of each device is achieved by a plurality of computers, circuits, and the like, the plurality of computers, circuits, and the like may be disposed in a centralized manner or in a distributed manner.

The method described in each example embodiment is implemented by the store mobile terminal device, the customer mobile terminal device, and the payment device. The method is implemented by a computer such as the store mobile terminal device, the customer mobile terminal device, and the payment device executing a program prepared in advance. The program described in each example embodiment is recorded in a computer-readable recording medium such as an HDD, an SSD, a flexible disk, an optical disk, a flexible disk, a magnetic optical disk, or a USB memory. Then, the program is executed by being read from the recording medium by the computer. The program may be distributed via the communication network 36.

The functions of the components of the system according to each example embodiment described above may be achieved by hardware like the computer system illustrated in FIGS. 39 to 42. Alternatively, each component may be achieved by a computer device or firmware based on program control.

While the present disclosure is described with reference to example embodiments thereof, the present disclosure is not limited to these example embodiments. The configurations and details of the present disclosure may include example embodiments to which various changes that can be grasped by those skilled in the art within the scope of the present disclosure are applied. The present disclosure may include example embodiments in which the matters described in the present specification are appropriately combined or replaced as necessary. For example, the matters described using a specific example embodiment can be applied to other example embodiments as long as no contradiction occurs. For example, although the plurality of operations is described in order in the form of a flowchart, the order of description does not limit the order in which the plurality of operations is executed. Therefore, when each example embodiment is implemented, the order of the plurality of operations can be changed within a range that does not interfere with the content.

Some or all of the above example embodiments can also be described as the following Supplementary Notes. However, some or all of the above example embodiments are not limited to the following.

(Supplementary Note 1)

A store mobile terminal device including:

a reception means configured to receive a mode;

an acquisition means configured to acquire, by an operation by a customer, product information about a product to be purchased by the customer when the received mode is a customer mode, and acquire the product information by an operation by a store clerk when the received mode is a store clerk mode; and an output means configured to output payment information according to the mode based on the product information.

(Supplementary Note 2)

The store mobile terminal device according to Supplementary Note 1, wherein the reception means receives the mode based on identification information about a user.

(Supplementary Note 3)

The store mobile terminal device according to Supplementary Note 2, wherein the output means outputs the payment information including the identification information.

(Supplementary Note 4)

The store mobile terminal device according to any one of Supplementary Notes 1 to 3, wherein the store clerk mode includes a pre-handling mode and an emergency mode, and the output means outputs payment information used for a settlement by a store payment device when the received mode is the pre-handling mode, and outputs payment information used for a settlement by a terminal device when the received mode is the emergency mode.

(Supplementary Note 5)

The store mobile terminal device according to Supplementary Note 4, wherein the terminal device is the store mobile terminal device.

(Supplementary Note 6)

The store mobile terminal device according to Supplementary Note 4, wherein the terminal device is the customer mobile terminal device.

(Supplementary Note 7)

A method including:

receiving a mode;

acquiring, by an operation by a customer, product information about a product to be purchased by the customer when the received mode is a customer mode, and acquiring the product information by an operation by a store clerk when the received mode is a store clerk mode; and outputting payment information according to the mode based on the product information.

(Supplementary Note 8)

A non-transitory recording medium readable by a computer, the recording medium storing a program for causing the computer to execute processing including:

receiving a mode;

acquiring, by an operation by a customer, product information about a product to be purchased by the customer when the received mode is a customer mode, and acquiring the product information by an operation by a store clerk when the received mode is a store clerk mode; and outputting payment information according to the mode based on the product information.

(Supplementary Note 9)

A program for causing a computer to execute processing including:

receiving a mode;

acquiring, by an operation by a customer, product information about a product to be purchased by the customer when the received mode is a customer mode, and acquiring the product information by an operation by a store clerk when the received mode is a store clerk mode; and outputting payment information according to the mode based on the product information.

REFERENCE SIGNS LIST

1 system
10 store mobile terminal device
11 POS server
12 customer mobile terminal device
13 printing device
14 payment device
15 settlement server
101 mode reception unit
102 store reception unit
103 product information acquisition unit
104 quantity reception unit
105 settlement method reception unit
106 application presence/absence reception unit
107 payment information management unit
108 settlement unit
109 output unit
110 storage unit
111 payment information generation unit
112 list generation unit
113 sales management unit
114 storage unit
121 reading unit
122 settlement unit
123 output unit
125 settlement information reception unit
126 storage unit
141 reading unit
142 settlement unit
143 issuance control unit
144 display unit
145 storage unit
1010 display unit
1011 issuance control unit
1210 display unit
115 member DB
116 store clerk DB
117 Product DB
118 Sales DB
119 purchase product list DB
20 store mobile terminal device
201 reception unit
203 acquisition unit
209 output unit

What is claimed is:

1. A store mobile terminal device comprising:

a touch panel display;

a memory storing instructions; and one or more processors configured to execute the instructions to:

receive, in response to an input of a customer identification information about a customer entered via the touch panel display, a customer mode;

receive, in response to an input of a store clerk identification information about a store clerk entered via the touch panel display, a store clerk mode;

automatically display, on the touch panel display, in response to receiving the store clerk mode, a screen configured to receive any of a pre-handling mode and an emergency mode, wherein the screen is not displayed on the touchscreen display when the customer mode is received;

receive, based on a selection that is through the screen via the touch panel display and is of one of the pre-handling mode and the emergency mode, the one of the pre-handling mode and the emergency mode;

acquire, by an operation by the customer input via the touch panel display and based on the customer mode being received, product information about a product to be purchased by the customer;

acquire, based on the store clerk mode being receiving, the product information by an operation by the store clerk input via the touch panel display; and output payment information based on the product information and, based on the pre-handling mode being received, as of a settlement by a store payment device and, based on the emergency mode being received, as of a settlement by a terminal device.

2. The store mobile terminal device according to claim 1, wherein the one or more processors are further configured to execute the instructions to:

output the payment information as including at least one of the customer identification information and the store clerk identification information.

3. The store mobile terminal device according to claim 1, wherein the terminal device is the store mobile terminal device.

4. The store mobile terminal device according to claim 1, wherein the terminal device is a customer mobile terminal device.

5. The store mobile terminal device according to claim 1, wherein the one or more processors are further configured to execute the instructions to:

receive, before starting product registration, the customer mode and the store clerk mode.

6. The store mobile terminal device according to claim 1, wherein the one or more processors are further configured to execute the instructions to:

output the payment information as further based on a settlement method selected from a cash settlement or an electronic settlement.

7. A method comprising:

a touch panel display;

receiving, in response to an input of customer identification information about a customer entered via the touch panel display, a customer mode;

receiving, in response to an input of a store clerk identification information about a store clerk entered via the touch panel display, a store clerk mode;

automatically displaying, on the touch panel display, in response to receiving the store clerk mode, a screen configured to receive any of a pre-handling mode and an emergency mode, wherein the screen is not displayed on the touchscreen display when the customer mode is received;

receiving, based on a selection that is through the screen via the touch panel display and is of one of the pre-handling mode and the emergency mode, the one of the pre-handling mode and the emergency mode;

acquiring, by an operation by the customer input via the touch panel display and based on the customer mode being received, product information about a product to be purchased by the customer;

acquiring, based on the store clerk mode being receiving, the product information by an operation by the store clerk input via the touch panel display; and outputting payment information based on the product information and, based on the pre-handling mode being received, as of a settlement by a store payment device and, based on the emergency mode being received, as of a settlement by a terminal device.

8. A non-transitory recording medium readable by a computer, the recording medium storing a program for causing the computer to execute processing comprising:

a touch panel display;

receiving, in response to an input of customer identification information about a customer entered via the touch panel display, a customer mode;

receiving, in response to an input of a store clerk identification information about a store clerk entered via the touch panel display, a store clerk mode;

automatically displaying, on the touch panel display, in response to receiving the store clerk mode, a screen configured to receive any of a pre-handling mode and an emergency mode, wherein the screen is not displayed on the touchscreen display when the customer mode is received;

receiving, based on a selection that is through the screen via the touch panel display and is of one of the pre-handling mode and the emergency mode, the one of the pre-handling mode and the emergency mode;

acquiring, by an operation by the customer input via the touch panel display and based on the customer mode being received, product information about a product to be purchased by the customer;

acquiring, based on the store clerk mode being receiving, the product information by an operation by the store clerk input via the touch panel display; and outputting payment information based on the product information and, based on the pre-handling mode being received, as of a settlement by a store payment device and, based on the emergency mode being received, as of a settlement by the terminal device.

* * * * *